United States Patent
Ndobo-Epoy et al.

(10) Patent No.: US 10,550,568 B2
(45) Date of Patent: Feb. 4, 2020

(54) SYSTEMS, METHODS, AND APPARATUSES FOR INSULATING ADJACENT TO A TOP OF AN ATTIC

(71) Applicant: CERTAINTEED CORPORATION, Malvern, PA (US)

(72) Inventors: Jean-Philippe Ndobo-Epoy, Westboro, MA (US); Jerome Arul, Providence, RI (US); Andrew Clyde Brandt, Pottstown, PA (US); Todd P. Dinoia, Littleton, MA (US); Luc Pierre Vitry, Philadelphia, PA (US); Conor Patrick McDonald, Boston, MA (US); David M. Pacana, Spring City, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 15/718,628

(22) Filed: Sep. 28, 2017

(65) Prior Publication Data
US 2018/0094428 A1    Apr. 5, 2018

Related U.S. Application Data

(60) Provisional application No. 62/402,219, filed on Sep. 30, 2016, provisional application No. 62/402,465, (Continued)

(51) Int. Cl.
*E04B 1/76* (2006.01)
*E04B 5/02* (2006.01)
(Continued)

(52) U.S. Cl.
CPC .......... *E04B 1/7675* (2013.01); *E04B 1/7666* (2013.01); *E04B 5/026* (2013.01);
(Continued)

(58) Field of Classification Search
CPC ........ E04B 1/767; E04B 1/7666; E04B 7/022; E04B 7/024; E04D 13/16; E04D 13/1625; E04D 13/1637
See application file for complete search history.

(56) References Cited

U.S. PATENT DOCUMENTS

| 1,870,838 A | * | 8/1932 | Davis ..................... E04B 1/767 |
|  |  |  | 52/407.1 |
| 2,172,270 A |  | 9/1939 | Ansel |

(Continued)

FOREIGN PATENT DOCUMENTS

| AU | 2010202733 A1 | 1/2011 |
| CN | 204645501 U | 9/2015 |

(Continued)

OTHER PUBLICATIONS

International Search Report & Written Opinion for PCT/US2017/053963, dated Jan. 9, 2018, 15 pages.
(Continued)

*Primary Examiner* — Gisele D Ford
(74) *Attorney, Agent, or Firm* — Abel Schillinger, LLP; Thomas H. Osborn

(57) ABSTRACT

An insulation system for hanging insulation in a truss is disclosed and includes a first rail configured to be installed on a first truss and a second rail configured to be installed on a second truss spaced apart from the first truss. A first cavity is established between the first rail and the second rail. Further, the first cavity is configured to receive and engage a first insulation batt.

12 Claims, 43 Drawing Sheets

Related U.S. Application Data filed on Sep. 30, 2016, provisional application No. 62/446,160, filed on Jan. 13, 2017, provisional application No. 62/466,680, filed on Mar. 3, 2017.

(51) Int. Cl.
  *E04C 3/29* (2006.01)
  *E04D 13/16* (2006.01)
  *E04B 1/80* (2006.01)

(52) U.S. Cl.
  CPC .......... *E04C 3/291* (2013.01); *E04D 13/1606* (2013.01); *E04D 13/1637* (2013.01); *E04B 1/80* (2013.01); *E04D 13/1625* (2013.01); *Y02A 30/248* (2018.01)

(56) References Cited

U.S. PATENT DOCUMENTS

| | | |
|---|---|---|
| 2,793,887 A | 5/1957 | Moore |
| 3,321,878 A | 5/1967 | Brown et al. |
| D210,872 S | 4/1968 | Marsh |
| 3,732,659 A | 5/1973 | Labarge |
| 3,738,217 A | 6/1973 | Walker |
| 4,047,346 A | 9/1977 | Alderman |
| 4,155,206 A | 5/1979 | Player |
| 4,231,280 A | 11/1980 | Gross |
| 4,292,777 A * | 10/1981 | Story ................ E04D 13/172 52/407.1 |
| 4,320,605 A | 3/1982 | Carlson et al. |
| D267,776 S | 2/1983 | Holgersson et al. |
| 4,425,747 A | 1/1984 | Player |
| 4,437,282 A | 3/1984 | O'Brien |
| 4,476,659 A | 10/1984 | Player |
| 4,573,298 A | 3/1986 | Harkins |
| 4,592,688 A | 6/1986 | Kramer |
| 4,597,702 A | 7/1986 | Brown |
| 4,635,423 A | 1/1987 | Ward |
| 4,724,651 A | 2/1988 | Fligg |
| 4,856,247 A | 8/1989 | Georgino |
| 4,875,320 A | 10/1989 | Sparkes |
| 4,930,285 A * | 6/1990 | Ward ................ E04D 11/02 52/742.12 |
| 5,085,023 A | 2/1992 | Duffy |
| 5,239,790 A * | 8/1993 | Fetzer ................ A47B 96/025 312/245 |
| 5,442,890 A | 8/1995 | Fligg |
| 5,581,966 A | 12/1996 | Fligg |
| 5,704,170 A | 1/1998 | Simpson |
| 6,006,481 A | 12/1999 | Jacobs et al. |
| D419,693 S | 1/2000 | Hersh et al. |
| D420,149 S | 2/2000 | Hersh et al. |
| D443,198 S | 6/2001 | Snyder |
| D446,442 S | 8/2001 | Simpson |
| D452,424 S | 12/2001 | Simpson, Sr. |
| 6,324,808 B1 * | 12/2001 | Lippy ................ E04B 9/22 411/396 |
| D462,601 S | 9/2002 | Chaney |
| 6,487,825 B1 | 12/2002 | Sillik |
| 6,808,772 B2 | 10/2004 | Kunzel et al. |
| 6,890,666 B2 | 5/2005 | Kunzel et al. |
| 7,008,890 B1 | 3/2006 | Kunzel et al. |
| 7,017,315 B2 | 3/2006 | Corwin |
| 7,021,016 B2 | 4/2006 | Steffes et al. |
| D523,968 S | 6/2006 | Gilbert |
| 7,090,174 B2 | 8/2006 | Korczak et al. |
| D599,193 S | 9/2009 | Meyer et al. |
| D607,711 S | 1/2010 | Adams et al. |
| D616,035 S | 5/2010 | Kosir et al. |
| 7,908,813 B2 | 3/2011 | Gulbrandsen et al. |
| 7,921,619 B2 | 4/2011 | Snyder et al. |
| 7,997,180 B2 | 8/2011 | Söderberg |
| 8,132,379 B2 | 3/2012 | Zaveri et al. |
| 8,281,548 B1 | 10/2012 | Garcia |
| D684,844 S | 6/2013 | Ferreira |
| 8,613,180 B2 | 12/2013 | Strickland et al. |
| 8,635,824 B2 | 1/2014 | Scherrer |
| 8,640,429 B1 | 2/2014 | Watts et al. |
| 8,657,244 B2 | 2/2014 | Sillik |
| D701,329 S | 3/2014 | Tiner et al. |
| 8,739,486 B2 | 6/2014 | Bodsford et al. |
| D724,259 S | 3/2015 | Klus |
| 8,985,927 B2 | 3/2015 | Ashton et al. |
| 9,032,678 B2 | 5/2015 | Shaw et al. |
| D732,912 S | 6/2015 | Cavaliere et al. |
| D737,120 S | 8/2015 | Recker et al. |
| D739,709 S | 9/2015 | Wright |
| 9,255,406 B1 | 2/2016 | McCary, Sr. |
| D754,405 S | 4/2016 | Herde |
| 9,322,179 B2 * | 4/2016 | Oberg ................ E04D 13/1618 |
| 9,359,471 B2 | 6/2016 | Trumbo et al. |
| 9,366,052 B1 | 6/2016 | Warner et al. |
| 9,476,204 B2 | 10/2016 | Wolf |
| 9,546,480 B2 * | 1/2017 | Jakobsen ................ E04D 3/36 |
| D787,092 S | 5/2017 | Singh |
| D789,559 S | 6/2017 | Singh |
| D790,078 S | 6/2017 | Singh |
| D790,732 S | 6/2017 | Singh |
| D790,734 S | 6/2017 | Singh |
| D790,735 S | 6/2017 | Singh |
| 9,671,046 B2 | 6/2017 | Whipple et al. |
| D791,350 S | 7/2017 | Singh |
| D791,351 S | 7/2017 | Singh |
| D791,355 S | 7/2017 | Singh |
| D791,359 S | 7/2017 | Singh |
| D791,360 S | 7/2017 | Singh |
| D791,361 S | 7/2017 | Singh |
| D793,848 S | 8/2017 | Charette |
| D811,853 S | 3/2018 | Foley et al. |
| 9,920,516 B2 * | 3/2018 | Alter ................ E04B 1/7658 |
| 2004/0216408 A1 | 11/2004 | Hohmann, Jr. |
| 2005/0017142 A1 | 1/2005 | Ogden |
| 2006/0078753 A1 | 4/2006 | Bomberg et al. |
| 2007/0015424 A1 | 1/2007 | Toas et al. |
| 2008/0115460 A1 | 5/2008 | Ruid et al. |
| 2008/0237433 A1 | 10/2008 | Hardin |
| 2010/0043328 A1 | 2/2010 | Kallweit |
| 2011/0016816 A1 | 1/2011 | Lizarazu |
| 2011/0256786 A1 | 10/2011 | Bomberg |
| 2011/0271626 A1 | 11/2011 | Lewis |
| 2013/0280467 A1 | 10/2013 | Fay |
| 2015/0176211 A1 | 6/2015 | Knapp et al. |
| 2015/0218802 A1 | 8/2015 | Wolf |
| 2015/0218803 A1 | 8/2015 | Rockwell et al. |
| 2015/0233110 A1 | 8/2015 | Alter et al. |
| 2015/0240477 A1 | 8/2015 | Weeks et al. |
| 2015/0300003 A1 | 10/2015 | Jakobsen et al. |
| 2016/0319537 A1 | 11/2016 | Rinne et al. |
| 2017/0101776 A1 * | 4/2017 | White ................ E04B 1/80 |
| 2017/0183875 A1 | 6/2017 | Ndobo-Epoy et al. |
| 2017/0282510 A1 | 10/2017 | Peet et al. |
| 2017/0313630 A1 | 11/2017 | Peet et al. |
| 2018/0094427 A1 * | 4/2018 | Ndobo-Epoy ........ E04B 1/7675 |

FOREIGN PATENT DOCUMENTS

| | | |
|---|---|---|
| EP | 0319390 A1 | 6/1989 |
| FR | 3026762 A1 | 4/2016 |
| GB | 1590450 A | 6/1981 |
| GB | 2491933 A | 12/2012 |
| KR | 101523898 B1 | 6/2015 |
| WO | 2013079076 A1 | 6/2013 |
| WO | 2015095786 A1 | 6/2015 |
| WO | 2015117154 A1 | 8/2015 |
| WO | 2018064305 A1 | 4/2018 |

OTHER PUBLICATIONS 2.000 IN Barbed U-Channel, posted at web.archive.org, posting date Sep. 22, 2013, accessed Jun. 28, 2018. url: https://web.archive.org/web/20130922053547/http://seagateplastics.com:80/Stock_Plastics_Catalog/catalog/plastic_c_channels.html, 2013.

(56) References Cited

OTHER PUBLICATIONS

Aluminum Recessed U-Channel for 10mm Glass Shower Screens, posted at wholesaleglasscompany.co.uk, accessed Jun. 27, 2018. url: https://www.wholesaleglasscompany.co.uk/acatalog/Aluminum-Recessed-U-Channel-for-10mm-Glass-Shower-Screens.html, 2018.
Aluminum U channel profile, posted at alcaglas.com, accessed Jun. 27, 2018, url: http://www.alcaglas.com/gb/producto.php?codigo=perfil-u-aluminiov02820, 2018.
Insert Channel, posted at schematech.co.za, accessed Jun. 27, 2018, url: http://www.schematech.co.za/showers/metal-profiles/u-channel/insert-channel-8mm-1000mm.html, 2018.
Plastic Upholstery J-Clips, posted at trimlok.com, accessed Jun. 27, 2018, url: https://www.trimlok.com/plastic-extrusion/upholstery-clips, 2018.
12 Gauge Self Adhesive Stick Insulation Hanger, posted at alibaba.com, accessed Jul. 18, 2018, url: https://www.alibaba.com/product-detail/12-gauge-self-adhesive-stick-insulation_60573332407.html, 2018.
62mm Self Adhesive Insulation Hanger, posted at tdsupplies.co.uk, accessed Jul. 18, 2018, url: http://www.tdsupplies.co.uk/stick-pins, 2018.
Cup Head Pin and Paper Washer, posted at soundacousticsolutions.com, accessed Jul. 18, 2018, url: https://www.soundacousticsolutions.com/products/cup-head-pins-paper-washer-6855, 2018.
Duro Dyne Dynastick Self Adhesive Insulation Hangers, posted at amazon.com, accessed Jul. 18, 2018, url: https://www.amazon.com/Duro-Dyne-Dynastick-Insulation-SAH114/dp/B00DODP122, published Jun. 27, 2018.
Perforated Base Insulation Hanger, posted at techlite.com, accessed Jul. 18, 2018, url: https://www.techlite.com/techlite-acoustics/perforated-base-insulation-hanger, 2018.
Babineau, Jr., Francis, "Cost-Effective High-Performance Unvented Attics," Thermal Performance of the Exterior Envelopes of Whole Buildings XIII International Conference, 2016, pp. 34-45, ASHRAE.
Carpino, Elaina et al., "Delivering Energy Efficiency to the Top of the House," High Performance Conditioned Attic System, Owens Corning, dated Mar. 10, 2015, pp. 1-26.
"L'étanchéité à l'air AUTREMENT—Présentation et mise en œuvre," Système RT Plus, Jan. 2016, 9 pages, Knauf Insulation.
"SOFTR® Duct Wrap FRK Product Data Sheet," Sep. 2010, 4 pages, Owens Corning, US.

* cited by examiner

SYSTEMS, METHODS, AND APPARATUSES FOR INSULATING ADJACENT TO A TOP OF AN ATTIC

CROSS-REFERENCE TO RELATED APPLICATIONS

This application claims priority under 35 U.S.C. § 119 to U.S. Provisional Patent Application No. 62/402,219, entitled "SYSTEM, METHOD AND APPARATUS FOR INSULATING ADJACENT A TOP OF AN ATTIC," filed on Sep. 30, 2016, and naming as inventors Conor Patrick MCDONALD et al., and claims priority to U.S. Provisional Patent Application No. 62/402,465, entitled "ALTERNATIVE SYSTEM, METHOD AND APPARATUS FOR INSULATING ADJACENT A TOP OF AN ATTIC," filed on Sep. 30, 2016, and naming as inventors Conor Patrick MCDONALD, and claims priority to U.S. Provisional Patent Application No. 62/446,160, entitled "SYSTEM, METHOD AND APPARATUS FOR INSULATION SUPPORTING SYSTEM," filed on Jan. 13, 2017, and naming as inventors Jean-Philippe NDOBO-EPOY, and claims priority to U.S. Provisional Patent Application No. 62/466,680, entitled "SYSTEM AND METHOD FOR STRUCTURAL INSULATION," filed on Mar. 3, 2017, and naming as inventors Jean-Philippe NDOBO-EPOY, which applications are assigned to the current assignee hereof and are incorporated by reference herein in their entireties.

BACKGROUND OF THE INVENTION

Field of the Disclosure

The present invention relates in general to insulation and, in particular, to a system, method and apparatus for insulating a building adjacent a top of an attic of the building.

Description of the Related Art

In the southern U.S., the heating, ventilating and air conditioning (HVAC) ducts are traditionally installed in the attics of homes because of the lack of space in the house. These homes rarely have basements due to flooding threats (southeast) or earthquake threats (southwest). Most HVAC ducts have partial leaks, and significant energy is lost if they are placed above the insulation in the attics. It is common practice to locate HVAC ducts in the conditioned space.

In January 2017, the state of Calif. introduced new options to either add more insulation under or above the roof deck in addition to the existing insulation on the attic floor. Alternately, the same level of insulation (R30 to R38, depending on the climate zone) may be placed under the roof deck to ensure that all HVAC ducts are located in the insulated space.

Homes with insulation between attic roof rafters provide the best configuration for the HVAC in the attics. However, most roof rafters are 2×4 inches or 2×6 inches, which are far too small to reach the R-values (e.g., R30 to R49) required by building codes with traditional insulation, such as fiberglass or cellulose. A solution is required to insulate both between and below the rafters. If the attic is not ventilated, such designs also have a higher risk regarding moisture management.

Some basic solutions have been used by insulation contractors for decades, such as adding wood lumber (e.g., 2×6 inch or 2×8 inch beams) to roof rafters, or attaching wood I-joists of the desired height. However, these solutions increase the weight of the roof, which requires alteration of the truss structural design. Moreover, these solutions are time consuming to install, introduce residual thermal bridges (wood) and provide no continuous layer of insulation.

Another solution is disclosed in WO 2015/117154, which uses a fabric for a blown-in blanket system (BIBS). However, this system is quite time consuming to install since it requires the entire roof to be airtight with caulking at each junction between the rafters and the external sheathing of the roof deck. This can be difficult to achieve with complex truss designs, roof hips, valleys, crossed trusses, etc. It also requires the addition of a "diffusion port" (e.g., an airtight opening with a vapor open roof membrane) at the ridge vent and at the top of the hips to avoid moisture issues, in addition to requiring the ridge vent to be made airtight with house wrap.

Moreover, the BIBS membrane must be correctly folded and stapled before blowing the insulation, which produces sagging due to the weight of the insulation since the folds are not attached to anything. Such a configuration makes it almost impossible to have a well defined and consistent thickness and R-value. This is due to membrane sag from the weight of the blown insulation, which leaves gaps between the membrane and the insulation. This issue may be addressed by increasing the density of the insulation to ensure that the cavity is correctly filled.

In addition, if the rafters are not perfectly aligned there must be a manual adjustment of the folding of the fabric with a ruler, which is even more time consuming. This system also is limited since a load cannot be attached to it, such as gypsum boards to form a finished ceiling for a room in the attic. Furthermore, this solution is limited to U.S. climate zones 1 to 3, with residual questions regarding the long-term durability without an internal vapor retarder during cold winters in climate zone 3.

Solutions exist to address some of these issues, such as the Suspente Integra2 system from Saint-Gobain Isover France. See U.S. Pub. No. 2011/0016816, which is incorporated herein by reference in its entirety. That solution attaches a second layer of insulation below the rafters to enhance airtightness and moisture management. This is achieved by clipping a smart vapor retarder membrane behind gypsum boards, while maintaining a space for cables and the like, with metallic rails that retain the gypsum boards. Nevertheless, this metallic solution is not adapted to the U.S. residential market, which uses only wooden studs and rafters, not metal rails like commercial buildings.

In addition, recent building code and program requirements are driving the need for easier and more effective methods of compartmentalization that also meet code fire safety requirements. For example, the 2012 International Energy Conservation Code (IECC) requires airtightness of 3 ACH50 test pressure for single-family and multifamily construction in climate zones 3-8 and is being adopted more throughout the United States. For commercial buildings, Leadership in Energy & Environmental Design (LEED) has a similar compartmentalization requirement, as does the American Society of Heating and Air-Conditioning Engineers (ASHRAE) Standard 189. Since conventional solutions make achieving the new whole-building air tightness requirement very difficult, improvements in insulation systems continue to be of interest.

SUMMARY

Embodiments of a system, method and apparatus for insulating near the top of an attic are disclosed. The attic may include rafters that support a roof deck. In an example, a hanger for supporting insulation in the attic may include a beam having an axis and an elongated profile in an axial direction. The elongated profile may have a proximal end configured to be coupled only to the rafters but not to the roof deck. The proximal end may be planar and configured to be substantially parallel to the roof deck when installed. A distal end of the beam may be substantially planar and parallel to the proximal end. A web that is substantially planar may extend substantially perpendicular to and between the proximal end and the distal end. An insulation space is defined along the web between the proximal and distal ends. In addition, the distal end may be configured to be coupled to an insulation batt located in the insulation space.

In another embodiment, a system for insulating an attic of a building is disclosed. The building may include a roof with a roof deck, and rafters supporting the roof deck inside the attic. The system may include beams for supporting insulation in the attic. Each of the beams may include an axis and an elongated profile in an axial direction. The elongated profile may include a proximal end mounted only to the rafters but not to the roof deck. The proximal end can be planar and substantially parallel to the roof deck. The beam may include a distal end that is substantially planar and parallel to the proximal end. A web that is substantially planar may extend substantially perpendicular to and between the proximal end and the distal end. An insulation space is defined along the web between the proximal and distal ends. The system may further include insulation batts mounted to and between adjacent ones of the beams in the insulation spaces. Each of the insulation batts may include an insulation material and an outer layer that faces the distal ends of the beams. The outer layer may make it possible to achieve an airtightness of ACH50<3. A first tape may be applied to the distal ends of the beams and to the outer layers of the insulation batts to form airtight barriers therebetween. The airtight barriers also may make it possible to achieve ACH50<3.

An embodiment of a method of insulating an attic of a building having a roof with a roof deck, and rafters supporting the roof deck inside the attic, also is disclosed. The method may include providing beams comprising an elongated profile in an axial direction; fastening only proximal ends of the beams to the rafters; positioning insulation batts on distal ends of adjacent ones of the beams, each of the insulation batts comprising an insulation material and an outer layer facing the distal ends of the beams. The outer layer may include an airtightness of ACH50<3. In addition, the method may include applying a tape to the distal ends of the beams and to the outer layers of the insulation batts to form airtight barriers therebetween. The airtight barriers may include the airtightness of ACH50<3.

In still another embodiment, a hanger may include a beam having an axis and a profile in an axial direction. The profile may include a distal end that is elongated in the axial direction and substantially planar. Straps may extend from the distal end. The straps can be substantially planar and perpendicular to the distal end. Each strap may include a proximal end that is planar and configured to be coupled to a respective rafter. An insulation space is defined along the straps between the proximal ends and distal end. The distal end may be configured to be coupled to an insulation batt located in the insulation space.

Embodiments of an alternative system, method and apparatus for insulating adjacent a top of an attic are also disclosed. For example, a system insulates an attic of a building having a roof with a roof deck, and rafters supporting the roof deck inside the attic. The system may include brackets aligned and mounted to the rafters, and beams attached to the brackets such that the beams are suspended from the rafters via the brackets. In addition, insulation batts may extend between the beams, and tape may be used to secure the insulation batts to the beams.

In another embodiment, a hanger for supporting insulation in an attic is disclosed. The hanger may include a beam having an axis and an elongated profile in an axial direction. The elongated profile may include a proximal end configured to be coupled to the rafters, a distal end spaced apart from the proximal end, and a web extending between the proximal end and the distal end. An insulation space may be defined along the web between the proximal and distal ends. The distal end may be configured to be coupled to an insulation batt located in the insulation space. In addition, the beam may include a folded position wherein the beam is folded such that the web is not perpendicular to the proximal and distal ends. The beam also may have an installation position wherein the web is substantially perpendicular to the proximal and distal ends.

An alternative embodiment of a hanger for supporting insulation in an attic may include a beam having an axis and an elongated profile in an axial direction. The elongated profile may include proximal ends configured to be coupled to the rafters, a distal end spaced apart from the proximal ends, and a web extending between the proximal ends and the distal end. An insulation space may be defined along the web between the proximal and distal ends. The distal end may be configured to be coupled to an insulation batt located in the insulation space. In addition, the web may include a solid section that spans an entirety of the elongated profile, and a segmented section that engages respective ones of the proximal ends, with voids in the segmented section that extend from the proximal ends to the solid section.

In another aspect, a hanger may be used to support insulation in an attic having a roof deck. The hanger may include a first end coupled to a beam and a second end coupled to a barrier. The hanger also may include an axial midsection defining an insulation space between the first end and the second end. The hanger may also include a beam attachment component having a first face and a radial lip located at the bottom of the first face adapted to contact a bottom of a beam.

In another embodiment, an insulation system is disclosed. The insulation system may include a beam, a barrier, and at least one hanger. The hanger may include a first end coupled to a beam and a second end coupled to a barrier. The hanger also may include an axial midsection defining an insulation space between the first end and the second end. The insulation system may further include insulation at least partially filling the insulation space defined by the hanger.

A method for installing insulation for a home having an attic with a deck and beams fasted to the deck is disclosed. The method may include: providing a barrier; providing at least one hanger. The hanger may include a first end coupled to a beam and a second end coupled to a barrier. The hanger also may include an axial midsection defining an insulation space between the first end and the second end. The hanger may also include a beam attachment component having a first face and a radial lip located at the bottom of the first face adapted to contact a bottom of a beam. The method may include: attaching the barrier attachment component to the barrier; and attaching the beam attachment component to the beam such that the radial lip contacts the bottom of the beam to provide an insulation space defined between the first and second ends, wherein the radial lip determines the size of the insulation space. The method may further include: providing insulation within the insulation space.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
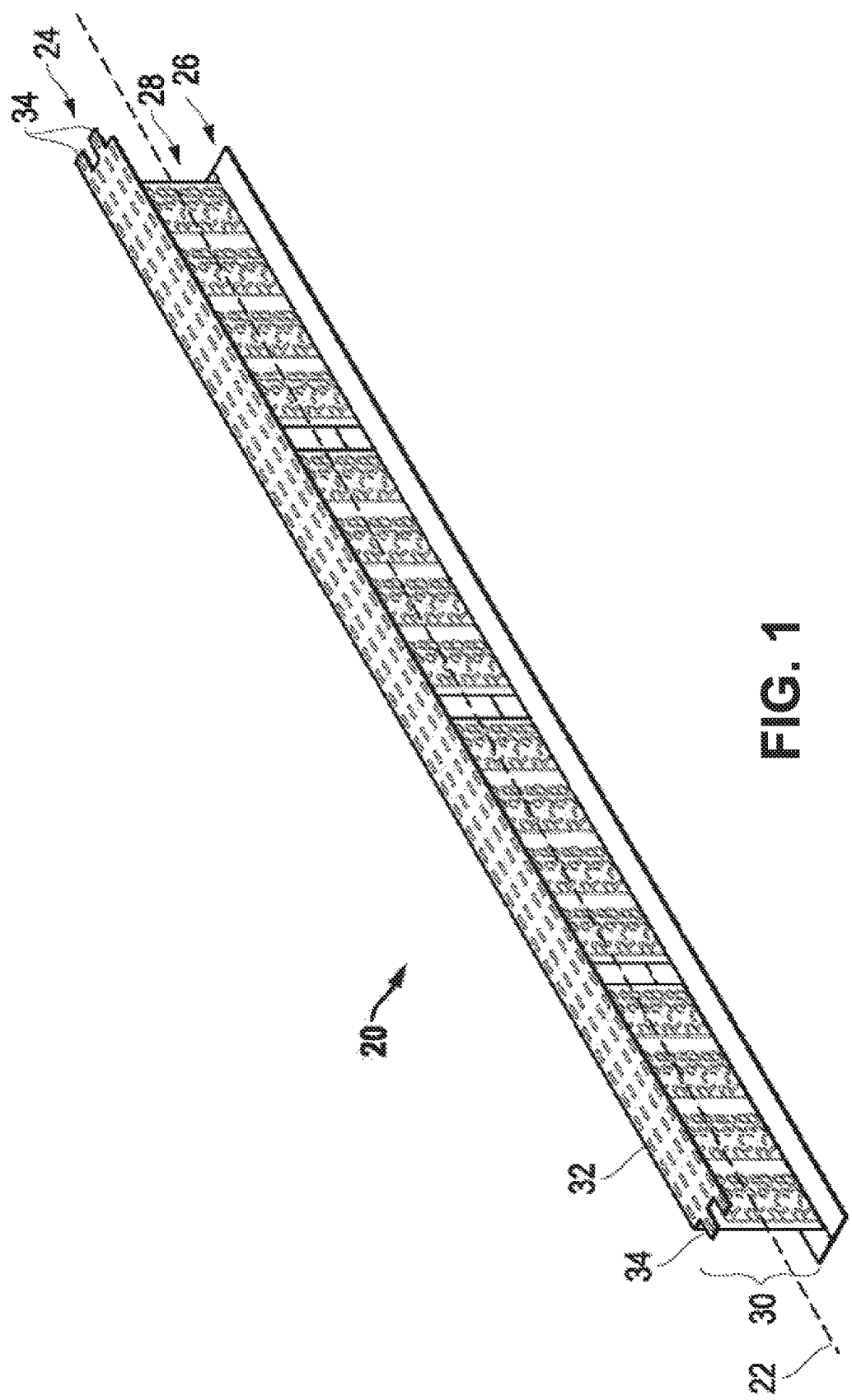
FIG. 1 is a top, front isometric view of an embodiment of a beam for supporting insulation.
Figure 2:
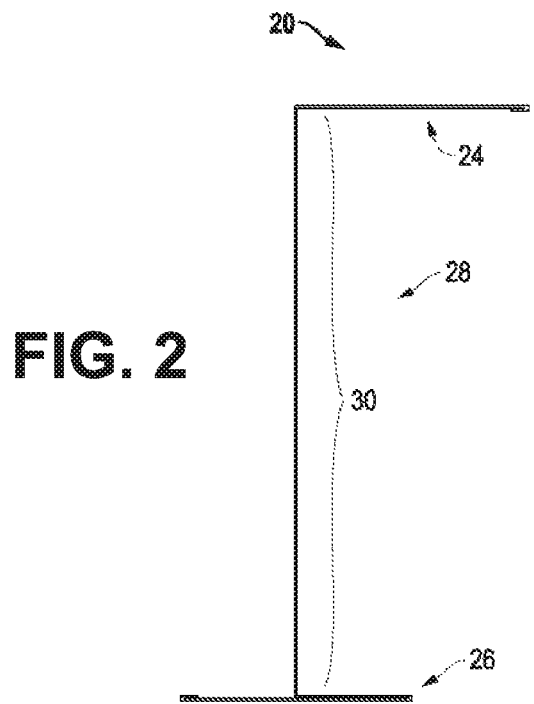
FIGS. 2-4 are end, front and top views, respectively, of the beam of FIG. 1.
Figure 3:
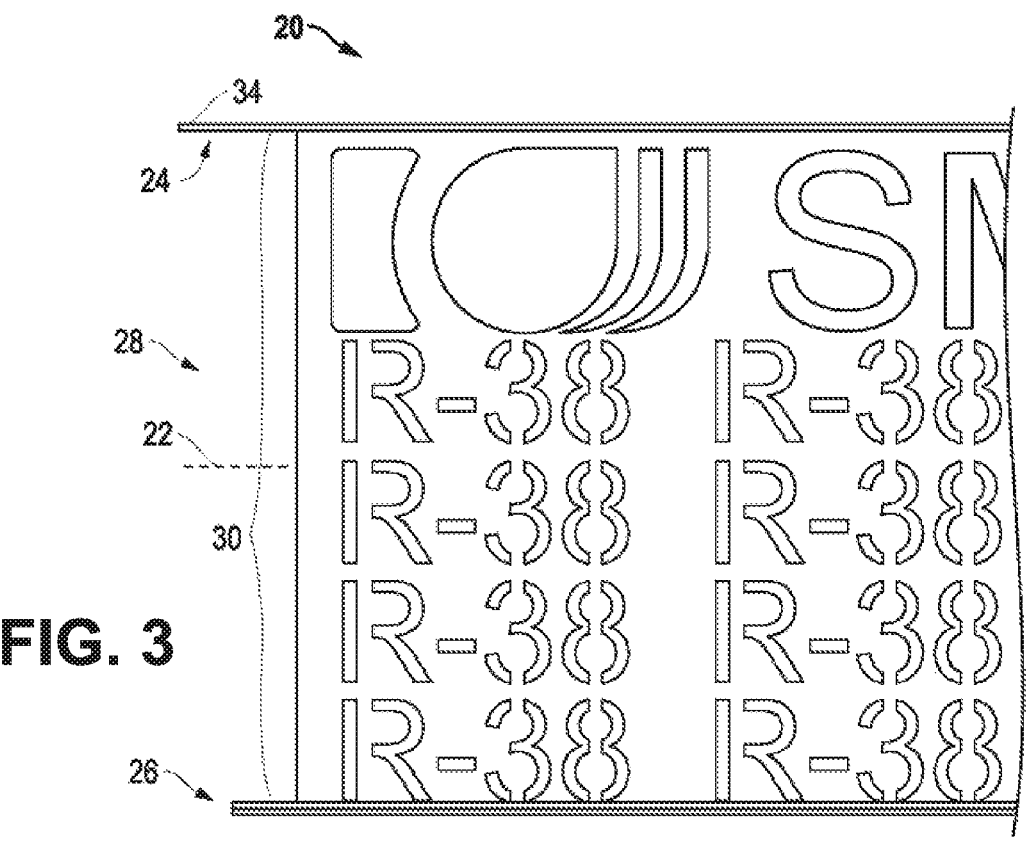
Figure 4:
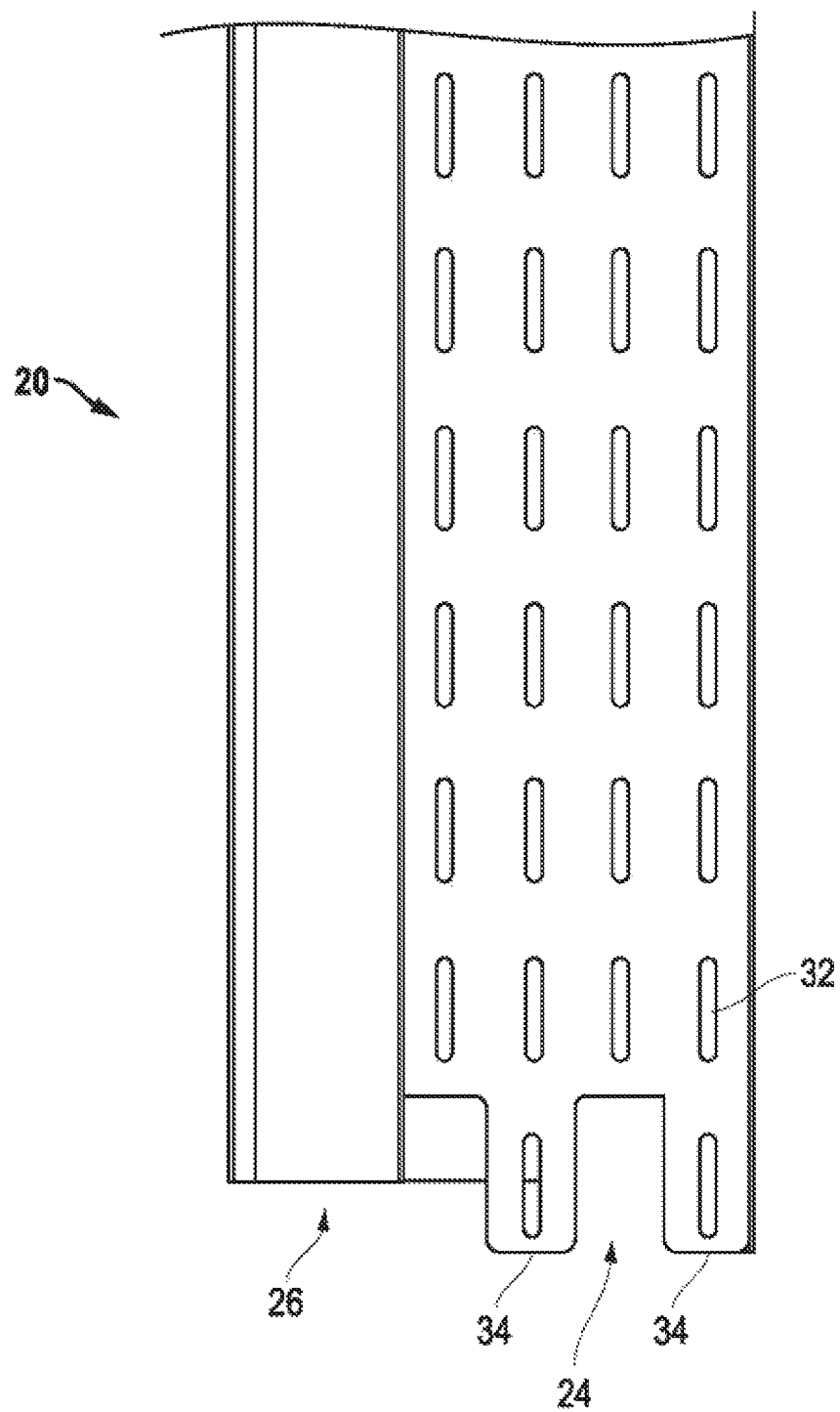
Figure 5:
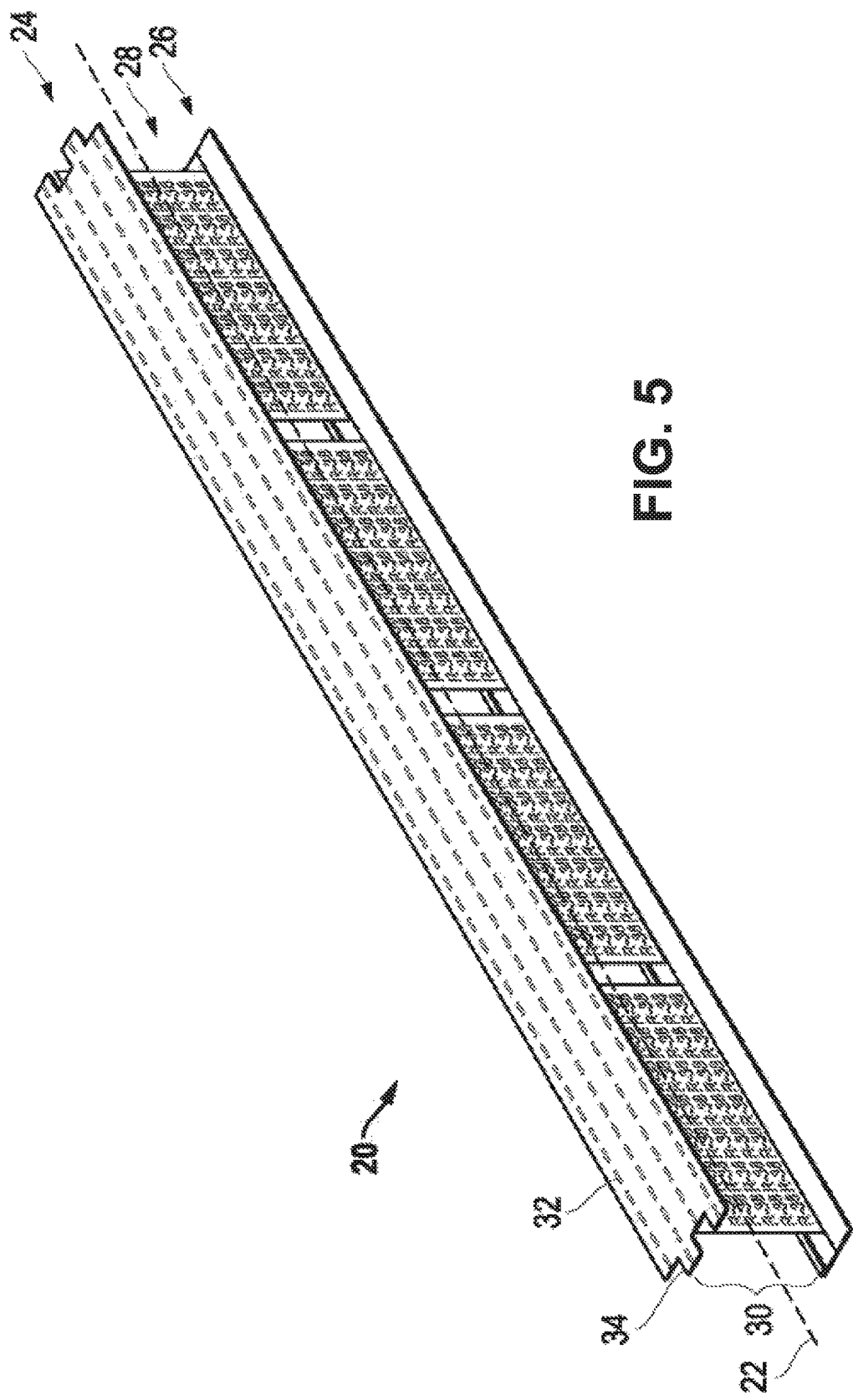
FIG. 5 is a top, front isometric view of another embodiment of a beam for supporting insulation.
Figure 6:
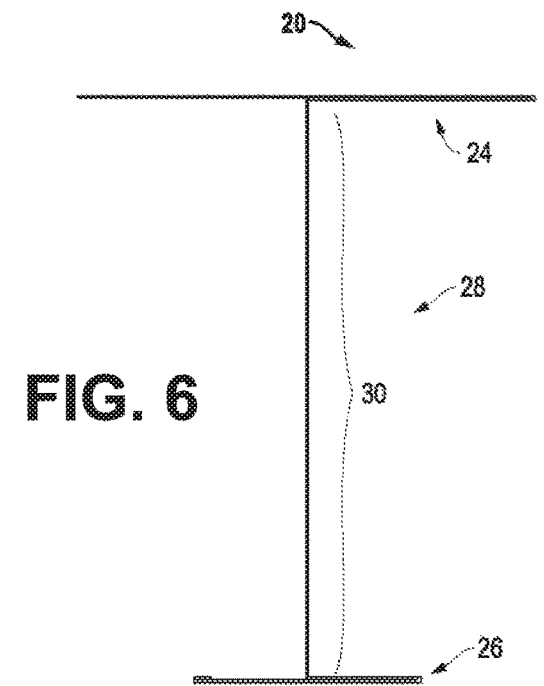
FIGS. 6-8 are end, front and top views, respectively, of the beam of FIG. 5.
Figure 7:
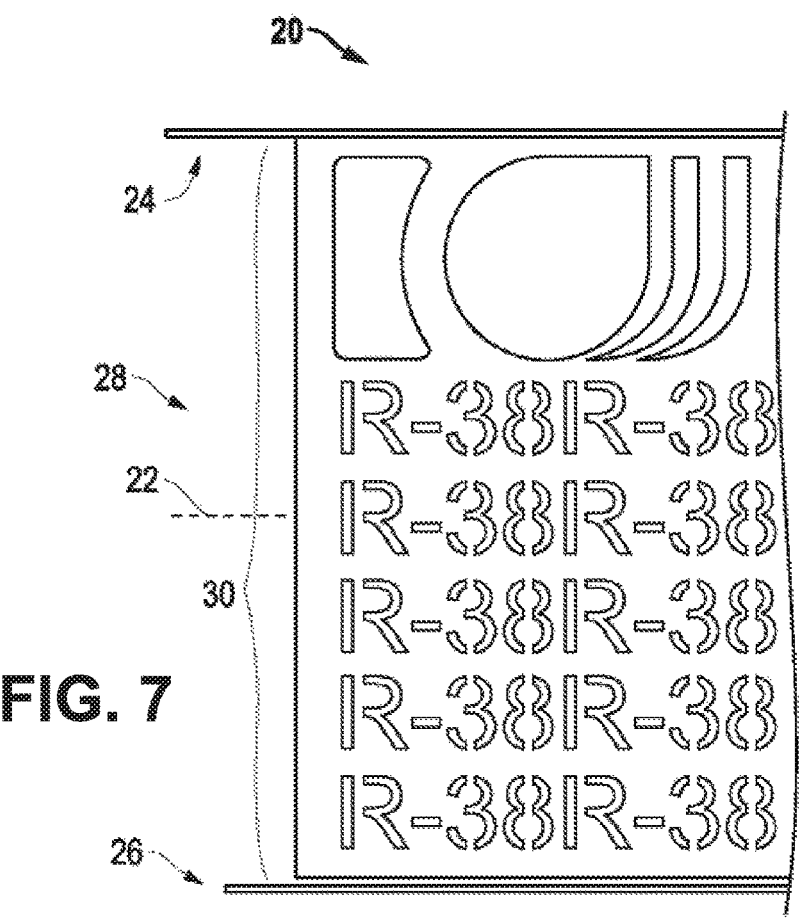
Figure 8:
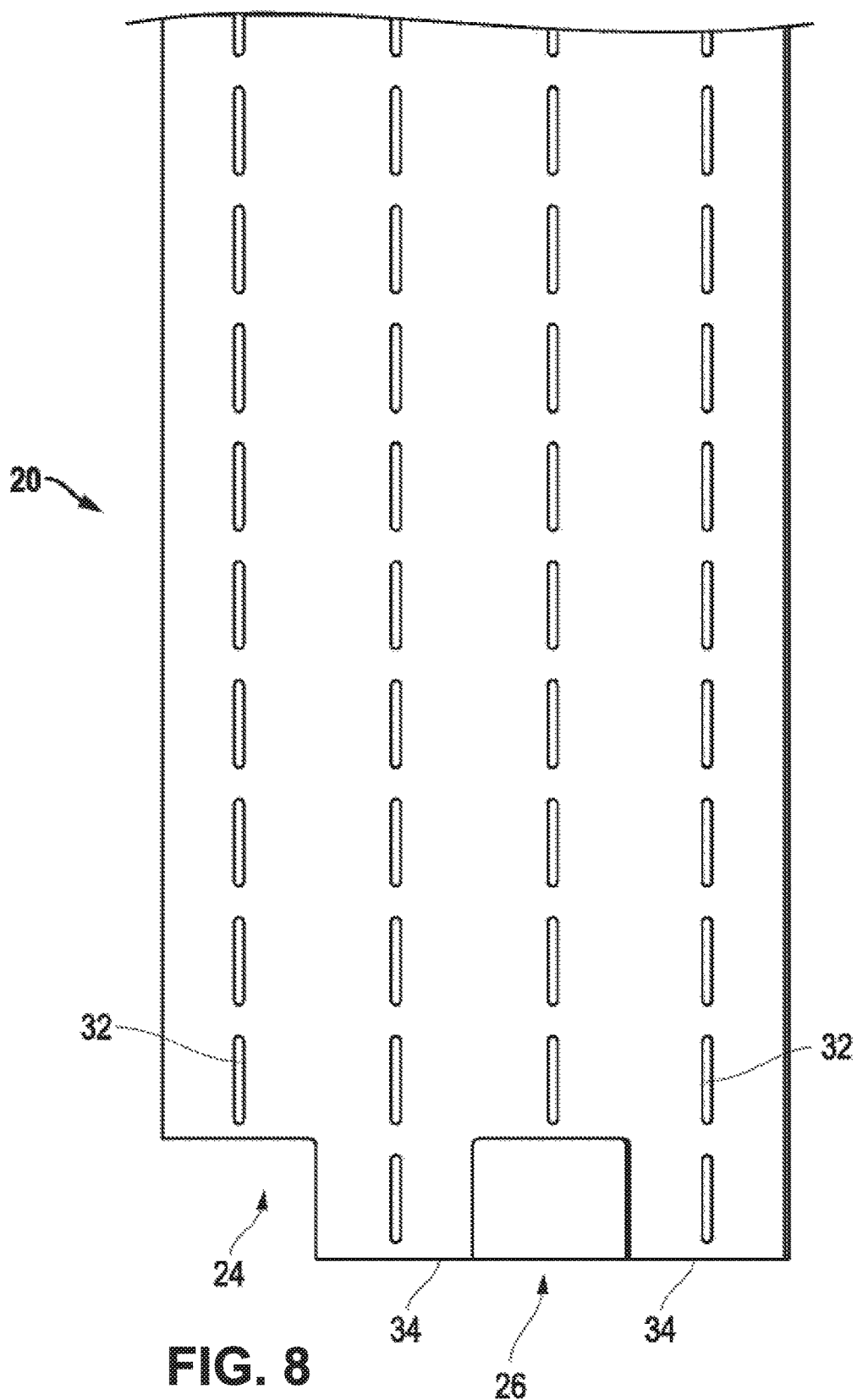

Embodiments of a system, method and apparatus for insulating adjacent a top of an attic are disclosed. For example, FIGS. 1-4 depict a hanger for supporting insulation in an attic having rafters that support a roof deck. The hanger may include a beam 20 having an axis 22 and an elongated profile in an axial direction. FIGS. 1-4 depict a J-beam version of the beam. FIGS. 5-9 depict an I-beam version of the beam 20. In addition, the beam may be a C-beam or an S-beam. For some applications, the I-beam or J-beam designs may be preferable since the flanges can support insulation on both sides of the beam. For other applications, one side of the C-beam or S-beam can secure the insulation between beams only by friction before stapling and taping the facing.

Versions of the elongated profile may include a proximal end 24. The proximal end 24 may be configured to be coupled only to the rafters but not to the roof deck. In one example, the proximal end 24 of the beam 20 may be attached only to bottom surfaces of the rafters.

The proximal end 24 can be planar and may be configured to be substantially parallel to the roof deck when installed. The elongated profile may further include a distal end 26. The distal end 26 can be substantially planar and parallel to the proximal end 24. In addition, the elongated profile may include a web 28. The web 28 can be substantially planar. The web 28 may extend substantially perpendicular to and between the proximal end 24 and the distal end 26.

An insulation space 30 may be defined along the web 28 between the proximal and distal ends 24, 26. As will be discussed in further detail, the distal end 26 may be configured to be coupled to an insulation batt located in the insulation space 30. The beam 20 may be configured to support fiberglass batts without any additional support members, such as strapping or support membranes.

Embodiments of the beam 20 may comprise a polymer. For example, the beam 20 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. Versions of the beam 20 may consist only of a polymer. In some embodiments, at least portions of the beam 20 can be at least one of extruded and injection molded. Examples of the beam 20 may be readily cut, such as with a manual tool like snips. In one example, the beams 20 are not metallic. Apertures or holes in the beam 20 may be employed to reduce its weight and reduce thermal bridge issues.

In other embodiments, portions of the beam 20 may be formed from more than one material, such as different materials. For example, a first portion of the beam 20 may include glass-reinforced PVC, and a second portion of the beam may include PVC. Portions of the beam 20 may have different coefficients of thermal expansion.

Versions of the beam 20 may include a specific coefficient of thermal expansion (CTE). For example, the CTE can be not greater than about 100E-06 in/(in·F), such as not greater than about 80E-06 in/(in·F), not greater than about 60E-06 in/(in·F), not greater than about 50E-06 in/(in·F), not greater than about 40E-06 in/(in·F), not greater than about 30E-06 in/(in·F), not greater than about 20E-06 in/(in·F), or even not greater than about 10E-06 in/(in·F). In other examples, the CTE can be in a range between any of these values.

In some embodiments, the beam 20 may subjected to a bending moment due to the attic truss design. For example, the maximum acceptable deformation may be expressed by the following description: with the beam positioned horizontally, attached by its proximal end to a rafter, for each linear foot of beam, the application of a load of 0.5 lb at the distal end, 10 inches from the proximal end of the beam, will impart a maximum vertical deflection of not greater than about 2 inches. This corresponds to an angle or deflection of about 5 degrees. In other embodiments, the maximum vertical deflection can be not greater than about 1 inch, or even not greater than about 0.1 inches (i.e., no perceived deformation).

The beam 20 can have any length between about 1 foot and about 20 feet. In some versions, the length of beam 20 can be about 6 feet to about 8 feet to better enable handling by only one person. The beams can be installed by the framers installing the attic trusses and the external roof sheathing. Insulation contractors can install the insulation and the tape. Such installation may be preferable for longer versions of the beams 20 (e.g., 8 feet and longer). For shorter versions of the beams (e.g., under 8 feet), it may be preferable for the insulation contractors to install both the beams 20 and the insulation.

Examples of the web 28 may, under its own weight, have a maximum deflection. In some versions, the maximum deflection of the web 28 can be about 10 degrees relative to normal with respect to the proximal end 24 and the distal end 26. In other examples, the maximum deflection can be about 8 degrees, such as about 6 degrees, about 5 degrees, about 4 degrees, about 3 degrees, about 2 degrees, or even about 1 degree. In other examples, the maximum deflection can be in a range between any of these values.

As noted above, examples of the beam 20 may be perforated to reduce weight, thermal expansion, shrinkage and thermal bridge issues. In some versions, the proximal end 24 may include perforations 32. Embodiments of the perforations 32 may include parallel rows of slits. The slits may be at least one of rounded, oblong and rectangular. In one example, the web 28 may be perforated. In another example, the distal end 26 is not perforated.

In some embodiments of the beam 20, each end of the elongated profile may comprises tabs 34 configured to engage a second beam 20. In one version, the tabs 34 may be located only on the proximal end 24.

Figure 9:
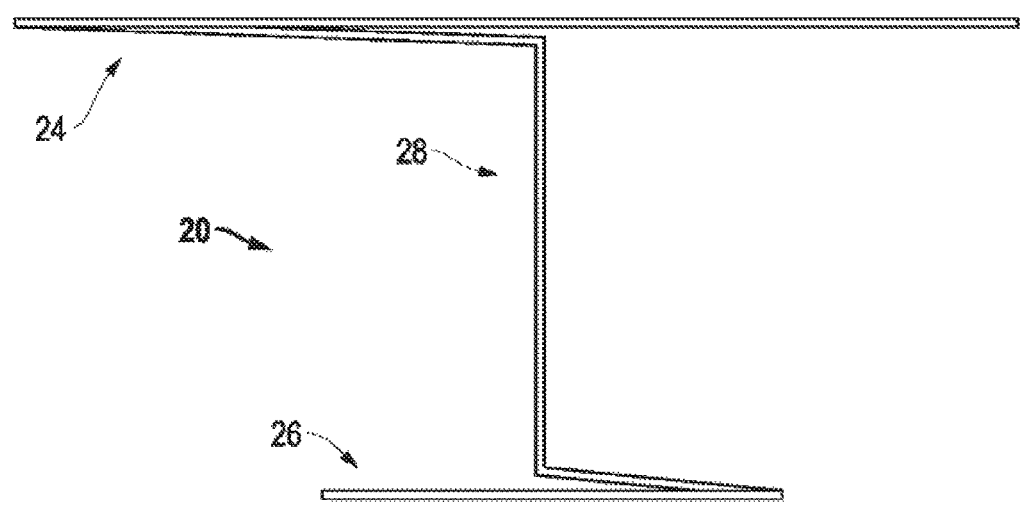
FIG. 9 is a schematic end view of the beam of FIG. 5 shown prior to final assembly.

As shown in FIG. 9, the beam 20 may comprise a single layer of material, such as polymer material. The material may be folded or thermoformed into a final sectional shape in the axial direction. In addition, the final sectional shape may be bonded, sonic welded or heat staked with ribbed edges. Alternatively, the beam 20 may be formed as a profile extrusion.

Figure 10:
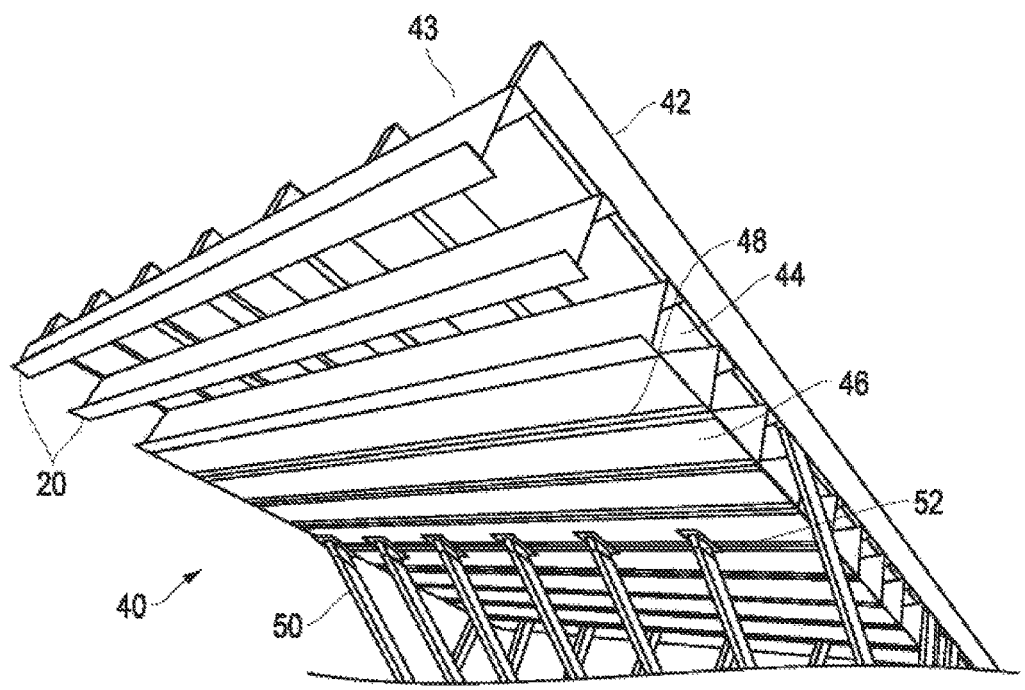
FIG. 10 is a bottom isometric view of an attic with an embodiment of a system for insulating the attic, and the system is shown partially installed.
Figure 11:
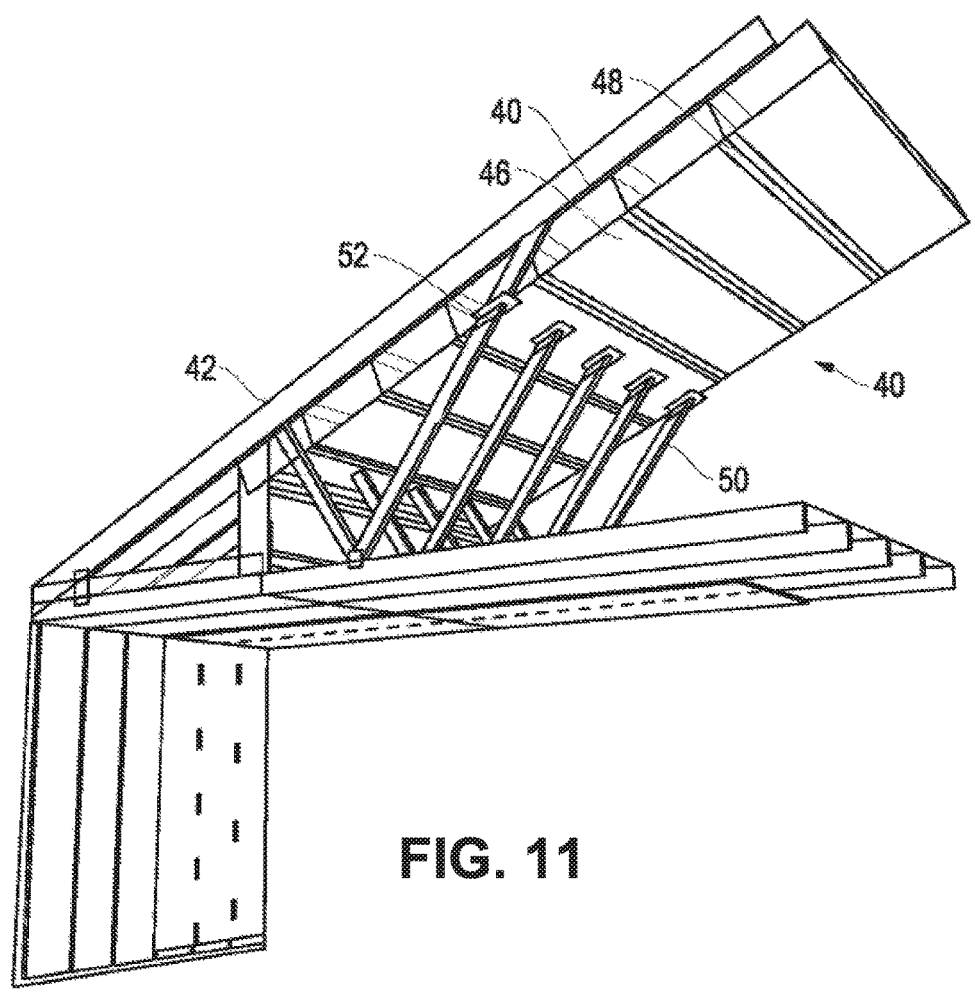
FIG. 11 is a bottom isometric view of an attic with another embodiment of a system for insulating the attic.

FIGS. 10 and 11 depict embodiments of a system for insulating an attic 40 of a building. The building may include a roof with a roof deck, and rafters 42 supporting the roof deck inside the attic 40. The system may include beams 20 for supporting insulation 44 in the attic 40. Each of the beams 20 may include features from any of the embodiments described herein. The beams 20 may be transverse to the rafters 42. The proximal ends 24 of the beams 20 may be mounted to the rafters 42 with fasteners, such as staples, nails or screws. The system may further include a ventilated air gap 43 between the roof deck and an upper portion of the system.

In some embodiments, the insulation may be placed below the rafters 42, and the ventilated air gaps 43 may be located between the soffit and the ridge vent at the top of the roof. Alternatively, ventilation openings (e.g., O'Hagin vents) may be employed directly on the roof sheathing. These solutions can permit the insulation to avoid moisture accumulation (regardless of the climate zone) using natural convection and wind. To limit convection in the insulation, ventilation baffles can be stapled to the roof sheathing to provide a continuous air gap between the soffit and the ridge vent, as is traditionally done with blown insulation. In another embodiment, a facing may be employed on one side of the insulation near the roof deck to limit convection. The other side of the insulation can employ the smart vapor retarder inside the building. The air gap is then ensured by the thickness of the rafters themselves. For example, a typical 2×4 beam would provide a 3.5 inch air gap. In other examples, if the rafters are 2×6 or 2×8 beams, ventilation baffles such as conventional, baffles with a 1.5 inch thickness can be stapled to the roof deck. For some applications, a first layer of insulation may be placed between the rafters, and a second layer of insulation may be placed below the rafters to increase the level of insulation and decrease the thickness of insulation installed below the rafters.

In some versions, the beams 20 may be installed perpendicular to the trusses as shown on FIG. 10, which limits thermal bridging. However, the beams 20 also may be installed parallel to the trusses.

The insulation 44 may comprise insulation batts mounted to and between adjacent ones of the beams 20 in the insulation spaces 30. Each of the insulation batts of insulation 44 may include an insulation material and an outer layer 46 that faces the distal ends 26 of the beams 20. Examples of the outer layer 46 may comprise at least one of a fire class A (required for exposed surfaces in U.S. building codes), a smart vapor retarder (SVR) and kraft paper. Alternatively, the batts of insulation 44 may be unfaced with one or more outer layers.

Embodiments of the system may further include a first tape 48. For example, the first tape 48 may comprise an all weather flashing tape, such as 3M 8067 tape, from 3M Company, St. Paul, Minn., for example, or CertaTape from CertainTeed of Malvern, Pa. Versions of the system may include the first tape 48 being applied to the distal ends 26 of the beams 20, and to the outer layers 46 of the insulation batts.

The first tape 48 may be used to form airtight barriers between the components of the system. Such airtight barriers may include an airtightness of ACH50<3. In other embodiments of the system, the airtightness and the airtight barriers may comprise ACH50<2.5. Other versions may include ACH50<2.5, such as ACH50<2.0, ACH50<1.6, ACH50<1.0, ACH50<0.8, or even ACH50<0.6. In still other example, the airtightness and the airtight barriers can be in a range between any of these values.

Figure 12:
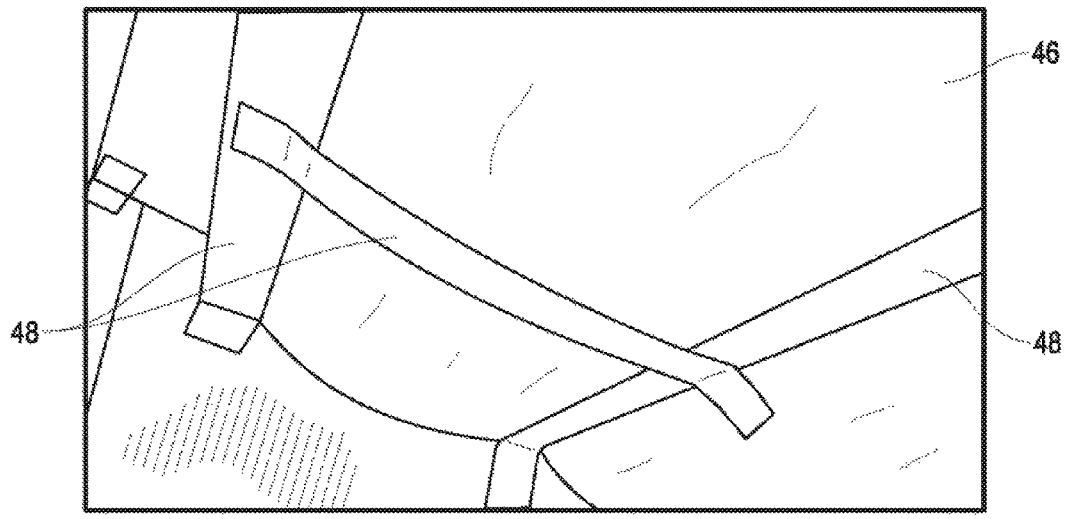
FIG. 12 is an enlarged, bottom isometric view of an attic with still another embodiment of a system for insulating the attic.

In some versions of the system, no material of the system extends between adjacent ones of the beams 20 other than the insulation batts that form insulation 44. For example, the system may include no other support members or support structures beneath the insulation 44, such as strapping, sheet barriers, etc. The facing of the insulation 44 may be stapled to the beams 20. The surface of the facing can be pulled straight in such a way that additional pieces are not required to correctly tape the junction between the batts. However, other versions of the system may include batt-only strips of tape 48 (FIG. 12) between abutting batt joints that are perpendicular to axes of the beams 20. In an example, the batt-only tape strips do extend between adjacent ones of the beams 20. In some versions, the batts of insulation 44 may be initially stapled to the beams 20 before taping.

Figure 13:
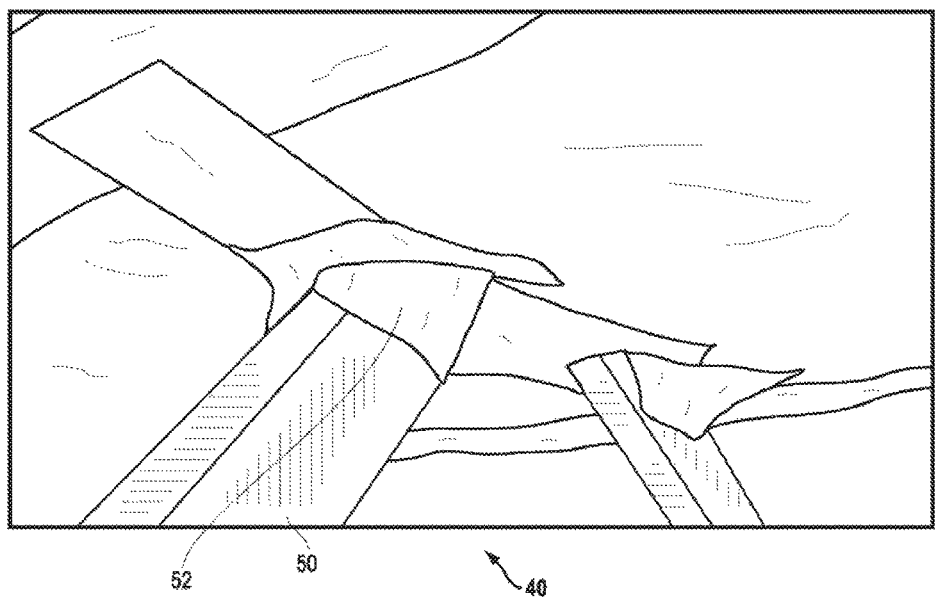
FIG. 13 is an enlarged, bottom isometric view of an attic with yet another embodiment of a system for insulating the attic.

In some applications, protrusions 50 (FIGS. 10, 11 and 13) of the attic 40 may extend through the batts of insulation 44. For example, the protrusions 50 may include other structural members, such as truss members, that further support the roof. Other examples of protrusions 50 may include vent pipes, plumbing components, ducts, conduits or other structures typically found in an attic or near a roof.

Tape 48 may be applied between the protrusions 50 and the batts of insulation 44. Tape 48 may form airtight barriers between these components. Versions of the airtight barriers comprise ACH50<3, or less, as described elsewhere herein.

Other embodiments of the system may further include a second tape 52 that differs from the first tape 48. For example, the second tape 52 may comprise a stretch tape. Stretch tape may include an elongation capability of at least about 100%. Examples of stretch tape may include CertaFlash stretch tape, by CertainTeed of Malvern, Pa., Isostretch tape from DuPont of Wilmington, Del., or ZIP System stretch tape, available from Huber Engineered Woods, Charlotte, N.C. The second tape 52 may be applied between the protrusions 50 and the batts of insulation 44 to form airtight barriers between the components. The airtight barriers comprise ACH50<3, or less, as described elsewhere herein.

Embodiments of a method of insulating the attic 40 of a building also are disclosed. For example, the method may include providing beams 20 comprising an elongated profile in an axial direction. Versions of the method may include fastening only proximal ends 24 of the beams 20 to the rafters 42. In some embodiments, the method includes positioning batts of insulation 44 on distal ends 26 of adjacent ones of the beams 20. Each of the batts of insulation 44 may include an insulation material and an outer layer 46 facing the distal ends 26 of the beams 20. The outer layer 46 may comprise an airtightness of ACH50<3, or better, as described herein.

Examples of the method may further include applying the first tape 48 to the distal ends 26 of the beams 20, and to the outer layers 46 of the batts of insulation 44. Airtight barriers may be formed between these components, as described herein. The airtight barriers comprising the airtightness of ACH50<3, or better, as previously discussed. In one embodiment, the method may further comprise extending no material between adjacent ones of the beams other than the insulation batts.

Figure 17:
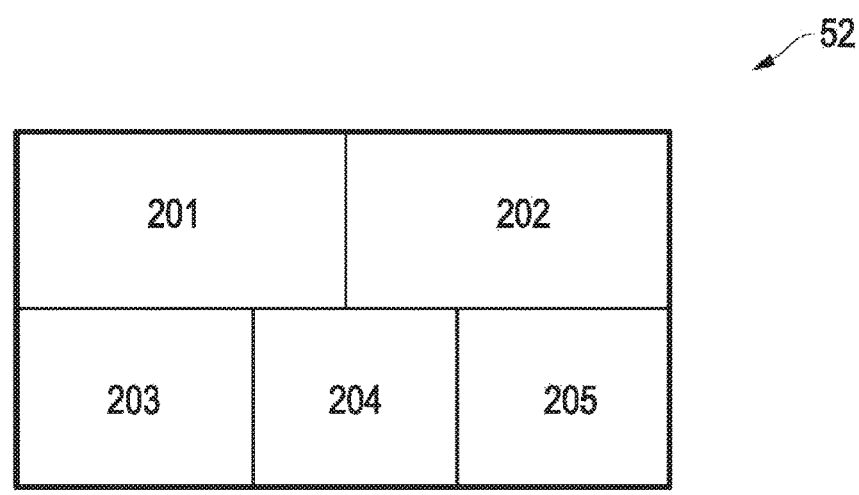
FIG. 17 is schematic view of an embodiment of tape showing release paper segments.

FIG. 17 depicts an embodiment of a back side of the second tape 52, showing its release liner in segments 201-205 that are pre-slit. Methodically removing the segments 201-205 and applying the second tape 52 to a protrusion 50 (FIG. 13) that extends through an insulation batt (as described herein) to form a substantially airtight seal significantly enhances installation speed and efficiency.

For example, the following sequence of steps represents an embodiment of a method of the application of the second tape 52. In one version, segment 204 is removed first. Segment 204 is about 2 inches wide so that it can be applied to and go around protrusions (e.g., rafters, trusses, etc.) having a width of 1.5 inches. With segment 204 removed, the second tape 52 can be applied on the front face of the protrusion. Next, segments 203 and 205 are removed so that second tape 52 can be stretched on the sides of the protrusion. In a final step, segments 201 and 202 are removed and the second tape 52 is stretched on the facing of the insulation batts.

In an alternate embodiment, the release liner on the back of the second tape 52 may include a single bisecting slit in the long direction. In this example, the bottom half of the liner (equivalent to the combination of segments 203-205) may be removed first. The second tape 52 would then be stretched and applied to the protrusion. The top half of the liner is then removed (equivalent to the combination of segments 201 and 202), and the second tape 52 would be stretched and applied to the insulation batt.

Figure 14:
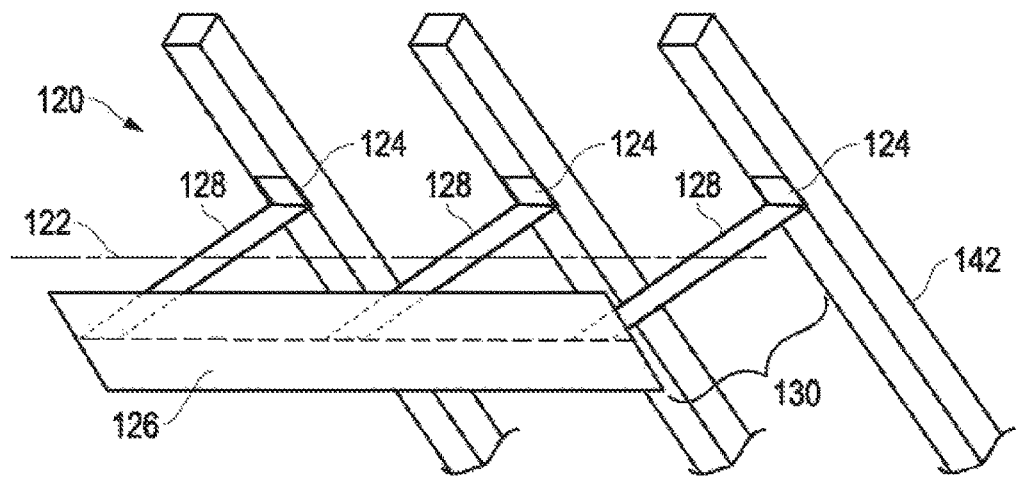
FIG. 14 is a bottom isometric view of an attic with an alternate embodiment of a system for insulating the attic.
Figure 15:
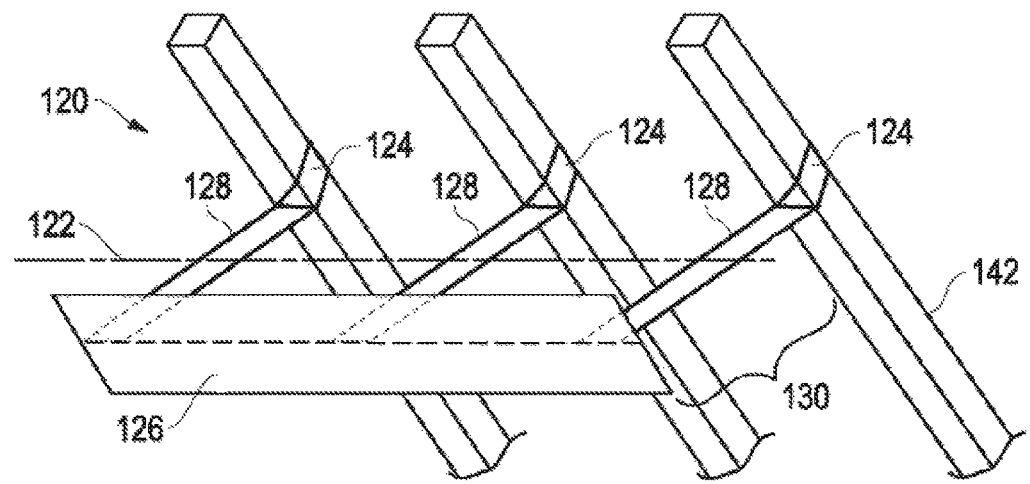
FIG. 15 is a bottom isometric view of an attic with another alternate embodiment of a system for insulating the attic.
Figure 16:
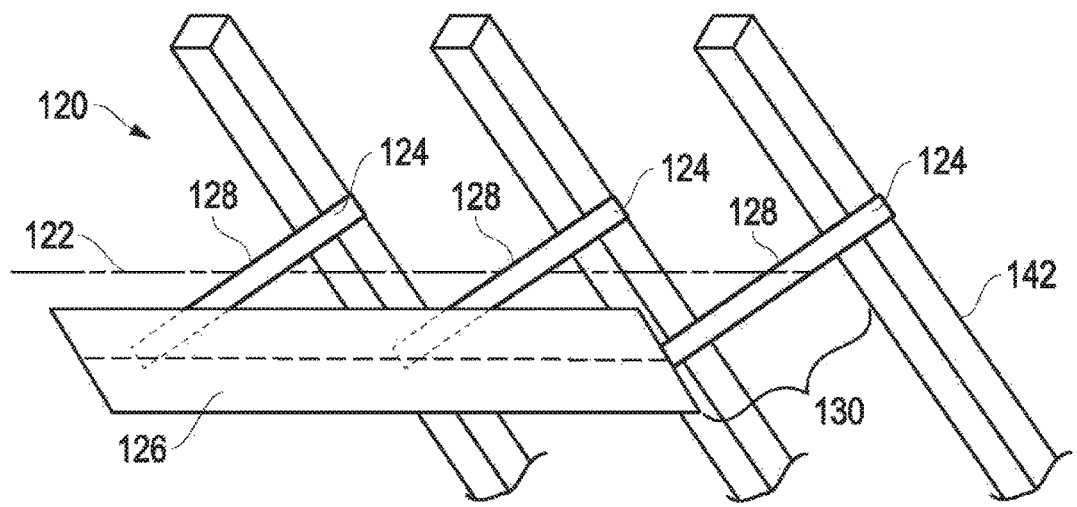
FIG. 16 is a bottom isometric view of an attic with still another alternate embodiment of a system for insulating the attic.

FIGS. 14-16 depict alternate embodiments of hangers. Such hangers may include a beam 120 having an axis 122 and a profile in the axial direction. The profile may include a distal end 126 that is elongated in the axial direction and substantially planar. The profile may further include straps 128 that extend from the distal end 126. The straps 128 can be substantially planar and perpendicular to the distal end 126. However, the straps 128 may be oriented to any angle about their respective axes while still remaining planar and perpendicular to the distal end 126. In other embodiments, the straps 128 can be non-planar, such that they include a twist about their respective axes. For example, the twist may be in a range of about 1 degree to about 90 degrees.

Each strap 128 also may include a proximal end 124 that is planar and configured to be coupled to a respective attic rafter 142. An insulation space 130 may be defined along the straps 128 between the proximal ends 124 and the distal end 126. The distal end 126 may be configured to be coupled to one or more batts of insulation located in the insulation space 130.

As shown in FIG. 14, the proximal ends 124 may be substantially parallel to the distal end 126. The proximal ends 124 may be configured to be substantially parallel to the roof deck when installed. In FIG. 14, the proximal ends 124 may be configured to attach to only bottom surfaces of the rafters 142.

In FIG. 15, portions of the proximal ends 124 and straps 128 are shown to be substantially perpendicular to the distal end 126. Other portions of the proximal ends 124 may be parallel to the distal end 126. Planes defined by the straps 128 may be configured to be perpendicular to vertical planes defined along the axial lengths of the rafters 142. However, as shown in FIG. 16, planes defined by the straps 128 may be configured to be parallel to vertical planes defined along the axial lengths of the rafters 142.

In FIGS. 15 and 16, the proximal ends 124 may be configured to attach to bottom surfaces and side surfaces of the rafters 142, or only to side surfaces of the rafters 142. In other versions, the proximal ends 124 may envelope the exposed surfaces of the rafters 142. Alternate embodiments of the proximal ends 124 may comprise stoppers to make positioning the beams 120 easier. For example, in some versions, the beam 120 may be pushed against the rafter 142 and it stops at the right position because of the stopper, with no need to further measure the position of the beam 120.

Beams with straps also may provide smaller surface contact and have higher bending stress. The beams with straps may comprise an extruded T-shape, or an injection molded shape. However, such designs stiffen the junction between the straps and the rafters, and may provide better mechanics against bending under their own weight. In some versions, the batts of insulation may have to be cut or slit to avoid holes and thermal bridges.

Embodiments of such hanger designs may comprise a selected thickness, such as about 1/32 inch, about 1/16 inch, or about 1/8 inch. Suitable materials may include polyvinylchloride (PVC), foamed PVC, CPVC, PVC reinforced with fillers (e.g., $CaCO_3$, glass fibers, etc.), and glass reinforced Acrylonitrile butadiene styrene (ABS), for example.

Embodiments of an alternative system, method and apparatus for insulating adjacent a top of an attic are disclosed. For example, FIGS. 17 and 27-30 are well suited for geographic regions regulated by earthquake safety requirements. In earthquake regions, insulation hangers cannot be braced such that they have fixed junctions between the hangers and the attic structure. In other words, the hangers and attic structure must move independently. Thus, the present design employs sliding surfaces which not only comply with earthquake regulations but also accommodate for thermal contraction and expansion of the components. These embodiments may be lighter and more flexible for temperature variation of the roof. These designs may lower the risk of nail popping than a continuous beam attached to the rafters, which can move with moisture and heat. They also reduce the bracing between trusses, which is required for earthquake regions, to allow the trusses to move independently and give more elasticity to the roof to absorb vibrations.

Figure 18:
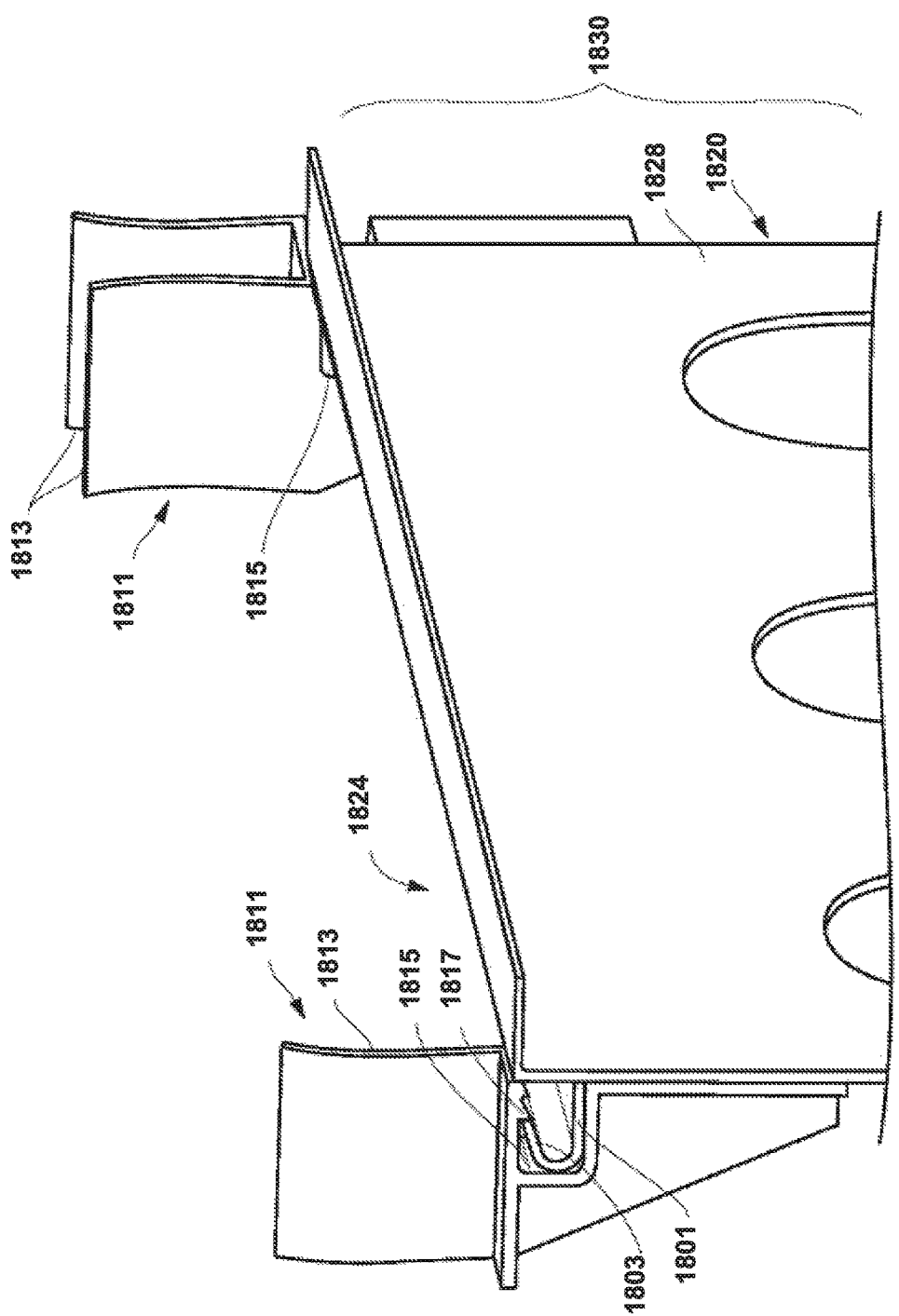
FIG. 18 is a top, front isometric view of another embodiment of a hanger for attic insulation, shown partially sectioned on one end.

FIG. 18 depicts an embodiment of a system and method of attaching beams 1820 to attic rafters. For example, beams 1820 may include a proximal end 1824, a distal end (not shown), a web 1828 and an insulation space 1830. The proximal end 1824 may include a feature, such as a rib 1801. Embodiments of the rib 1801 may extend from one side of the proximal end 1824. The rib 1801 may terminate with a lip 1803 that turns back toward the proximal end 1824.

In addition, embodiments of the system may include brackets 1811. The bracket 1811 on the left of FIG. 18 is shown partially sectioned for ease of understanding. Each bracket 1811 may be provided with features for attachment to the rafters. For example, the features may include rafter clips 1813 for closely receiving (e.g., via interference fit) the rafters. The rafter clips 1813 can be enabled to support the weight of the brackets 1811 prior to permanent attachment. In one version, the rafter clips 1813 may be further secured to the rafters with fasteners, such as staples or screws.

In another example, the clips 1813 may include teeth or the like to hold the weight of the beams and the insulation without the use of additional fasteners. The brackets 1811 may be aligned along a line (e.g., chalk or laser line) on the rafters. In another embodiment, the outermost brackets 1811 at ends of the beam 1820 may be pre-attached to the beam 1820, and the brackets 1811 are then attached to the rafters. Additional brackets 1811 may be added, such as at every second or third truss. The pre-attachment of the brackets 1811 to beam 1820 may provide a similar advantage as the previously described J-beams, which permit quick alignment of all of the elements of the system without having to use a chalk line or laser, with only a small risk of slight misalignment.

Embodiments of the brackets 1811 may receive at least a portion of the proximal ends 1824, such as the rib 1801 of proximal end 1824, so that the beam 1820 is clipped into the brackets 1811. No additional tools or fasteners are needed to secure the beams 1820, in some embodiments. This enables movement for the beam 1820 for thermal expansion or shrinkage, and avoids bracing for earthquakes.

Versions of the brackets 1811 may include rib clips 1815 for receiving the rib 1801. The rib clips 1815 may be provided with an engagement feature, such as a tooth or teeth 1817. Teeth 1817 may be provided to engage and further secure the lip 1803 within the rib clips 1815.

Figure 27:
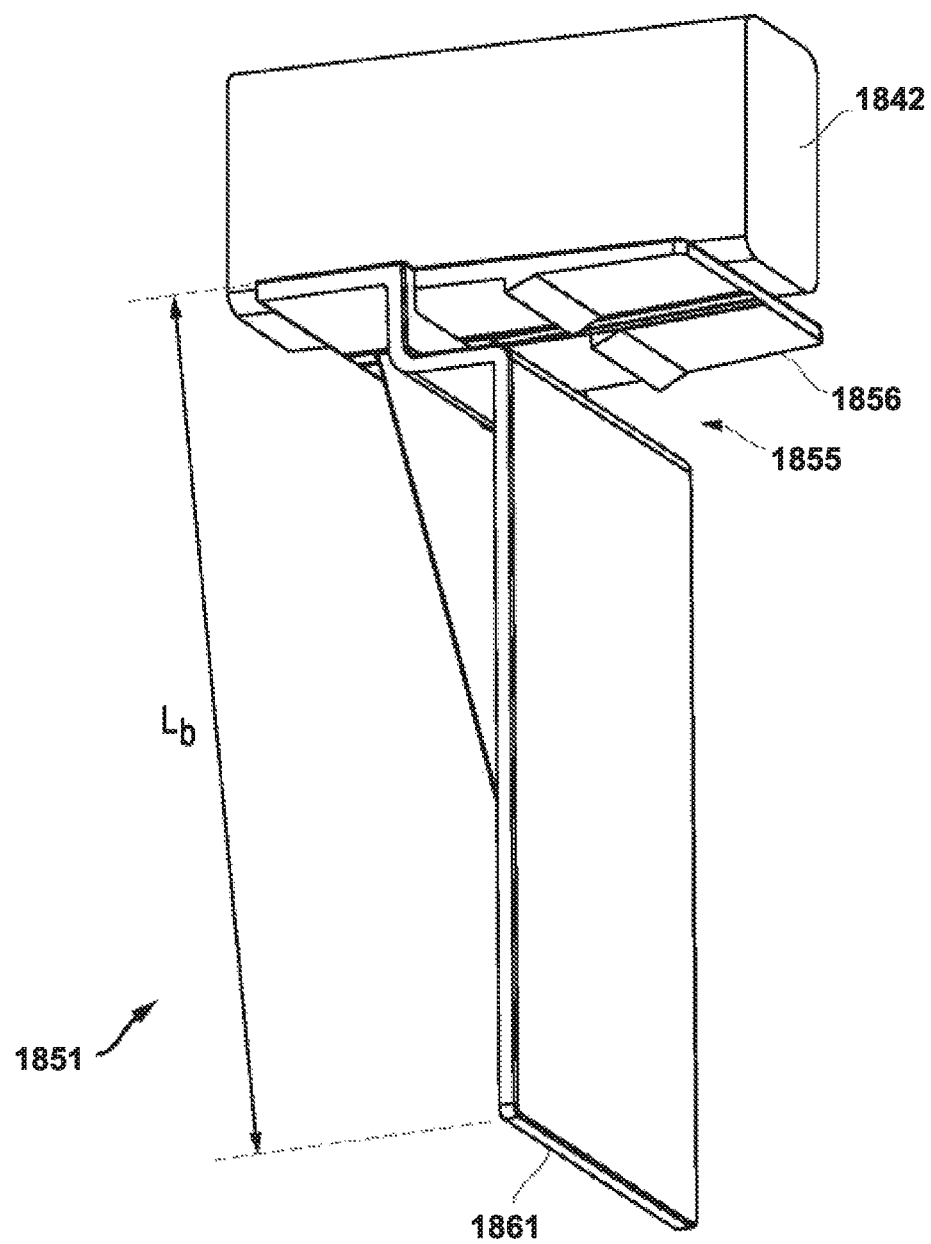
FIG. 27 is a bottom isometric view of an alternate embodiment of a bracket for the hanger of FIG. 18.

FIG. 27 depicts an alternate version of this design as bracket 1851. Bracket 1851 also is configured to be mounted to an attic rafter 1842, as shown. An upper portion 1856 of the rib clip 1855 is extended compared to that of bracket 1811. Like bracket 1811, bracket 1851 engages rib 1801 of beam 1820. However, upper portion 1856 is configured to further engage even more of proximal end 1824 of beam 1820 that bracket 1811. Bracket 1851 may otherwise be configured as described herein for bracket 1811.

Figure 28:
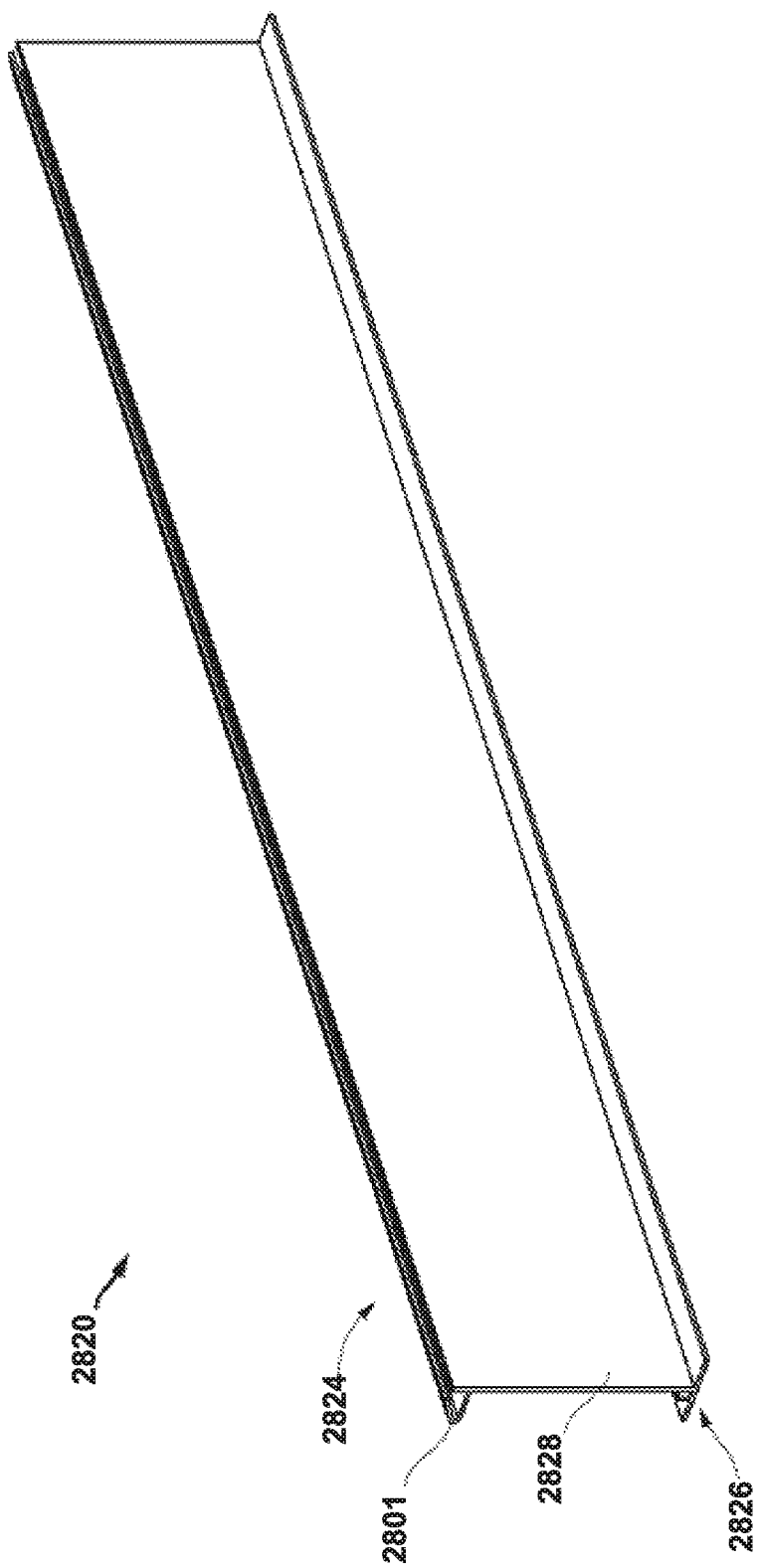
FIGS. 28 and 29 are isometric and end views, respectively, of another embodiment of a hanger.
Figure 29:
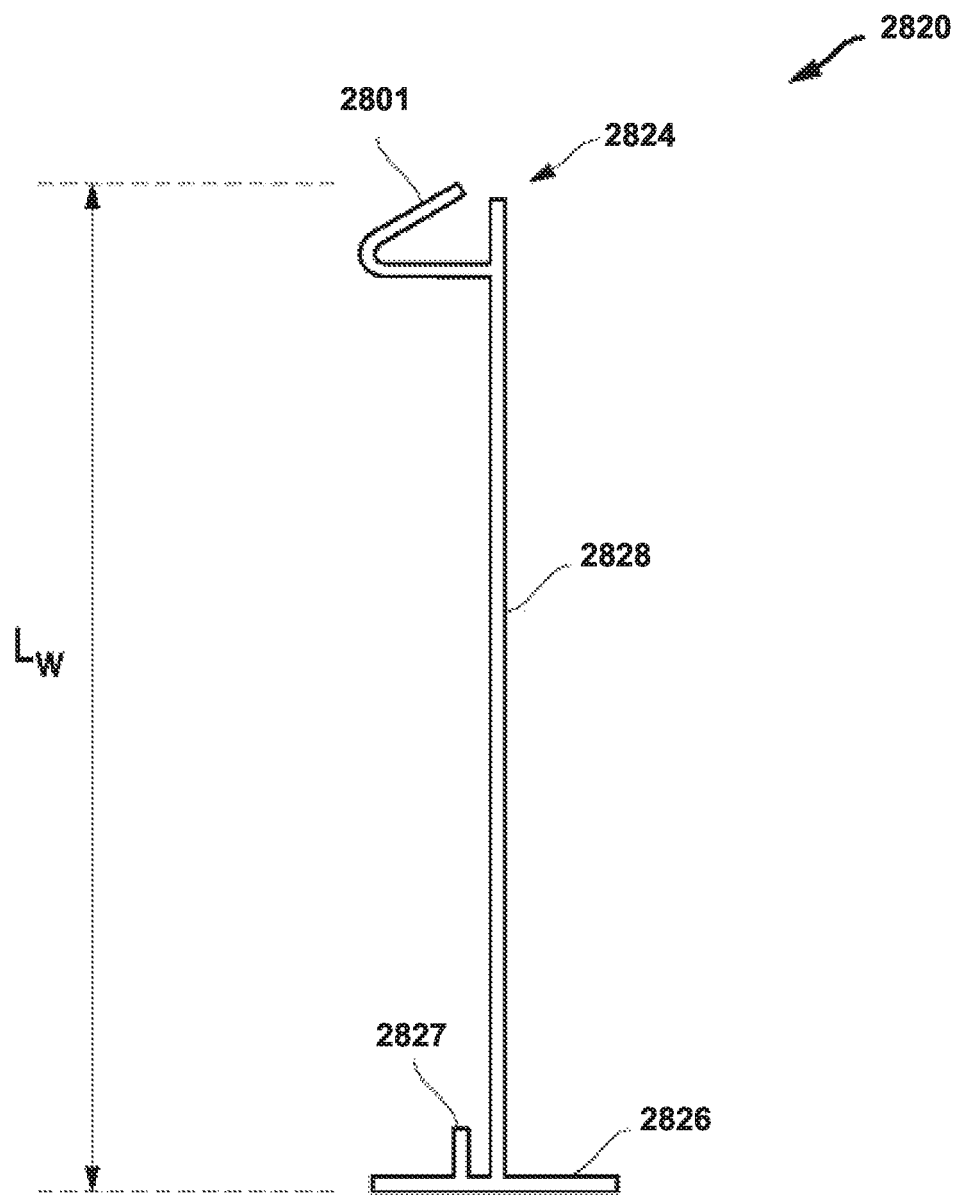

FIGS. 28 and 29 depict another embodiment of a hanger 2820. Hanger 2820 also is a J-beam design having a proximal end 2824 with a rib 2801, a distal end 2826 and a web

Figure 30:
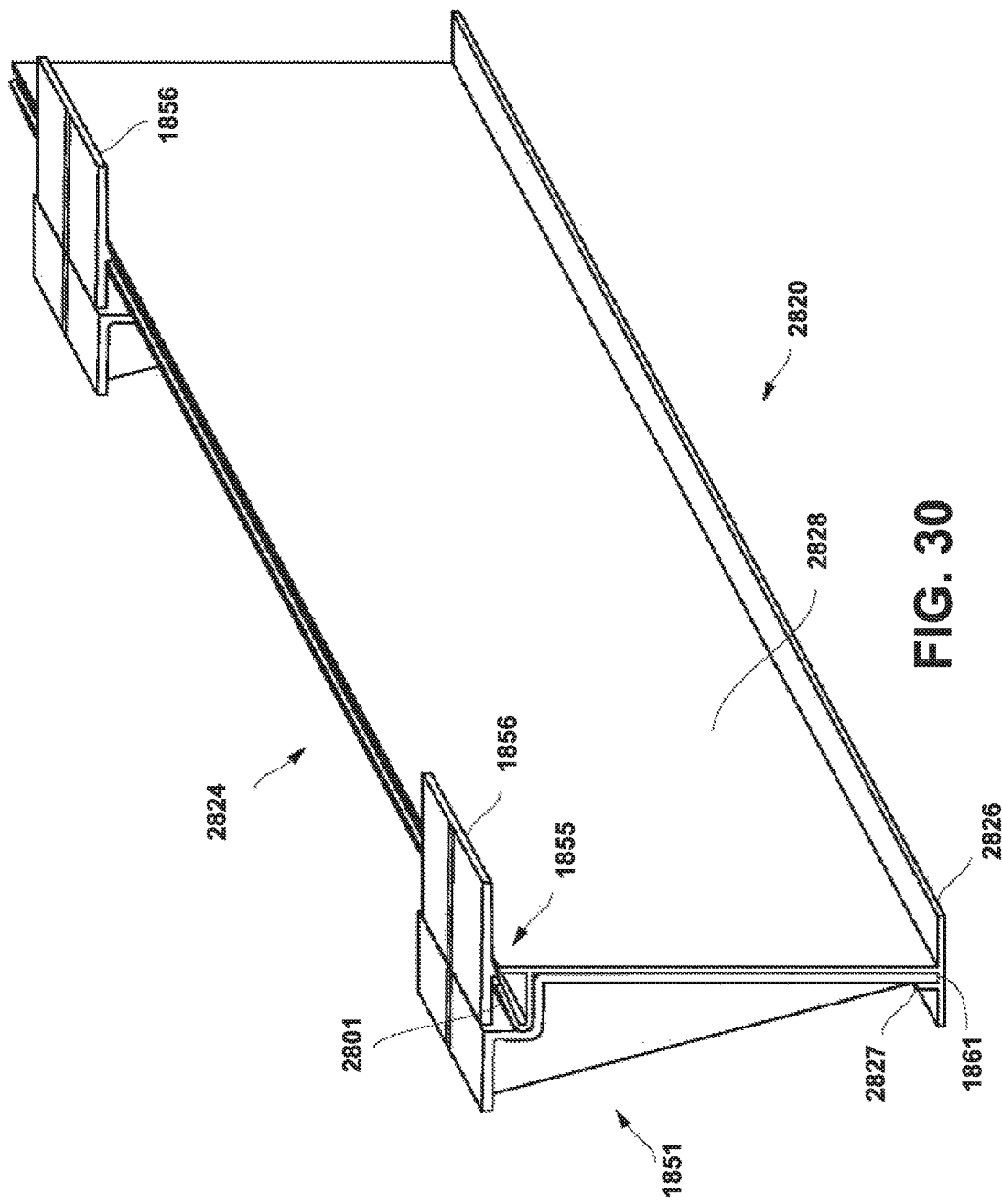
FIG. 30 is an isometric view of an embodiment of an assembly of the brackets and hanger of FIGS. 27-29.

2828. A length Lw of web 2828 may be sized to match the length Lb (FIG. 27) of bracket 1851, in some versions. In addition, distal end 2826 may comprise a small vertical flange 2827. As depicted in FIG. 30, flange 2827 may be parallel to web 2828 and configured to capture the lower edges 1861 of bracket 1851. Thus, flange 2827 helps stabilize and restrain hanger 2820 by the brackets 1851, no matter the installation angle.

Embodiments of such hanger designs may comprise a selected thickness, such as about 1/32 inch, about 1/16 inch, or about 1/8 inch. Suitable materials may include polyvinylchloride (PVC), foamed PVC, CPVC, PVC reinforced with fillers (e.g., $CaCO_3$, glass fibers, etc.), and glass reinforced Acrylonitrile butadiene styrene (ABS), for example.

Figure 19:
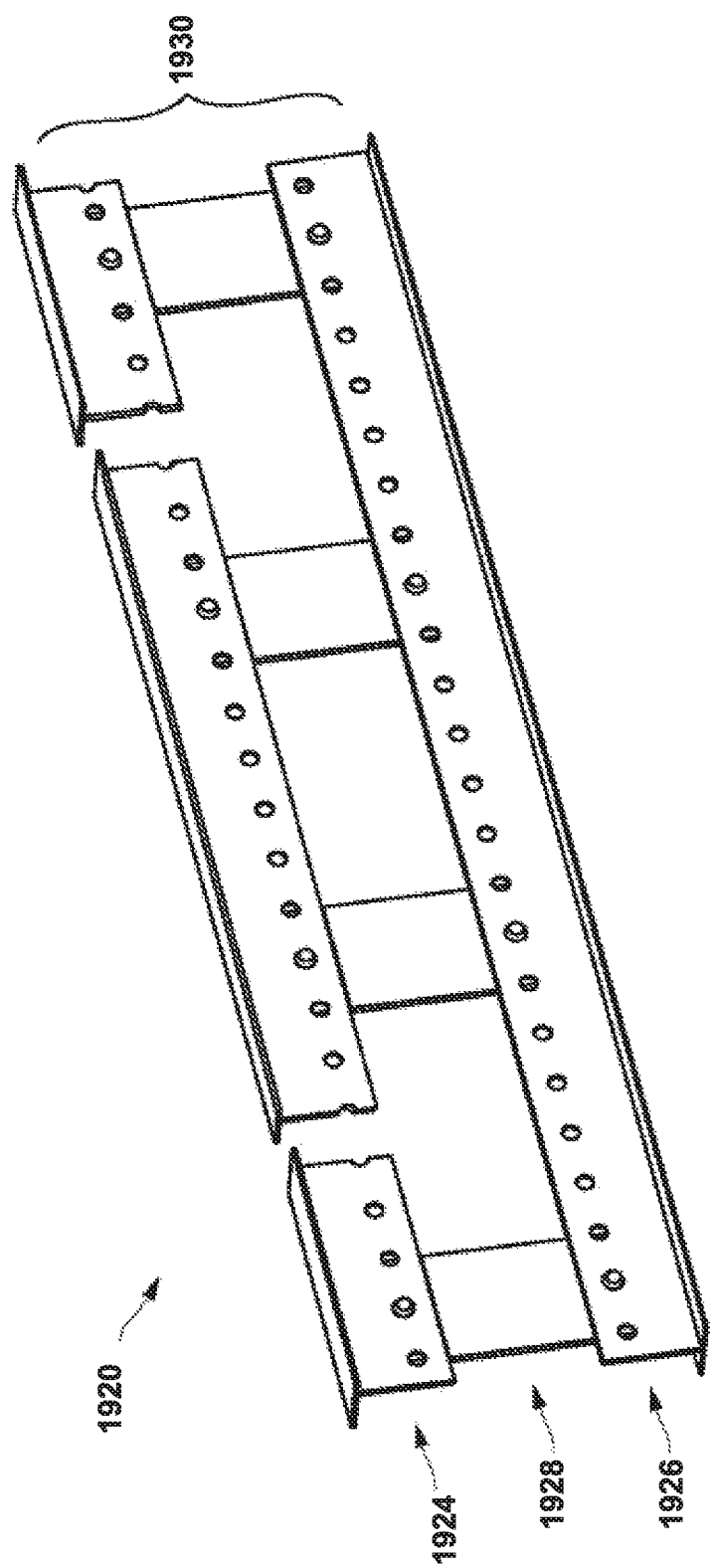
FIGS. 19 and 20 are top, front isometric views of another embodiment of a hanger shown in installation and folded positions, respectfully.
Figure 20:
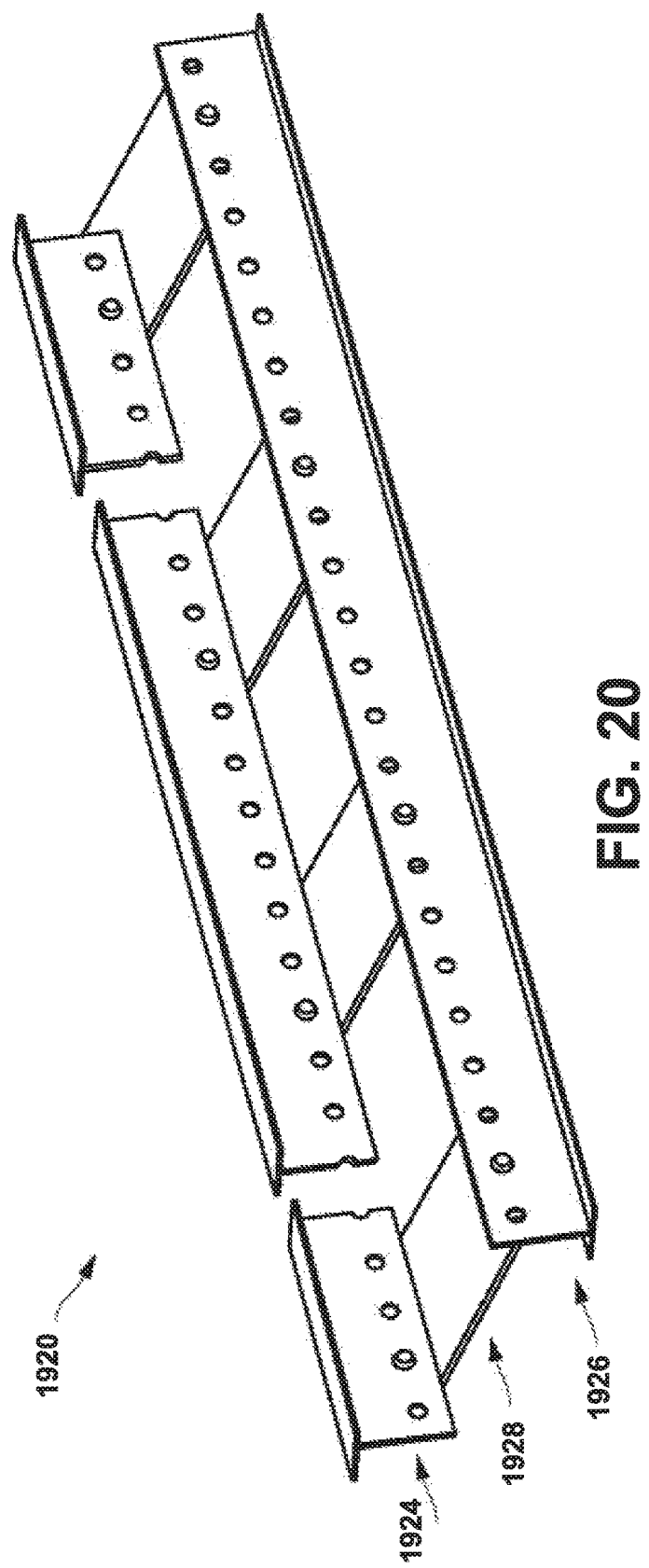
Figure 21:
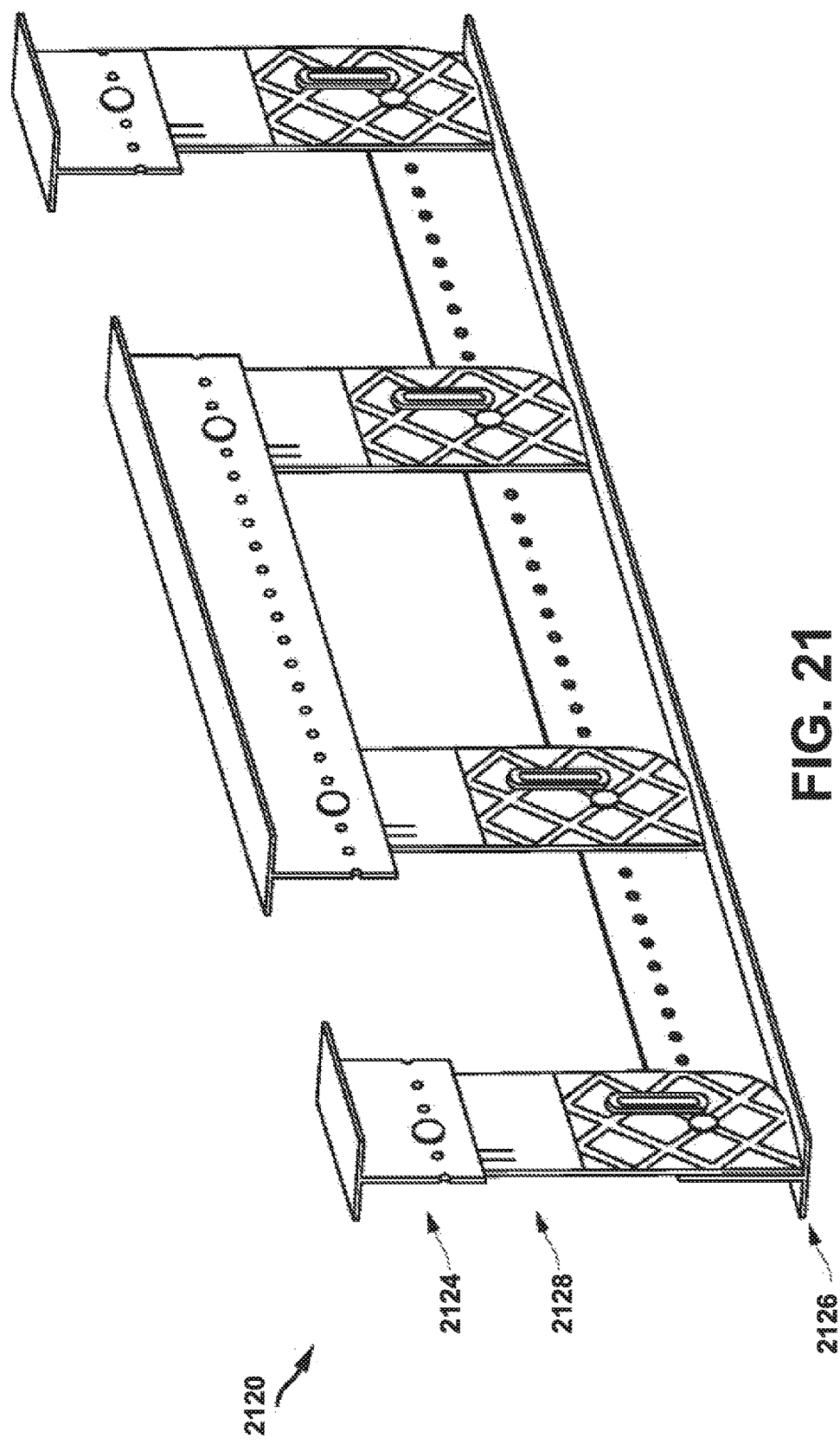
FIGS. 21 and 22 are top, front isometric views of another embodiment of a hanger shown in installation and folded positions, respectfully.
Figure 22:
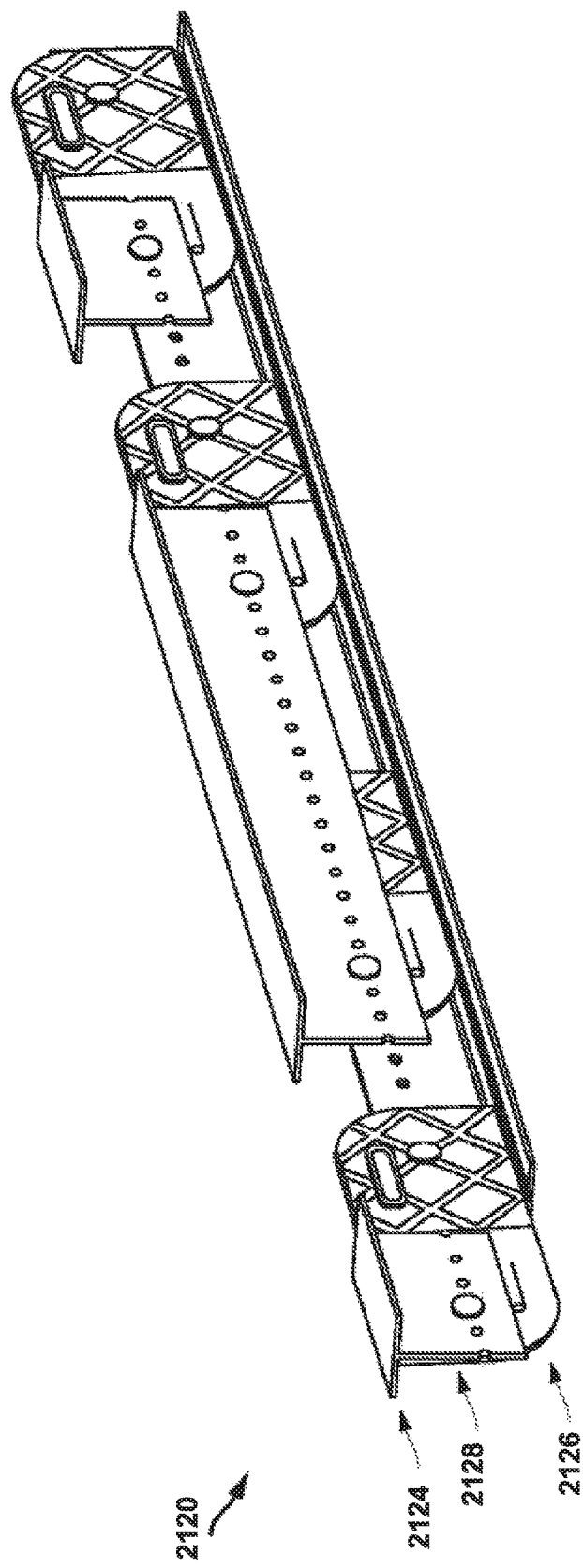

FIGS. 19 and 20 depict another embodiment of a hanger. Beam 1920 may include a proximal end 1924 configured to be coupled to the rafters, a distal end 1926 spaced apart from the proximal end 1924, and a web 1928 (e.g., web segments, as shown) with an insulation space 1930 extending between the proximal end 1924 and the distal end 1926. The proximal end 1924 may be segmented as shown or in other segmented configurations since it will be subjected to thermal cycles, expansion and contraction during use. Alternatively, the proximal end 1924 may comprise a single, continuous structure and formed from a material with a low coefficient of thermal expansion.

Embodiments of the beam 1920 also may include an installation position (FIG. 2) wherein the web 1928 is substantially perpendicular to the proximal and distal ends 1924, 1926. In addition, the beam 1920 may include a folded position (FIG. 20) wherein the beam 1920 is at least partially folded (e.g., about pivots), such that the web 1928 is no longer substantially perpendicular to the proximal and distal ends 1924, 1926.

Optionally, the beam 1920 may be configured to lock in one or more places once it is moved from the folded position toward or to the installation position to prevent it from folding again. The folded position may be used for a number of purposes. For example, when completely folded, the proximal end 1924, distal end 1926 and web 1928 may be almost or substantially parallel to each other. The completely folded position may be suitable for packaging and shipping. Beam 1920 also may comprise various partially folded positions, each of which may be secured from further movement by a locking feature or mechanism. Such partially folded positions may be suitable for accommodating various thicknesses of insulation. For example, in the position of FIG. 20, the beam 1920 may be suitable for supporting about 6 inches of insulation instead of about 10 inches of insulation is the installed position.

FIGS. 21-24 depict an alternate embodiment of FIGS. 19 and 20. Beam 2120 may include a proximal end 2124, a distal end 2126 and a web 2128 (e.g., web segments, as shown). The proximal end 2124 may be segmented as shown or in other segmented configurations. Alternatively, the proximal end 2124 may comprise a single, continuous structure and formed from a material with a low coefficient of thermal expansion.

Embodiments of the beam 2120 also may include an installation position (FIGS. 21 and 24) wherein the web 2128 is substantially perpendicular to the proximal and distal ends 2124, 2126. In addition, the beam 2120 may include a folded position (FIG. 22) wherein the beam 2120 is at least partially folded (e.g., about pivots), such that the web 2128 is no longer substantially perpendicular to the proximal and distal ends 2124, 2126.

Figure 23:
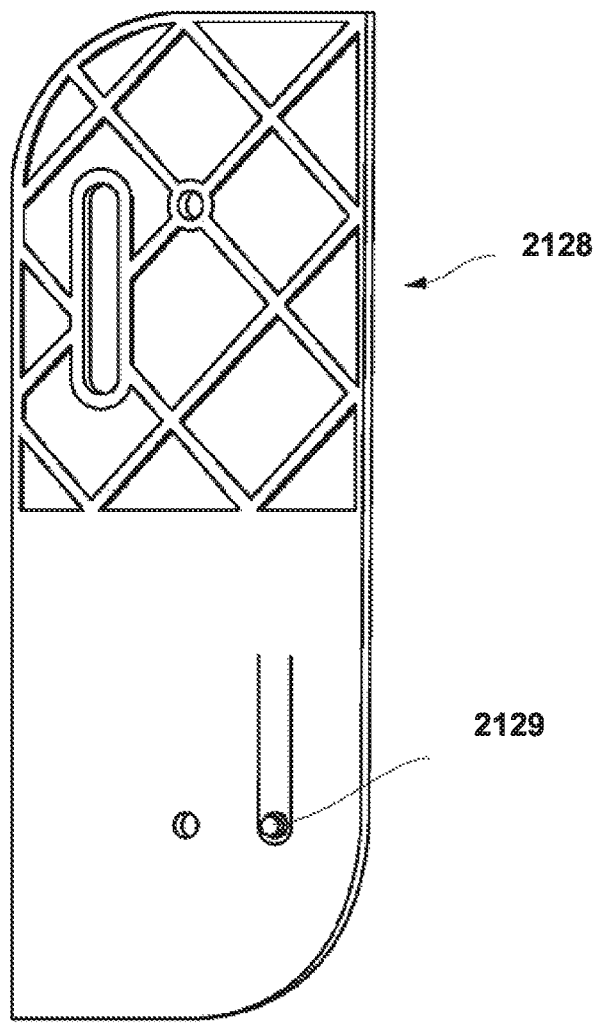
FIG. 23 is a front view of a component of the hanger of FIGS. 21 and 22.
Figure 24:
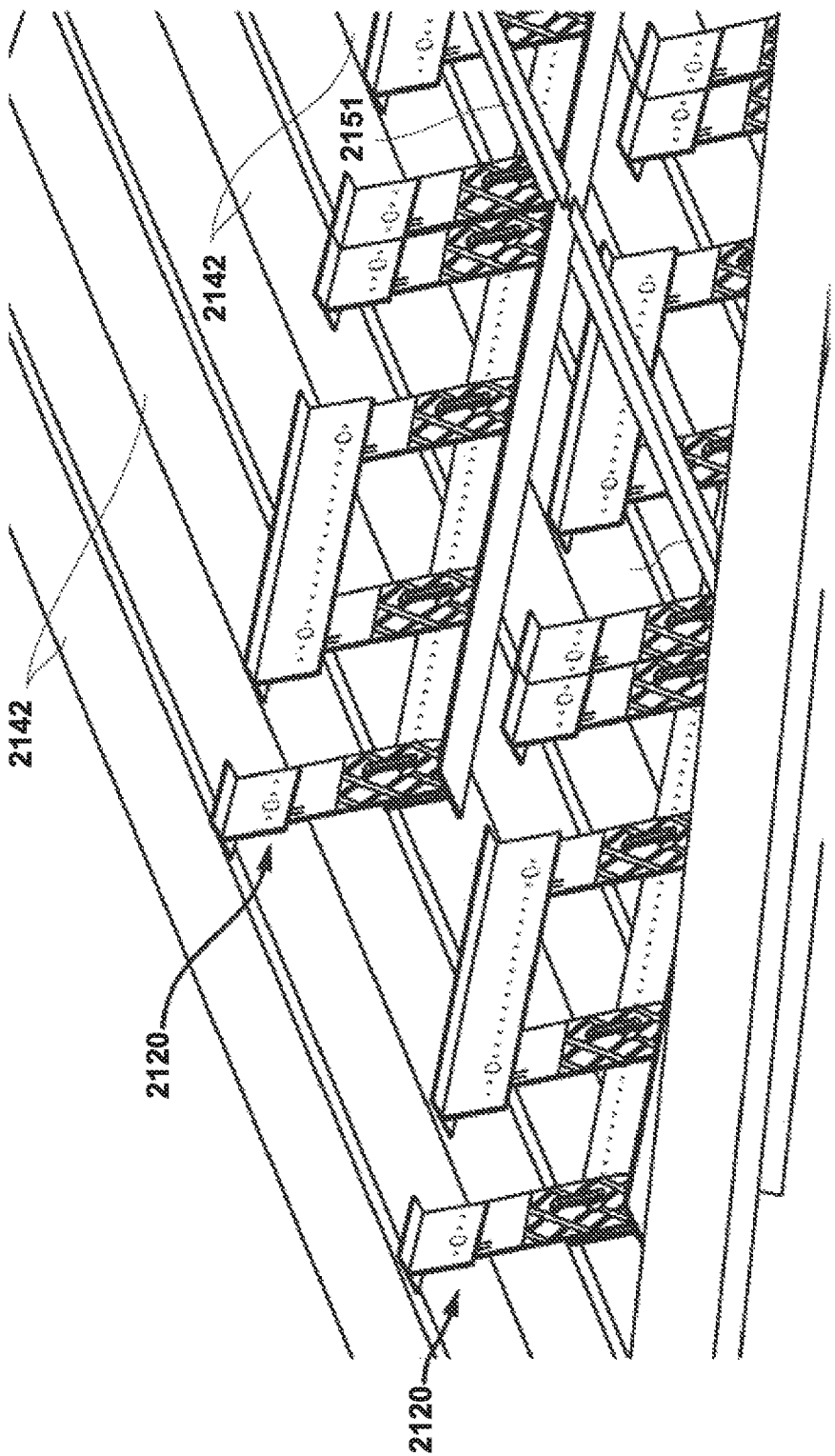
FIG. 24 is a lower isometric view of an installation of the hangers of FIGS. 21 and 22.

Optionally, the beam 2120 may be configured to lock in one or more places once it is moved from the folded position toward or to the installation position to prevent it from folding again. For example, FIG. 23 depicts a web segment of web 2128 having cantilevered detent 2129 that may be configured to snap into a hole in the distal end 2126 at a selected position. When beams 2120 are installed on joists 2142 (FIG. 24) of an attic (as described elsewhere herein), some embodiments of adjacent beams 2120 may be reinforced together by rails 2151, as shown.

Figure 25:
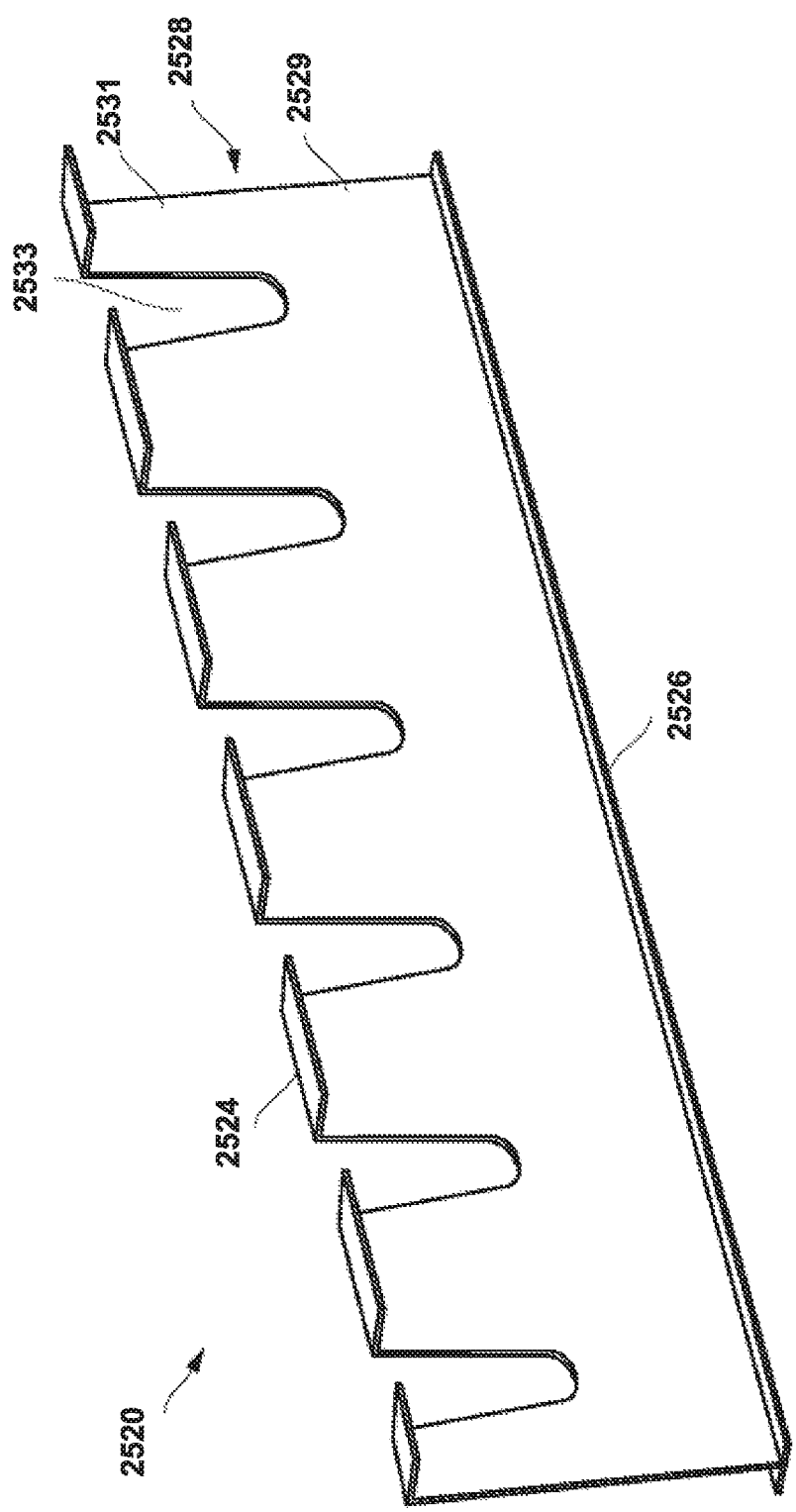
FIGS. 25 and 26 are top, front isometric views of still other alternate embodiments of hangers.
Figure 26:
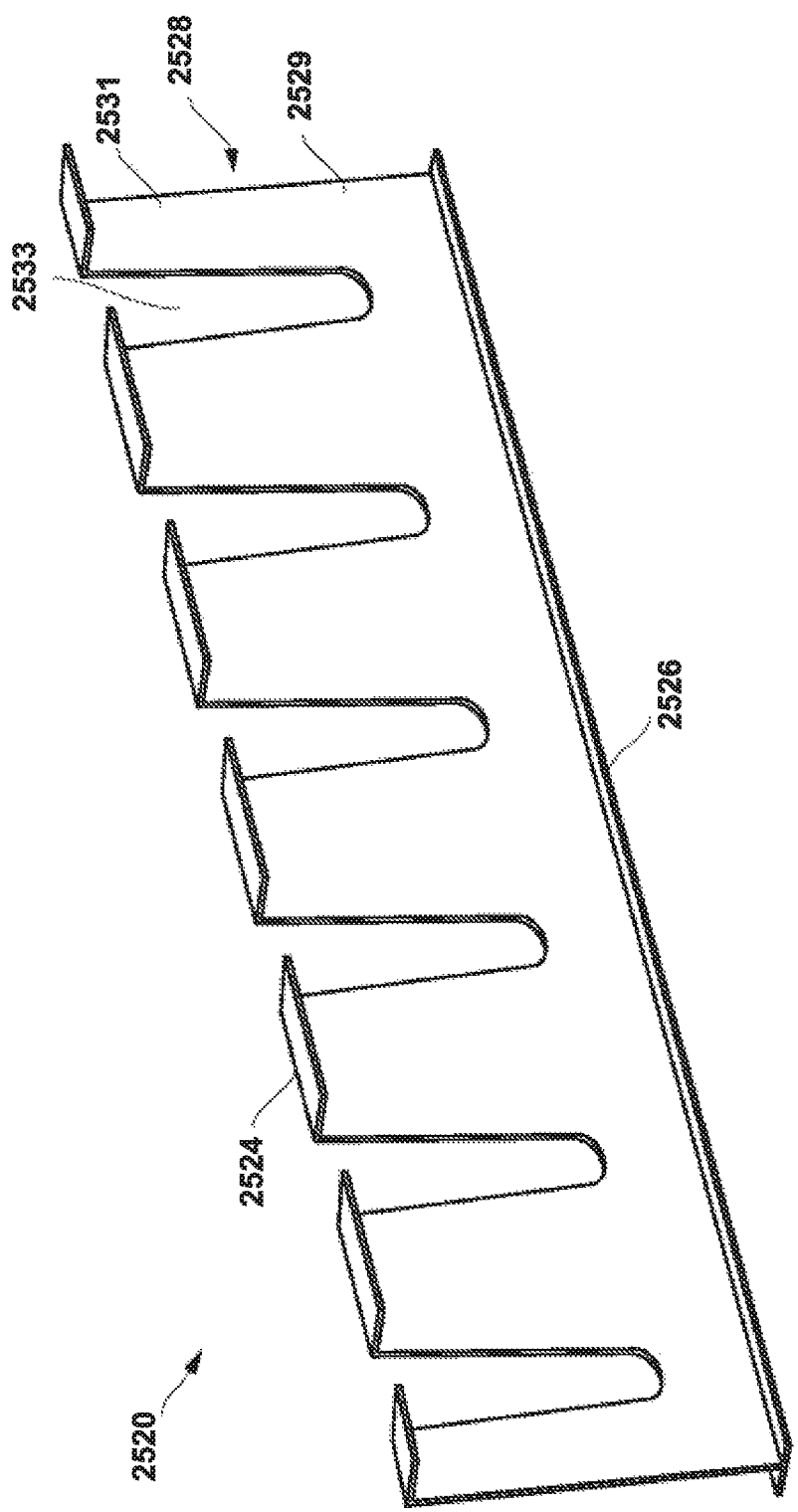

FIGS. 25 and 26 depict still other embodiments of hangers. Each hanger includes a beam 2520 having proximal ends 2524, web 2528 and distal end 2526 as described elsewhere herein for other embodiments. In some examples, the center-to-center, horizontal distance between adjacent ones of the proximal ends 2524 can be about 8 inches. This configuration enables the beam 2520 to be attached to conventional roof designs having center-to-center truss separations of about 16 inches or about 24 inches.

The webs 2528 of beams 2520 may include both a solid section 2529 that spans the entire lengths of distal ends 2526, and a segmented section 2531 that engages respective ones of the proximal ends 2524. Each beam 2520 also includes voids 2533 that extend from the proximal ends 2524 to the solid section 2529. In FIG. 25, the voids 2533 are shallower than the voids of FIG. 26.

Figure 31:
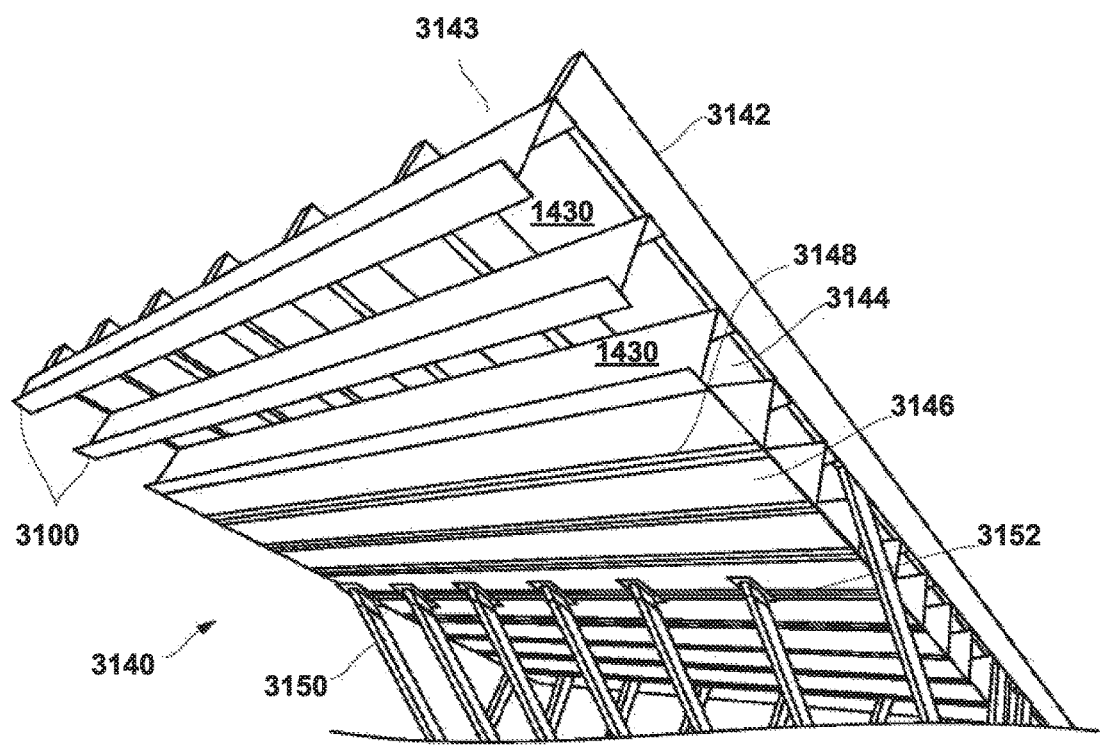
FIG. 31 is a bottom isometric view of an attic with an embodiment of a system for insulating the attic, and the system is shown partially installed.

Embodiments of beams 3100 are shown in operation in FIG. 31. Beams 310 can be any of the beams disclosed herein. Each beam 3100 may comprise a polymer. For example, the beam 3100 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. Versions of the beam 3100 may consist only of a polymer. In some embodiments, at least portions of the beam 3100 can be at least one of extruded and injection molded. Examples of the beam 3100 may be readily cut, such as with a manual tool like snips. In one example, the beams 3100 are not metallic. Apertures or holes in the beam 3100 may be employed to reduce its weight and reduce thermal bridge issues.

In other embodiments, portions of the beam 3100 may be formed from more than one material, such as different materials. For example, a first portion of the beam 3100 may include glass-reinforced PVC, and a second portion of the beam may include PVC. Portions of the beam 3100 may have different coefficients of thermal expansion.

Versions of the beam 3100 may include a specific coefficient of thermal expansion (CTE). For example, the CTE can be not greater than about 100E-06 in/(in·F), such as not greater than about 80E-06 in/(in·F), not greater than about 60E-06 in/(in·F), not greater than about 50E-06 in/(in·F), not greater than about 40E-06 in/(in·F), not greater than about 30E-06 in/(in·F), not greater than about 20E-06 in/(in·F), or even not greater than about 10E-06 in/(in·F). In other examples, the CTE can be in a range between any of these values.

In some embodiments, the beam 3100 may subjected to a bending moment due to the attic truss design. For example, the maximum acceptable deformation may be expressed by the following description: with the beam positioned horizontally, attached by its proximal end to a rafter, for each linear foot of beam, the application of a load of 0.5 lb at the distal end, 10 inches from the proximal end of the beam, will impart a maximum vertical deflection of not greater than about 2 inches. This corresponds to an angle or deflection of about 5 degrees. In other embodiments, the maximum vertical deflection can be not greater than about 1 inch, or even not greater than about 0.1 inches (i.e., no perceived deformation).

The beam 3100 can have any length between about 1 foot and about 20 feet. In some versions, the length of beam 3100 can be about 6 feet to about 8 feet to better enable handling by only one person. The beams can be installed by the framers installing the attic trusses and the external roof sheathing. Insulation contractors can install the insulation and the tape. Such installation may be preferable for longer versions of the beams 20 (e.g., 8 feet and longer). For shorter versions of the beams (e.g., under 8 feet), it may be preferable for the insulation contractors to install both the beams 20 and the insulation.

Examples of the web may, under its own weight, have a maximum deflection. In some versions, the maximum deflection of the web can be about 10 degrees relative to normal with respect to the proximal end and the distal end. In other examples, the maximum deflection can be about 8 degrees, such as about 6 degrees, about 5 degrees, about 4 degrees, about 3 degrees, about 2 degrees, or even about 1 degree. In other examples, the maximum deflection can be in a range between any of these values.

Examples of the beam 3100 may be perforated to reduce weight, thermal expansion, shrinkage and thermal bridge issues. In some versions, the proximal end may include perforations. Embodiments of the perforations may include parallel rows of slits. The slits may be at least one of rounded, oblong and rectangular. In one example, the web may be perforated. In another example, the distal end is not perforated.

Examples of the beam 3100 may comprise a single layer of material, such as polymer material. The material may be folded or thermoformed into a final sectional shape in the axial direction. In addition, the final sectional shape may be bonded, sonic welded or heat staked with ribbed edges. Alternatively, the beam 3100 may be formed as a profile extrusion.

Figure 32:
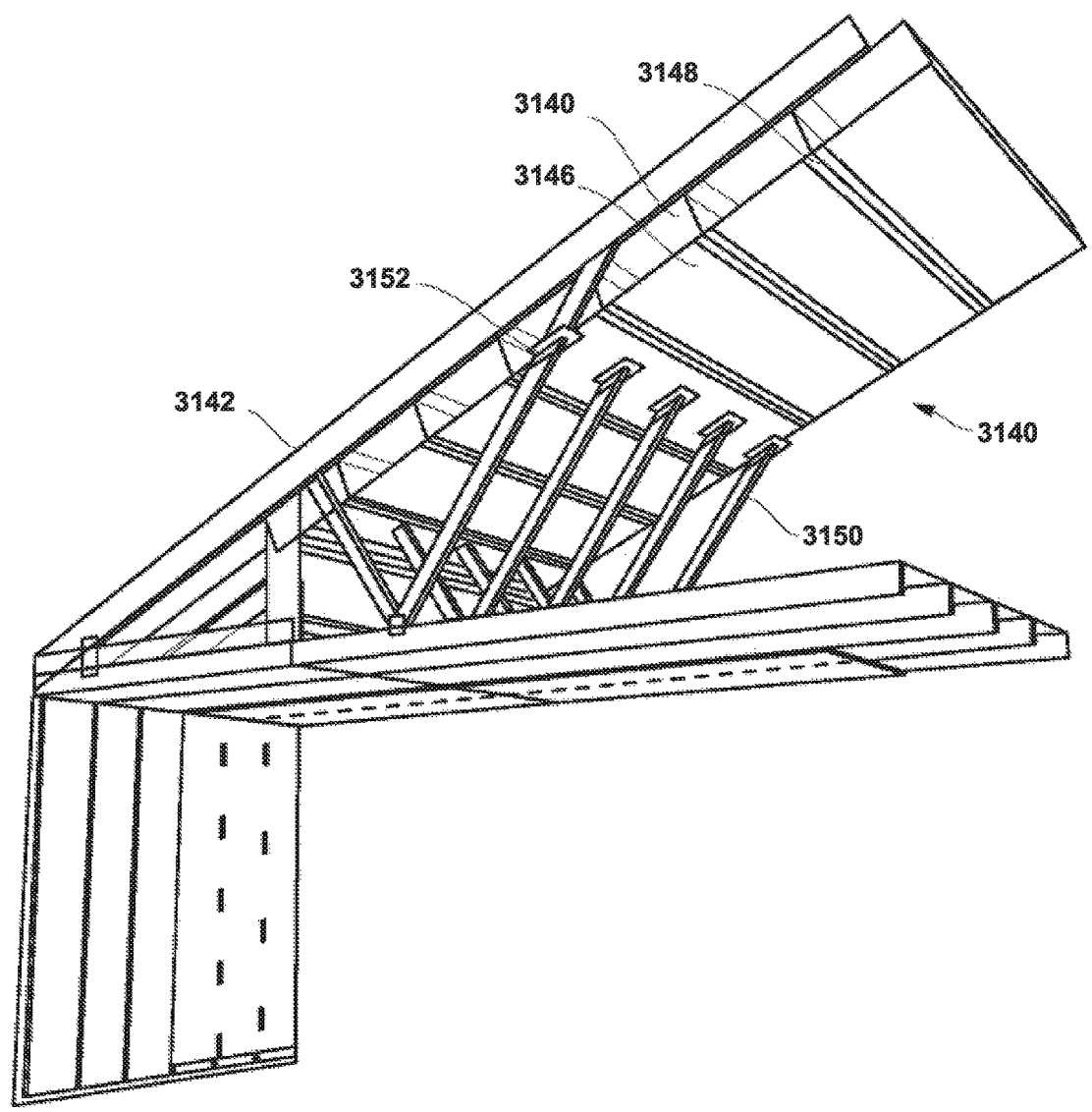
FIG. 32 is a bottom isometric view of an attic with another embodiment of a system for insulating the attic.

FIGS. 31 and 32 depict embodiments of a system for insulating an attic 3140 of a building. The building may include a roof with a roof deck, and rafters 3142 supporting the roof deck inside the attic 3140. The system may include beams 3100 for supporting insulation 3144 in the attic 3140. The beams 3100 may include features from any of the embodiments described herein. The beams 3100 may be transverse to the rafters 3142. The proximal ends of the beams 3100 may be mounted to the rafters 3142 with fasteners, such as staples, nails or screws. The system may further include a ventilated air gap 3143 between the roof deck and an upper portion of the system.

In some embodiments, the insulation may be placed below the rafters 3142, and the ventilated air gaps 3143 may be located between the soffit and the ridge vent at the top of the roof. Alternatively, ventilation openings (e.g., O'Hagin vents) may be employed directly on the roof sheathing. These solutions can permit the insulation to avoid moisture accumulation (regardless of the climate zone) using natural convection and wind. To limit convection in the insulation, ventilation baffles can be stapled to the roof sheathing to provide a continuous air gap between the soffit and the ridge vent, as is traditionally done with blown insulation. In another embodiment, a facing may be employed on one side of the insulation near the roof deck to limit convection. The other side of the insulation can employ the smart vapor retarder inside the building. The air gap is then ensured by the thickness of the rafters themselves. For example, a typical 2×4 beam would provide a 3.5 inch air gap. In other examples, if the rafters are 2×6 or 2×8 beams, ventilation baffles such as conventional, baffles with a 1.5 inch thickness can be stapled to the roof deck. For some applications, a first layer of insulation may be placed between the rafters, and a second layer of insulation may be placed below the rafters to increase the level of insulation and decrease the thickness of insulation installed below the rafters.

In some versions, the beams 3100 may be installed perpendicular to the trusses as shown on FIG. 31, which limits thermal bridging. However, the beams 3100 also may be installed parallel to the trusses.

The insulation 3144 may comprise insulation batts mounted to and between adjacent ones of the beams 3100 in the insulation spaces 1430. Each of the insulation batts of insulation 3144 may include an insulation material and an outer layer 3146 that faces the distal ends of the beams 3120. Examples of the outer layer 3146 may comprise at least one of a fire class A (required for exposed surfaces in U.S. building codes), a smart vapor retarder (SVR) and kraft paper. Alternatively, the batts of insulation 3144 may be unfaced with one or more outer layers.

Embodiments of the system may further include a first tape 3148. For example, the first tape 3148 may comprise an all weather flashing tape, such as 3M 8067 tape, from 3M Company, St. Paul, Minn., for example, or CertaTape from CertainTeed of Malvern, Pa. Versions of the system may include the first tape 3148 being applied to the distal ends of the beams 3100, and to the outer layers 3146 of the insulation batts.

The first tape 3148 may be used to form airtight barriers between the components of the system. Such airtight barriers may include an airtightness of ACH50<3. In other embodiments of the system, the airtightness and the airtight barriers may comprise ACH50<2.5. Other versions may include ACH50<2.5, such as ACH50<2.0, ACH50<1.6, ACH50<1.0, ACH50<0.8, or even ACH50<0.6. In still other example, the airtightness and the airtight barriers can be in a range between any of these values.

Figure 33:
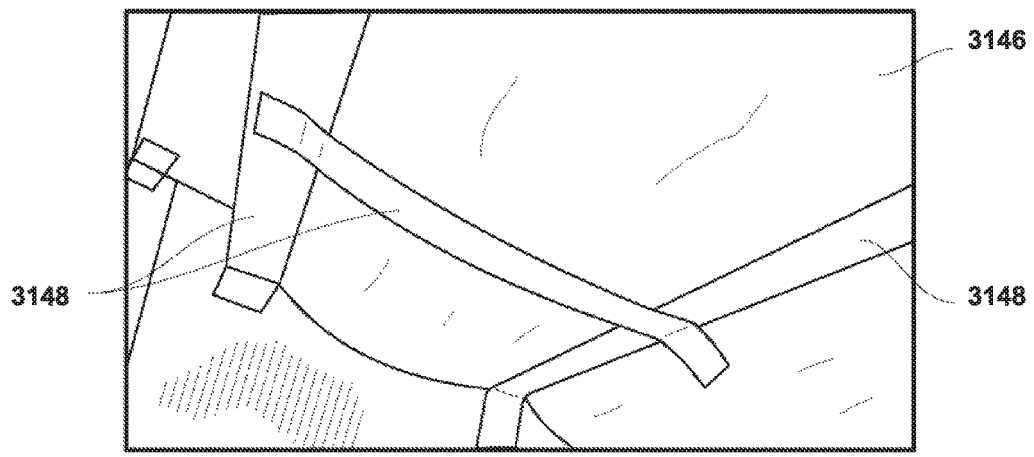
FIG. 33 is an enlarged, bottom isometric view of an attic with still another embodiment of a system for insulating the attic.

In some versions of the system, no material of the system extends between adjacent ones of the beams 3100 other than the insulation batts that form insulation 3144. For example, the system may include no other support members or support structures beneath the insulation 3144, such as strapping, sheet barriers, etc. The facing of the insulation 3144 may be stapled to the beams 3100. The surface of the facing can be pulled straight in such a way that additional pieces are not required to correctly tape the junction between the batts. However, other versions of the system may include batt-only strips of tape 3148 (FIG. 33) between abutting batt joints that are perpendicular to axes of the beams 3100. In an example, the batt-only tape strips do extend between adjacent ones of the beams 3100. In some versions, the batts of insulation 3144 may be initially stapled to the beams 3100 before taping.

Figure 34:
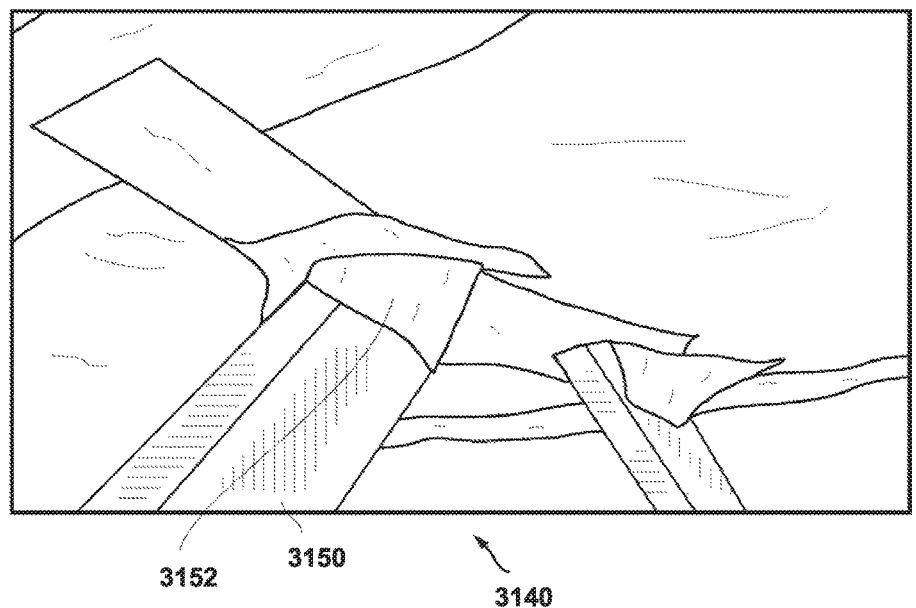
FIG. 34 is an enlarged, bottom isometric view of an attic with yet another embodiment of a system for insulating the attic.

In some applications, protrusions 3150 (FIGS. 31, 32, and 34) of the attic 3140 may extend through the batts of insulation 3144. For example, the protrusions 3150 may include other structural members, such as truss members, that further support the roof. Other examples of protrusions 3150 may include vent pipes, plumbing components, ducts, conduits or other structures typically found in an attic or near a roof. Tape 3148 may be applied between the protrusions 3150 and the batts of insulation 3144. Tape 3148 may form airtight barriers between these components. Versions of the airtight barriers comprise ACH50<3, or less, as described elsewhere herein.

Other embodiments of the system may further include a second tape 3152 that differs from the first tape 3148. For example, the second tape 3152 may comprise a stretch tape. Stretch tape may include an elongation capability of at least about 100%. Examples of stretch tape may include Certa-Flash stretch tape, by CertainTeed of Malvern, Pa., Isostretch tape from DuPont of Wilmington, Del., or ZIP System stretch tape, available from Huber Engineered Woods, Charlotte, N.C. The second tape 3152 may be applied between the protrusions 3150 and the batts of insulation 3144 to form airtight barriers between the components. The airtight barriers comprise ACH50<3, or less, as described elsewhere herein.

Embodiments of a method of insulating the attic 3140 of a building also are disclosed. For example, the method may include providing beams 3100 comprising an elongated profile in an axial direction. Versions of the method may include fastening only proximal ends, or brackets, of the beams 3100 to the rafters 3142. In some embodiments, the method includes positioning batts of insulation 3144 on distal ends of adjacent ones of the beams 3100. Each of the batts of insulation 3144 may include an insulation material and an outer layer 3146 facing the distal ends of the beams 3100. The outer layer 3146 may comprise an airtightness of ACH50<3, or better, as described herein.

Examples of the method may further include applying the first tape 3148 to the distal ends of the beams 3100, and to the outer layers 3146 of the batts of insulation 3144. Airtight barriers may be formed between these components, as described herein. The airtight barriers comprising the airtightness of ACH50<3, or better, as previously discussed. In one embodiment, the method may further comprise extending no material between adjacent ones of the beams other than the insulation batts.

Figure 35:
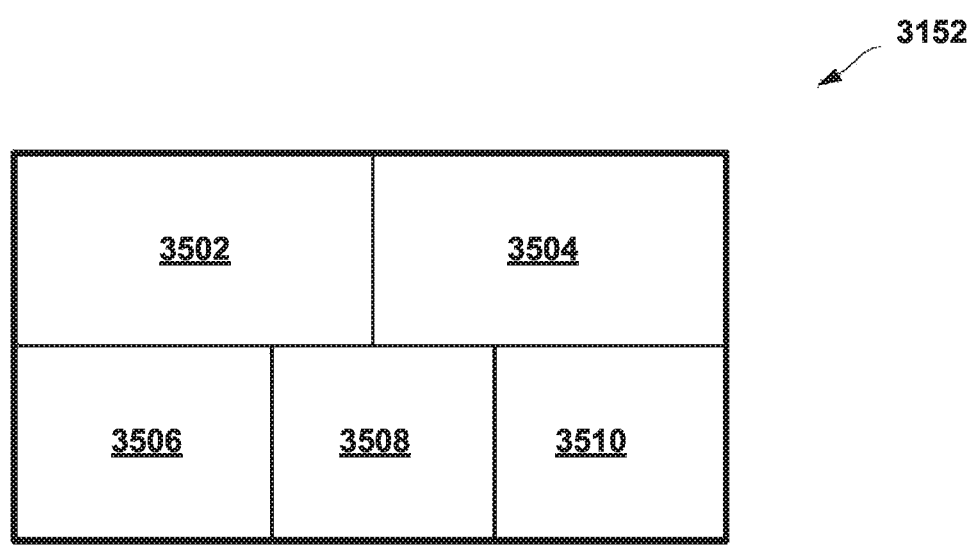
FIG. 35 is schematic view of an embodiment of tape showing release paper segments.

FIG. 35 depicts an embodiment of a back side of the second tape 3152, showing its release liner in segments 3502-3510 that are pre-slit. Methodically removing the segments 3502-3510 and applying the second tape 3152 to a protrusion 3150 (FIG. 34) that extends through an insulation batt (as described herein) to form a substantially airtight seal significantly enhances installation speed and efficiency.

For example, the following sequence of steps represents an embodiment of a method of the application of the second tape 3152. In one version, segment 3508 is removed first. Segment 3508 is about 2 inches wide so that it can be applied to and go around protrusions (e.g., rafters, trusses, etc.) having a width of 1.5 inches. With segment 3508 removed, the second tape 3152 can be applied on the front face of the protrusion. Next, segments 3506 and 3510 are removed so that second tape 3152 can be stretched on the sides of the protrusion. In a final step, segments 3502 and 3504 are removed and the second tape 3152 is stretched on the facing of the insulation batts.

In an alternate embodiment, the release liner on the back of the second tape 3152 may include a single bisecting slit in the long direction. In this example, the bottom half of the liner (equivalent to the combination of segments 3506-3510) may be removed first. The second tape 3152 would then be stretched and applied to the protrusion. The top half of the liner is then removed (equivalent to the combination of segments 3502 and 3504), and the second tape 3152 would be stretched and applied to the insulation batt.

Figure 36:
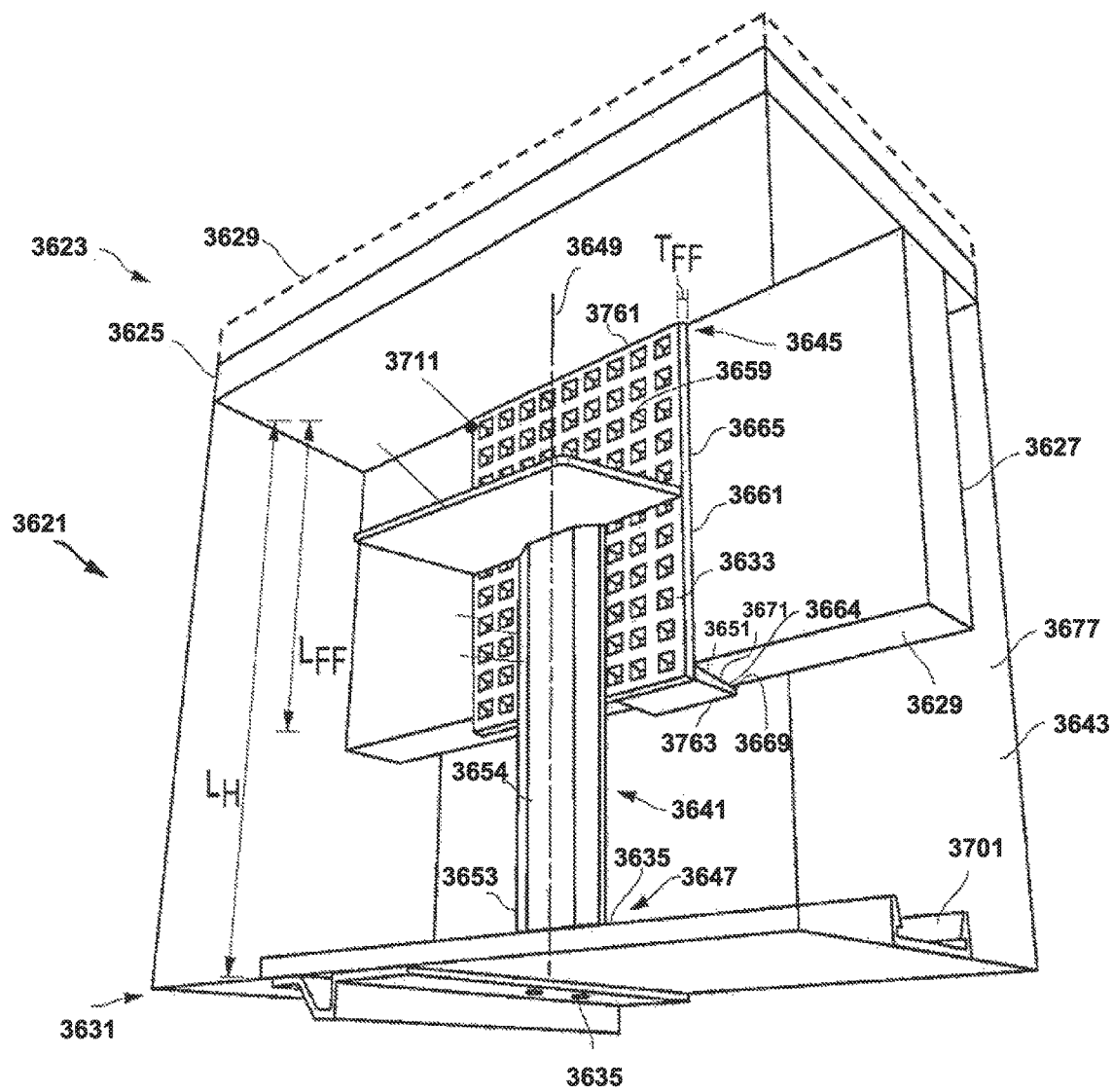
FIG. 36 is a side view of an embodiment of an insulation system.

Embodiments of a system, method and apparatus or hanger for insulating an enclosed space are disclosed. In a variation, the closed space may be an attic. For example, FIG. 36 depicts an insulation system 3621 having a roof 3623 with a roof deck 3625. The attic of the home may be located beneath the roof deck 3625. Beams or rafters 3627 may support the roof deck 3625 inside the attic. Exterior roofing products 3629 may be mounted to the roof deck 3625 opposite the beams 3627. In an embodiment, the deck 3625 may be an attic floor deck and the beams 3627 may be floor joints. In an embodiment, the deck 3625 may be an attic side wall panel and the beams 3627 may be side wall beams.

In addition, hangers 3641 may be used for supporting insulation 3643 in the attic. In some versions, the insulation system 3621 may include one or more barriers 3631. Embodiments of the hangers 3641 may include a hanger body having a first end 3645 and a second end 3647. In some embodiments, an insulation space may include the space between the first and second ends 3645, 3647 inside the barrier 3631 and the beam 3627. In some embodiments, an insulation space may include the space between the barrier 3631 and the beam 3627. In some embodiments, an insulation space may include the space between the barrier 3631 and the deck 3625. The insulation space may at least partially contain the insulation 3643.

In an embodiment, the barrier 3631 may be defined as any obstacle preventing movement of the insulation 3643 from the insulation space. Embodiments of the barrier 3631 may include a stud, a rail, a batten, a strapping, a gypsum board, a grid (of studs, planks or another component), a netting, a facing (including facing of insulation or otherwise), a mesh, a coated or non-coated fabric, a non-woven or woven fabric, a barrier created from a liquid mixture, a tape, a membrane, a kraft-faced batt of insulation, or a combination thereof, or may be another type. The barrier 3631 may be formed from wood or plastic, in some examples. The barrier 3631 also may include at least one of open glass mesh, vapor closed polyethylene, a smart vapor retarder (SVR), or a combination thereof. The barrier 3631 can support blown insulation comprising at least one of fiberglass, stonewool or cellulose. In addition, the barrier 3631 may be reinforced with a glass net that supports a pressure of blown insulation. In still other versions, the barrier 3631 may include gypsum boards mounted to the second ends 3647 of the hangers 3641. In one example, the SVR may be mounted to the gypsum board. In other versions, the barrier 3631 may include a facing attached to the insulation 3643 through an insulation attachment 3644. The insulation attachment 3644 may be adapted to be secured to the barrier 3631 or facing through a fastener 3711. The fastener 3711 may include a nail, a staple, a bolt, a screw, an adhesive, an adhesive tape (single or double-sided), a hook, a hook and loop fabric system, a pin, a combination thereof, or may be another type.

In a number of embodiments, the beam 3627 may be a substantially planar, elongated panel. The beam 3627 may include a beam-to-hanger attachment component 3633. The beam-to-hanger attachment component 3633 may include a groove, planar surface, projection, or combination thereof, or may be another type. The beam-to-hanger attachment component 3633 may aid to couple, pair, engage, or otherwise attach the beam 3627 to the hanger 3641.

In a number of embodiments, the barrier 3631 may be a substantially planar, elongated panel. The barrier 3631 may include a beam-to-hanger attachment component 3635. The barrier-to-hanger attachment component 3635 may include a groove, planar surface, projection, or combination thereof, or may be another type. The barrier-to-hanger attachment component 3635 may aid to couple, pair, engage, or otherwise attach the barrier 3631 to the hanger 3641.

Figure 37:
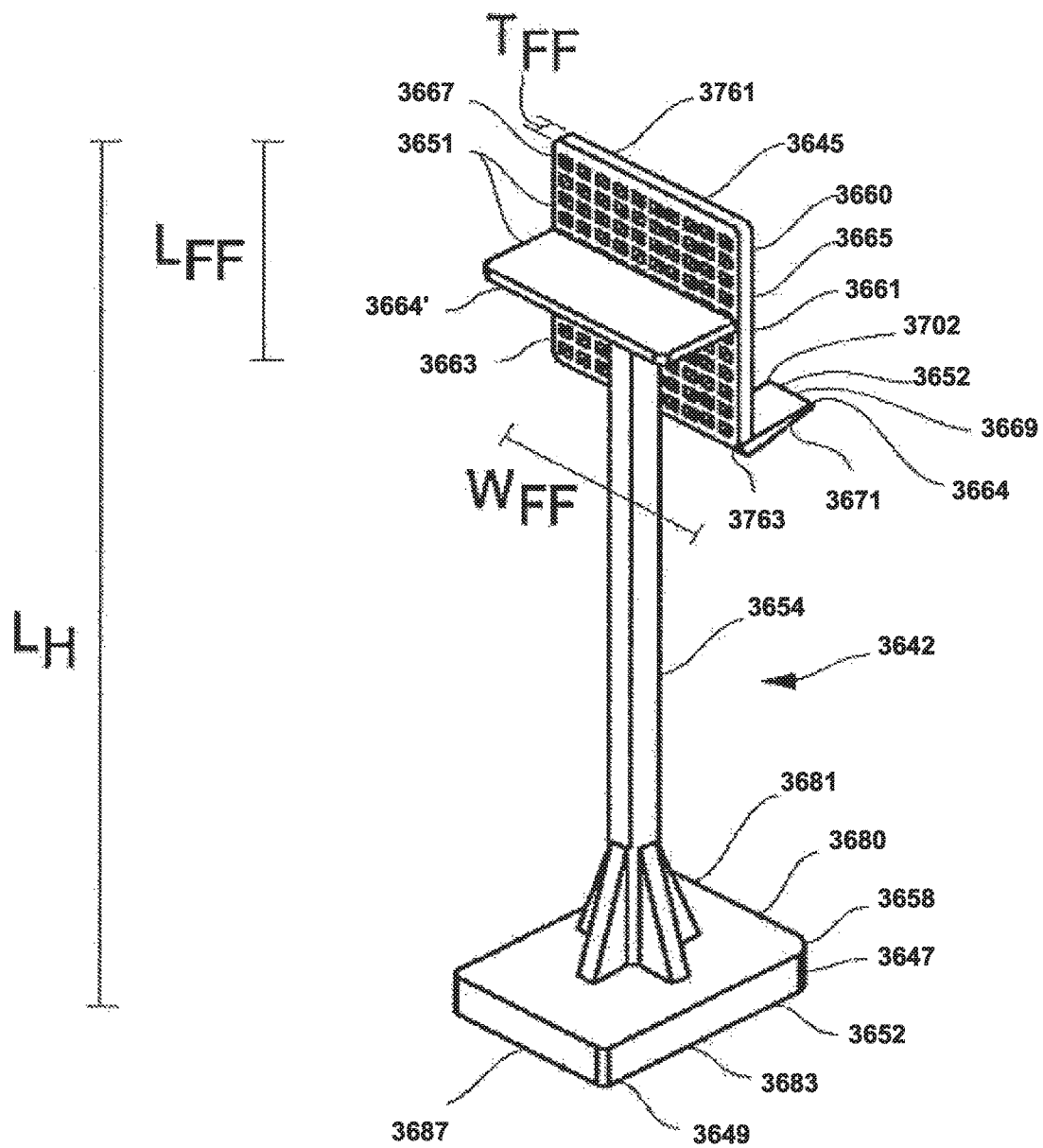
FIG. 37 is a perspective view of an embodiment of a hanger for the insulation system.

As shown in FIGS. 36-37, embodiments of the hanger 3641 may include an axis 3649. In at least one embodiment, an axial midsection 3654 may define an axial space between the first end 3645 and the second end 3647 of the hanger 3641. The axial midsection 3654 may be a shaft. In a number of embodiments, the hanger may include a beam attachment component 3651. The beam attachment component 3651 may couple, engage, secure, or attach the hanger 3641 to a beam 3627 at the first end 3645 of the hanger 3641. The first end 3645 may include the beam attachment component 3651. The beam attachment component 3651 may couple the hanger 3641 to the beam 3627 at an axial bottom 3626 of the beam 3627. The beam attachment component 3651 may be adapted to be secured to the beam 3627 through a fastener 3711. The fastener 3711 may include a beam attachment projection coupled to or integral with the hanger 3641, a nail, a bolt, a staple, a screw, adhesive, tape (single or double-sided), hook, hook and loop, pin, or may be another type. In a number of embodiments, the hanger may include a barrier attachment component 3653. The barrier attachment component 3653 may couple, engage, secure, or attach the hanger 3641 to a barrier 3631 at the second end 3647 of the hanger 3641. The second end 3647 may include the barrier attachment component 3653. The barrier attachment component 3653 may couple the hanger 3641 to the barrier 3631 at an axial top 3632 of the barrier 3631. The barrier attachment component 3651 may be adapted to be secured to the barrier 3631 through a fastener 3711. The fastener 3711 may include a beam attachment projection coupled to or integral with the hanger 3641, a nail, a bolt, a staple, a screw, adhesive, tape (single or double-sided), hook, hook and loop, pin, or may be another type.

In a number of embodiments, the hanger 3641 may comprise plastic, such as thermoplastics, chlorinated polymers, polyolefins, acrylates, amides, esters, polyimides, a combination thereof, or may be another type. In a number of embodiments, the hanger 3641 may comprise polymer that can be injection moldable or extruded, a polymer blend or a composition of such polymer or a blend with mineral, glass, polymeric and/or natural fillers in a non-fibrous and/or fibrous form. In an embodiment, the hangar can comprise polymethyl methacrylate (PMMA), acrylonitrile butadiene styrene (ABS), styrene acrylonitrile (SAN), polycarbonate (PC), polypropylene, polyolefin, polyethylene, polyester, polyamide, polyimide, polyvinyl chloride (PVC), cross-linked PVC, chlorinated polyvinyl chloride (CPVC), thermoplastics, chlorinated polymers, a combination thereof, or may be another type. In some versions, the hanger 3641 itself may be a non-metallic material, such as a rubber, a ceramic, a combination thereof, or may be another type. In some embodiments, the hanger 3641 may be metallic. In a number of variations, the hanger 3641 may be metallic with a non-metallic coating. The non-metallic coating may include a plastic as described herein. In other versions, only a portion of hanger 3641 may be metallic so as to not form a thermal bridge. In a number of embodiments, the hanger 3641 may have a maximum thermal conductivity of not greater than 1 W/m·K. In a number of embodiments, the hanger 3641 may have a thermal conductivity of not greater than 0.5 W/m·K. In a number of embodiments, the hanger 3641 may be rigid and not designed to be deformable. In a number of embodiments, the hanger 3641 may be formed through a molding process. In a particular embodiment, the hanger 3641 can be melt processed by any method envisioned or known in the art such as laminating, casting, molding, extruding, and the like. In an embodiment, the hanger 3641 can be injection molded.

The hanger 3641 may have an overall length $L_H$ between the first end 3645 and the second end 3647. The overall length $L_H$ may be least 10 mm, at least 20 mm, at least 50 mm, at least 100 mm, at least 200 mm, at least 500 mm, or at least 1000 mm. The overall length $L_H$ may be no greater than 10 mm, no greater than 20 mm, no greater than 50 mm, no greater than 100 mm, no greater than 200 mm, or no greater than 500 mm, or no greater than 1000 mm.

Figure 38:
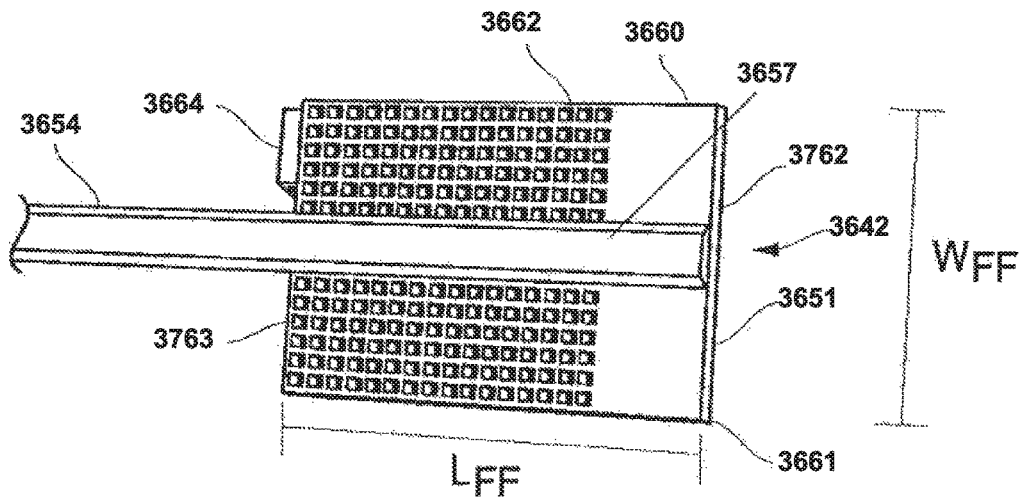
FIG. 38 is a side view of an embodiment of a hanger.

In a number of embodiments, as shown in FIGS. 37-38, the hanger 3641 may include a beam attachment component 3651 having a first face 3660. The first face 3660 may have a first side 3661, a second side 3663, a first edge 3665, and a second edge 3667. The first face 3660 may include a top 3761 and a bottom 3763. The first face 3660 may be parallel to the axis 3649. In a number of embodiments, the first face 3660 may include at least one aperture 3662. The first face 3660 may include a plurality of apertures 3662. The first face 3660 may include a grid of apertures 3662. The apertures 3662 may be adapted to house or receive a fastener 3711 to attach the hanger 3641 to the beam 3627. The fastener 3711 may include a beam attachment projection coupled to or integral with the hanger 3641, such as a nail, a bolt, a staple, a screw, an adhesive, a tape (single or double-sided), a hook, a hook and loop system, a pin, a combination thereof, or may be another type. In a number of variations, the fastener 3711 may be embedded in the hanger 3641. In a number of variations, the fastener 3711 may be embedded in the hanger 3641 during a formation process. In an embodiment, a fastener is embedded in the hanger during the formation process such that the hangar can be attached with a simple hammer. In a number of embodiments, the first face 3660 may include a spine 3657 running down its axial length. The first face 3660 may attach the hanger 3641 to the beam 3627 through the beam-to-hanger attachment component 3633.

The first face 3660 may have a length $L_{FF}$ between the top 3761 and the bottom 3763. The first face 3660 length $L_{FF}$ may be at least 5 mm, at least 10 mm, at least 20 mm, at least 50 mm, at least 100 mm, at least 200 mm, or at least 500 mm. The first face 3660 length $L_{FF}$ may be no greater than 5 mm, no greater than 10 mm, no greater than 20 mm, no greater than 50 mm, no greater than 100 mm, no greater than 200 mm, or no greater than 500 mm. In a number of embodiments, the length $L_{FF}$ may be modified to correspond to a length of a beam 27 $L_B$ to adjust the hanger 3641 without the need of a lip 3664.

The first face 3660 may have a width $W_{FF}$ between the radial first end of the first side 3661 and the radial second end of the first side 3661. The first face 3660 width $W_{FF}$ may be at least 5 mm, at least 10 mm, at least 20 mm, at least 50 mm, at least 100 mm, at least 200 mm. The width $W_{FF}$ may be 5 mm, no greater than 10 mm, no greater than 20 mm, no greater than 50 mm, no greater than 100 mm, no greater than 200 mm. In a number of embodiments, the width $W_{FF}$ may be modified to correspond to a width of a beam 3627 $W_B$ to adjust the hanger 3641 without the need of a lip 3664.

The first face 3660 may have a thickness $T_{FF}$ between the first edge 3665 and the second edge 3667. The first face 3660 thickness $T_{FF}$ may be at least 0.5 mm, at least 1 mm, at least 5 mm, at least 10 mm, at least 15 mm, at least 20 mm, at least 25 mm. The thickness $T_{FF}$ may be no greater than 0.5 mm, no greater than 1 mm, no greater than 5 mm, no greater than 10 mm, no greater than 15 mm, no greater than 20 mm, or no greater than 25 mm.

In a number of embodiments, as shown in FIGS. 37-40, the hanger 3641 may include at least one radial lip 3664. The radial lip 3664 may be formed integrally with the hanger such that it does not comprise a separate component. The radial lip 3664 may be adapted to contact a bottom 3629 of a beam 3627. The bottom 3629 of the beam 3627 may be the axial bottom portion. In one embodiment, the radial lip 3664 may project from the first face 3660 of the beam attachment component 3651 at least one of a first side 3661, or a second side 3663. In another embodiment, the radial lip 3664 may project from an edge 3665, 3667. The radial lip 3664 may have a cross-section in the shape of a polygon or non-round shape. The cross-sectional shape may vary along the length of the radial lip 3664. The radial lip 3664 may include an arcuate portion. The radial lip 3664 may further include a radial edge 3669. In an embodiment, the radial lip 3664 may include a flange 3671 configured to be substantially parallel to the roof deck 3625. The flange 3671 may be formed integrally with the hanger 3641 such that it does not comprise a separate component. In an embodiment, the radial lip 3664 or flange 3671 may include at least one reinforcement wing 3673 extending between axially from the radial edge 3669. The reinforcement wing 3673 may be configured to be substantially perpendicular to the roof deck 3625. The reinforcement wing 3673 may be formed integrally with the hanger 3641 such that the reinforcement wing does not comprise a separate component. The radial lip 3664 may attach the hanger 3641 to the beam 3627 through the beam-to-hanger attachment component 3633. The radial lip 3664 may include a plurality of apertures 3702. The radial lip 3664 may include a grid of apertures 3702. The apertures 3702 may be adapted to house a fastener 3711 to attach the hanger 3641 to the beam 3627. In a number of embodiments, the radial lip 3664 may be adapted to fracture to better adjust the hanger 3641 relative to the beam 3627.

The radial lip 3664 may project out at a lip length $L_L$. The lip length $L_L$ may be at least 1 mm, at least 10 mm, at least 20 mm, at least 50 mm, at least 100 mm, at least 200 mm. The lip length $L_L$ may be no greater than 1 mm, no greater than 10 mm, no greater than 20 mm, no greater than 50 mm, at least 100 mm, at least 200 mm. The ratio of lip length $L_L$ to first face length $L_{FF}$ may be 1:2, 1:4, 1:8, 1:10, 1:15, 1:20, or may be another value.

The radial lip 3664 may have a lip width $L_W$. The lip width $L_W$ may be at least 5 mm, at least 10 mm, at least 20 mm, at least 50 mm, at least 100 mm, at least 200 mm. The lip width $L_W$ may be no greater than 5 mm, no greater than 10 mm, no greater than 20 mm, no greater than 50 mm, no greater than 100 mm, no greater than 200 mm. The ratio of lip width $L_W$ to first face width $W_{FF}$ may be 1:2, 1:4, 1:8, 1:10, 1:15, 1:20, or may be another value.

The radial lip 3664 may have a lip thickness $T_W$. The lip thickness $T_W$ may be at least 0.5 mm, at least 1 mm, at least 5 mm, at least 10 mm, at least 15 mm, at least 20 mm, at least 25 mm. The lip thickness $T_W$ may be no greater than 0.5 mm, no greater than 1 mm, no greater than 5 mm, no greater than 10 mm, no greater than 15 mm, no greater than 20 mm, or no greater than 25 mm. The ratio of lip thickness $T_W$ to first face thickness $T_{FF}$ may be 1:2, 1:4, 1:8, 1:10, 1:15, 1:20, or may be another value.

The radial lip 3664 may form an angle α with the axis 3649 of the hanger 3641. The angle α may be at least +/− 5°, at least +/− 10°, at least +/− 15°, at least +/− 20°, at least +/− 25°, at least +/− 30°, at least +/− 35°, at least +/− 40°, at least +/− 45°, at least +/− 50°, at least +/− 55°, at least +/− 60°, at least +/− 65°, at least +/− 70°, at least +/− 75°, at least +/− 80°, at least +/− 85°, at least +/− 90° from a direction perpendicular to the axis 49 of the hanger 41.

In a number of embodiments, the at least one radial lip 3664 may include a plurality of radial lips 3664, 3664'. The at least one radial lip 3664 may include a second radial lip 3664' on a second radial side 3663 while the first radial lip 3664 may project from the first radial side 3661. In such a way, the first radial lip 3664 and the second radial lip 3664' may be on opposite sides 3661, 3663 of the first face 3660 of the beam attachment component 3651. In a number of embodiments, the beam attachment component 3651 may include a plurality of radial lips 3664, 3664' on the first radial side 3661 of first face 3660 at and position along its face. The radial lips 3664, 3664' may be of different radial lengths $L_L$ and widths $W_L$, and thicknesses $T_L$. The radial lips 3664, 3664' may be of different or the same shape. In a number of embodiments, the beam attachment component 3651 may include a plurality of radial lips 3664, 3664' on the second radial side 3663 of first face 3660 at and position along its face. The radial lips 3664, 3664' may be of different radial lengths $L_L$ and widths $W_L$, and thicknesses $T_L$. The radial lips 3664, 3664' may be of different or the same shape. In a number of embodiments, the beam attachment component 3651 may include a plurality of radial lips 3664, 3664' on the first edge 3665 of first face 3660 at and position along its edge. The radial lips 3664, 3664' may be of different radial lengths $L_L$ and widths $W_L$, and thicknesses $T_L$. The radial lips 3664, 3664' may be of different or the same shape. In a number of embodiments, the beam attachment component 3651 may include a plurality of radial lips 3664, 3664' on the second edge 3667 of first face 3660 at and position along its edge. The radial lips 3664, 3664' may be of different or the same radial lengths $L_L$, widths $W_L$, and thicknesses $T_L$. The radial lips 3664, 3664' may be of different or the same shape.

Figure 39:
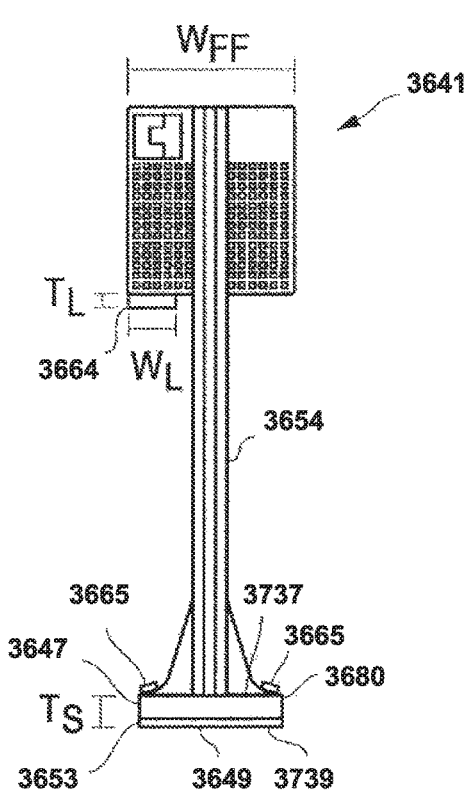
FIG. 39 is a side view of an embodiment of a hanger.
Figure 40:
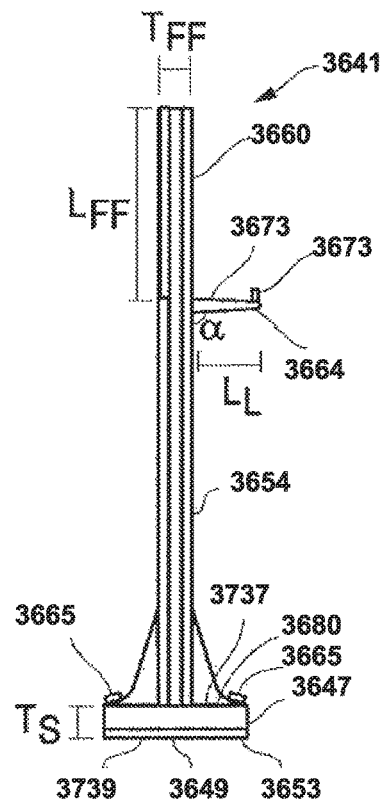
FIG. 40 is a side view of an embodiment of a hanger.
Figure 41:
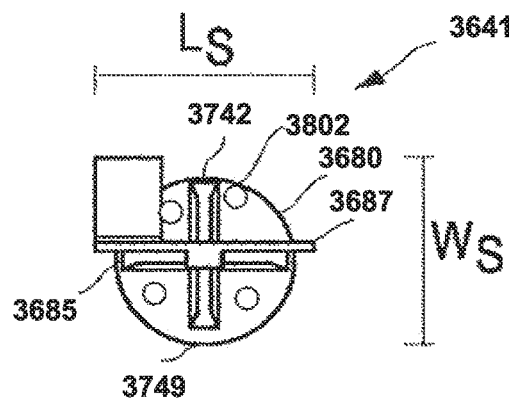
FIG. 41 is a top view of an embodiment of a hanger.
Figure 42:
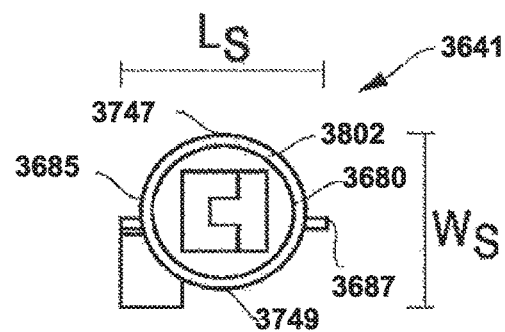
FIG. 42 is a bottom view of an embodiment of a hanger.

In a number of embodiments, as shown in FIGS. 36-42, the barrier attachment component 3653 may include a shoe 3680. The shoe 3680 may be configured to couple the hanger 3641 to the barrier 3631. In a number of embodiments, as shown in FIGS. 39-42, the shoe 3680 may have a elongated, substantially flat shape comprising a round or polygonal cross-section. In certain embodiments, as shown in FIG. 37, the shoe 3680 may be rectangular. In other embodiments, as shown in FIGS. 41-42, the shoe 3680 may be round or substantially round in shape. The shoe 3680 may be configured to be radially inside or engage opposite sides of a groove 3701 formed on, coupled to, or integral with the barrier 3631. In some embodiments, the groove 3701 may be formed on a rail included as the barrier 3631. In some embodiments, the junction between the shoe 3680 and the groove 3701 may have an interface that has friction to maintain substantially static attachment while the insulation 3643 is installed. In some embodiments, the junction between the shoe 3680 and the groove 3701 may cause the shoe 3680 or groove 3701 and barrier 3631 to slide in the case of thermal expansion, moisture expansion, or shrinkage of the beam 3627, barrier 3631 or hanger 3641. The shoe may have a first side 3681, a second side 3683, a first edge 3685 a second edge 3687, a third edge 3747, and a fourth edge 3749. The shoe 3680 may have a top 3737 and a bottom 3739. The shoe 3680 may attach the hanger 3641 to the barrier 3631 through the barrier-to-hanger attachment component 3635. In a number of embodiments, the barrier attachment component 3653 may include a plurality of apertures 3802. The barrier attachment component 3653 may include a grid of apertures 3802. The apertures 3802 may be adapted to house a fastener 3711 to attach the hanger 3641 to the barrier 3631. The fastener 3711 may include a barrier attachment projection coupled to or integral with the hanger 3641, a nail, a bolt, a staple, a screw, adhesive a nail, a bolt, a staple, a screw, adhesive, tape (single or double-sided), hook, hook and loop, pin, or may be another type. In a number of variations, the fastener 3711 may be embedded in the hanger 3641. In a number of variations, the fastener 3711 may be embedded in the hanger 3641 during a formation process which may include an injection process.

The shoe 3680 may have a length $L_S$ between the axial first edge 3685 of the first side 3681 and the second edge 3687 of the first side 3681 in the x direction. The length $L_S$ may be at least 1 mm, at least 10 mm, at least 20 mm, at least 50 mm, at least 100 mm, at least 200 mm. The length $L_S$ may be no greater than 1 mm, no greater than 10 mm, no greater than 20 mm, no greater than 50 mm, at least 100 mm, at least 200 mm.

The shoe 3680 may have a width $W_S$ between the axial third edge 3747 of the first side 3681 and the fourth edge 3749 of the first side 3681 in the y direction. The width $W_S$ may be at least 5 mm, at least 10 mm, at least 20 mm, at least 50 mm, at least 100 mm, at least 200 mm. The width $W_S$ may be no greater than 5 mm, no greater than 10 mm, no greater than 20 mm, no greater than 50 mm, no greater than 100 mm, no greater than 200 mm.

The shoe 3680 may have a thickness $T_S$ between the top 3737 and the bottom 3739. The thickness $T_S$ may be at least 0.5 mm, at least 1 mm, at least 5 mm, at least 10 mm, at least 15 mm, at least 20 mm, at least 25 mm. The thickness $T_S$ may be no greater than 0.5 mm, no greater than 1 mm, no greater than 5 mm, no greater than 10 mm, no greater than 15 mm, no greater than 20 mm, no greater than 25 mm.

Figure 43:
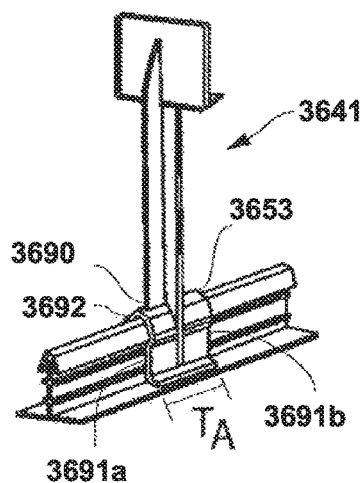
FIG. 43 is a side view of embodiments of an insulation system.
Figure 44:
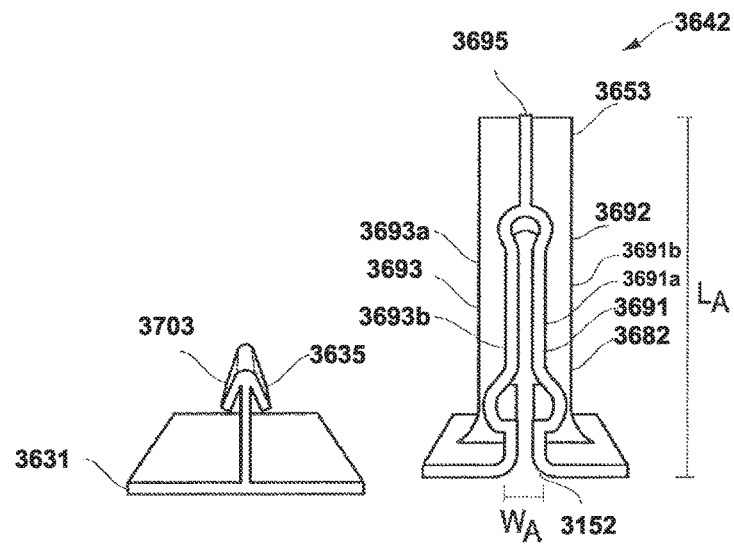
FIG. 44 is a side view of embodiments of an insulation system.
Figure 55:
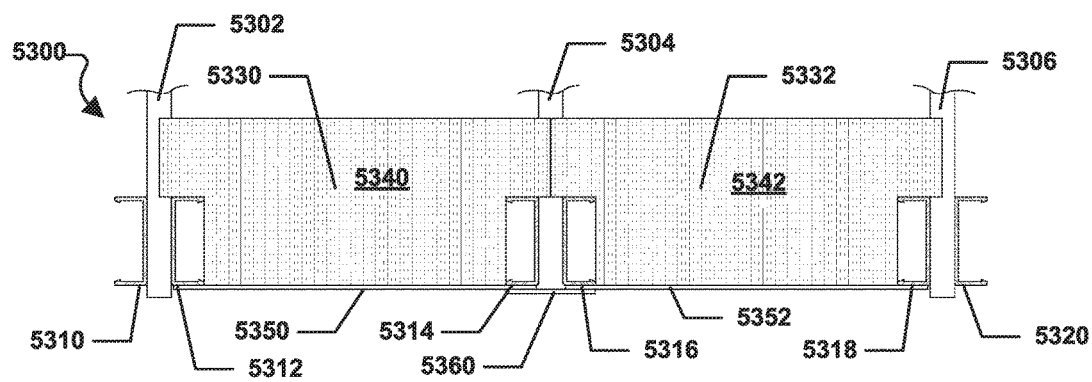
FIG. 55 is a cross-section view of an insulation system.

In a number of embodiments, as shown in FIGS. 43-44, the barrier attachment component 3653 may include an arch 3690. The arch 3690 may be configured to couple the hanger 3641 to the barrier 3631. The arch 3690 may include at least two axial sides 3691, 3693, a top 3695 and a bottom 3697, while each axial side 3691, 3693 has a radial diameter that varies along the axis 3649 of the hanger 3641. The axial sides 3691, 3693 may have a front side 3691a, 3693a, and a back side 3691b, 3693b. The arch 3690 may include a clamp 3692 configured to wrap around or engage opposite sides of a projection 3703 formed on, coupled to, or integral with the barrier 3631. The clamp 3692 may be configured to grip the barrier 3631 at the projection 3703. The clamp 3692 may be configured where it has an uninstalled position where the space between the axial sides 3691, 3693 of the arch may be smaller than the width of the projection 3703, and an installed position where the axial sides 3691, 3693 may be flexed apart to accommodate the width of the projection 3703 before being secured thereto. The arch 3690 or clamp 3692 may attach the hanger 3641 to the barrier 3631 through the barrier-to-hanger attachment component 3635. In a number of embodiments, the arch may form a pocket 3682 to flushly engage the projection 3703 as shown in FIG. 55. The pocket 3682 may form a space and be located between the axial sides 3691, 3693. The pocket 3682 or projection 3703 may be any shape including polygonal, round, or non-round. The projection 3703 may be arrow-shaped.

The arch 3690 may have a length $L_A$ between the top 3695 and the bottom 3697. The length $L_A$ may be at least 1 mm, at least 10 mm, at least 20 mm, at least 50 mm, at least 100 mm, at least 200 mm. The length $L_A$ may be no greater than 1 mm, no greater than 10 mm, no greater than 20 mm, no greater than 50 mm, at least 100 mm, at least 200 mm.

The arch 3690 may have a width $W_A$ between the first side 3691 and the second side 3693. The width $W_A$ may be at least 5 mm, at least 10 mm, at least 20 mm, at least 50 mm, at least 100 mm, at least 200 mm. The width $W_A$ may be no greater than 5 mm, no greater than 10 mm, no greater than 20 mm, no greater than 50 mm, no greater than 100 mm, no greater than 200 mm.

The arch 3690 may have a thickness $T_A$ between the front side 3691a, 3693a, and the back side 3691b, 3693b of the sides. The thickness $T_A$ may be at least 0.5 mm, at least 1 mm, at least 5 mm, at least 10 mm, at least 15 mm, at least 20 mm, at least 25 mm. The thickness $T_A$ may be no greater than 0.5 mm, no greater than 1 mm, no greater than 5 mm, no greater than 10 mm, no greater than 15 mm, no greater than 20 mm, no greater than 25 mm.

In a number of embodiments, the barrier attachment component 3653 may include a clip 3665 adapted to couple or uncouple the barrier attachment component 3653 to the barrier 3631 (FIGS. 39-40). Versions of the clip 3665 may include an elongated, substantially flat component that wraps around and engages opposite sides of the second end 3647 of the hanger 3641. The clip 3665 may be depressed or actuated to couple or uncouple the barrier 3631 from the hanger 3641.

Figure 45:
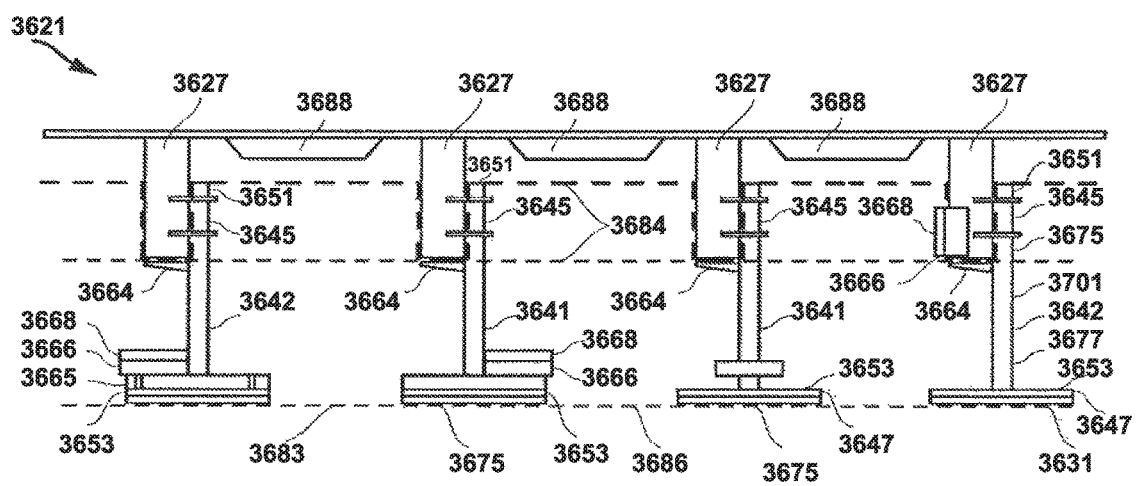
FIG. 45 is a partially sectioned side view of another embodiment of an insulation system.

In a number of embodiments, as shown in FIG. 45 the system 3521 may further include at least one insulation support member 3666, 3668 coupled to at least one of the axial midsection 3654, barrier 3631, the barrier attachment component 3653, the beam 3627 or the beam attachment component 3651. The at least one insulation support member 3666, 3668 may include a substantially planar, elongated panel. The substantially planar, elongated panel or first insulation support member 3666 may be engaged to, in contact with, or directly fastened to the clip 3665. In addition, the second insulation support member 3668 may be engaged to, in contact with, or directly fastened to the first insulation support member 3666, which may be substantially perpendicular to each other. In one version, the second insulation support member 3668 may include a reinforcement rib 3670. In one embodiment, the substantially planar, elongated panel of the first insulation support member 3666 may be directly fastened to the barrier attachment component 3653 while the substantially planar, elongated panel of the second insulation support member 3668 may be directly fastened to the first panel, where the second support member 3668 may be substantially perpendicular to the first support member 3666. In one embodiment, the substantially planar, elongated panel of the first insulation support member 3666 may be directly fastened to the beam attachment component 3651 while the substantially planar, elongated panel of the second insulation support member 3668 may be directly fastened to the first panel, where the second support member 3668 may be substantially perpendicular to the first support member 3666.

Referring still to FIG. 45, embodiments of the hanger 3641 may include a plate 3675, such as a metal plate, may be located inside one or both of the beam attachment component 3651 or the barrier attachment component 3653. In a number of embodiments, the hanger 3641 may include a ruler 3705 along a face of the hanger 3641 to facilitate measurement, adjustment, and calibration of the insulation system 3621 to adjust at least one of the hanger 3641, insulation space, barrier 3631 or beam 3627, or another variable of the insulation system 3621.

The insulation system 3621 also may include a compressible, incompressible, open-cell, or closed-cell foam 3677 (FIGS. 46, 45) located within the insulation space between the first end 3645 and the second end 3647 to elastify a junction therebetween and improve acoustic insulation thereof. In still another embodiment, the barrier 3631 or beam 3627 may be secured to the hanger 3641 with a magnet (not shown).

Figure 46:
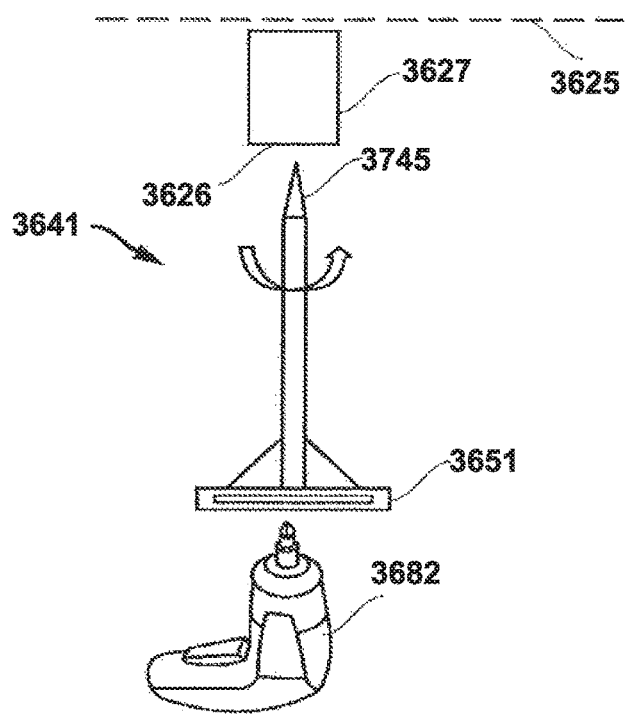
FIG. 46 is a side view of embodiments of an insulation system.

As shown in FIG. 46, embodiments of the first end 3645 or beam attachment component 3651 may include a fastener 3611 that may include a pointed screw or nail that may be screwed directly into an axial bottom 3626 of the beam 3627. The axial bottom 3626 of the beam 3627 may be substantially parallel to the roof deck 3625. In one example, the first end 3645 of hanger 3641 may include a socket (not shown) configured to be engaged and driven by a screwdriver, hammer, or other means 3682 for engaging a fastener 3711 to a beam 3627.

Figure 47:
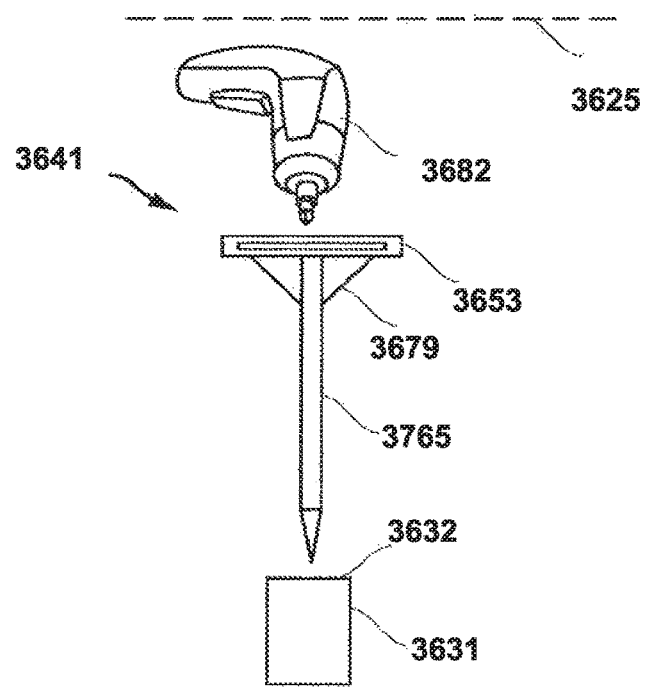
FIG. 47 is a side view of embodiments of an insulation system.

As shown in FIG. 47, embodiments of the second end 3647 or barrier attachment component 3653 may include a fastener 3611 that may include a pointed screw or nail 3765 that may be screwed directly into an axial top 3632 of the barrier 3631. The axial top 3632 of the barrier 3631 may be substantially parallel to the roof deck 3625. In one example, the second end 3647 of hanger 3641 may include a socket (not shown) configured to be engaged and driven by a screwdriver, hammer, or other means 3682 for engaging a fastener 3711 to a barrier 3631.

Embodiments of the insulation system 3621 may enable the hanger 3641 to support one or more breathable house wraps 3684 (FIG. 45) adjacent the first end 3645 or the second end 3647. In addition, a fabric 3686 may be positioned adjacent the second end 3647, with or without the use of baffles 3688.

Figure 48:
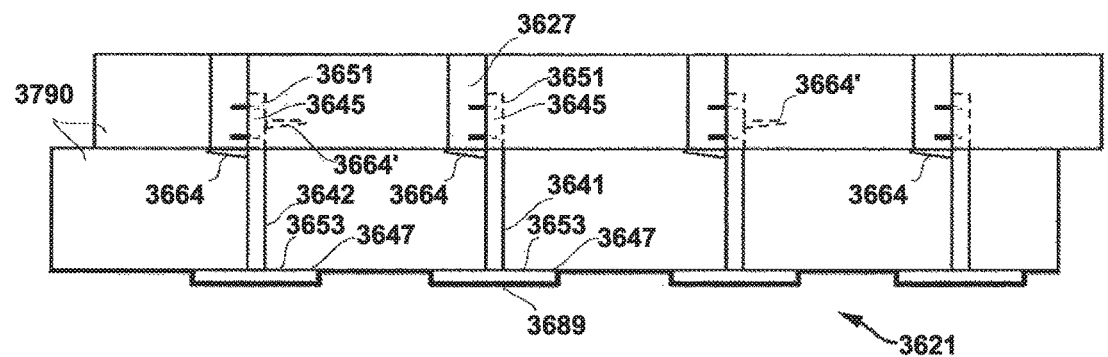
FIG. 48 is a partially sectioned side view of an embodiment of an insulation system.

As shown in FIG. 48, the insulation system 3621 may include insulation comprising kraft-faced batts 3790 of insulation. In some embodiments, the kraft-faced batts 3790 of insulation or the insulation 3643 as described herein can fill the insulation space between the first end 3645 and the second end 3647 of the hanger 3641. In some embodiments, the kraft-faced batts 3790 of insulation or the insulation 3643 as described herein can fill the insulation space between the beam 3627 and the barrier 3631. In some embodiments, the kraft-faced batts 3790 of insulation or the insulation 3643 as described herein can fill the insulation space between the bottom 3626 of the beam 3627 and the top 3632 of the barrier 3631. In some embodiments, the kraft-faced batts 3790 of insulation or the insulation 3643 as described herein can fill the insulation space between the deck 3625 and the barrier 3631. In some embodiments, to avoid air flow in the insulation 3643, ventilation baffles 3688 may be installed under the deck 3625 between a soffit and a ridge vent as is commonly known in the art. In some embodiments, the second ends 3647 of the hangers 3641 may be closed by at least one of bonded, taped or stapled to the kraft-faced batts 3790. In some embodiments, the first ends 3645 of the hangers 3641 may be closed by at least one of bonded, taped or stapled to the kraft-faced batts 3790. In a number of embodiments, tape 3689 may be used to fasten the first or second ends 3645, 3647 of the hanger 3641 to the kraft-faced batts 3790. The tape may have a releasable liner, release coating, or could be unrolled to apply to either the first or second ends 3645, 3647 of the hanger 3641, or to the kraft-faced batts 3790. In some embodiments, the junction between the facing of the kraft-faced batts 3790 of insulation or the insulation 3643 and the hanger 3641 may be attached by the tape 3689. In some embodiments, the tape 3689 may be on the hanger 3641 or on the kraft-faced batts 3790 of insulation or the insulation 3643. In some embodiments, the tape 3689 may be double sided. As an example, a tape 3689 with a releasable liner may be positioned on one or both of the first end 3645 and the second end 3647. In a number of embodiments, the tape 3689 may be on at least one of the beam attachment component 3651 or the barrier attachment component 3653. In one version, the tape 3689 may be butyl tape. Such closures may enhance airtightness and moisture management, and avoid sagging thereof. Sagging could generate holes in the system and thermal bridges between the two insulation layers, resulting in potentially unwanted air flows. The number, layering, or arrangement of the kraft-faced batts 3790 may be any value and is not limited to the embodiments shown in FIG. 48.

Figure 49:
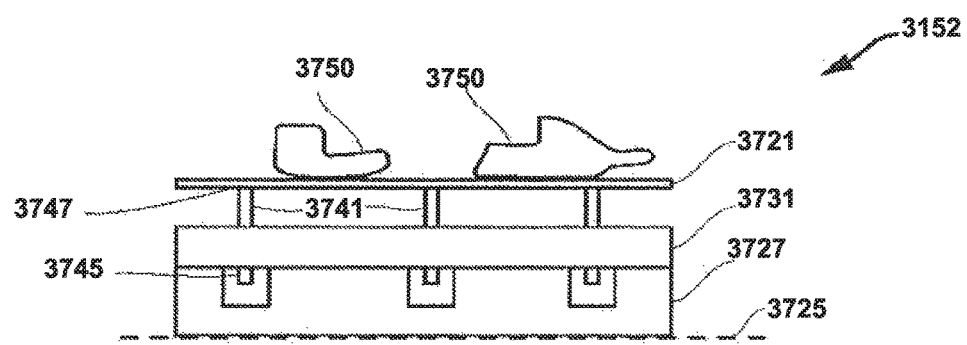
FIG. 49 is a partially sectioned side view of still another embodiment of an insulation system.

Embodiments of the insulation system 3621 may be altered or adapted for other parts of the attic. For example, the insulation system 3621 also may be configured for use on vertical walls or horizontal floors in the attic. As shown in FIG. 49, an insulation system 3721 for a home may include an attic with a deck 3725, and beams 3727 fastened to the deck 3725. The deck 3725 may be an attic floor deck, a vertical wall deck or a roof deck. The beams 3727 may be floor joists, vertical wall beams or roof rafters.

As shown in FIG. 49, embodiments of the insulation system 3721 may include a barrier 3731, and hangers 3741 for providing the insulation space in the attic. Each of the hangers 3741 may include a midsection having a shaft, and a first end 3745 coupled to one of the beams 3727, and a distal end 3747 coupled to the barrier 3731. An insulation space may be defined between the first and second ends 3745, 3747 of the hangers 3741 inside the barrier 3731 to at least partially contain the insulation 3743. The hangers 3741 can be load bearing, such that the insulation system 3721 can support and store objects 3750 on top of the barrier 3731.

In a number of embodiments, any component, or combination of components of the insulation system 3621 (including the barrier 3631, hanger 3641 (including any of its components), insulation 3643, beam 3627, tape 3689, insulation support member 3666, 3668, house wrap 3684, baffle 3688, fabric 3683, kraft-faced batts 3790, any combination thereof, or other component) may be fire class A (ASTM E84 classification). Fire retardant agents may be added to any component of the insulation system 3621. In an embodiment, the insulation system 3621 has a fire class A rating. In another embodiment, the barrier 3631, hanger 3641 (including any of its components), insulation 3643, beam 3627, tape 3689, insulation support member 3666, 3668, house wrap 3684, baffle 3688, fabric 3683, kraft-faced batts 3790, any combination thereof, or other component has a fire class A rating.

In a number of embodiments, any component, or combination of components of the insulation system 3621 (including the barrier 3631, hanger 3641 (including any of its components), insulation 3643, beam 3627, tape 3689, insulation support member 3666, 3668, house wrap 3684, baffle 3688, fabric 3683, kraft-faced batts 3790, any combination thereof, or other component) may be configured to provide and adjust moisture management to a desirable level based on the application of the insulation system 3621, thanks to the use of a smart vapor retarder, a vapor open membrane or a vapor barrier adapted to the climate zone positioned on the inner side of the system 3621. Examples of these components are shown in U.S. Patent Publication No. 2015-0176211 to Knapp et al., U.S. Pat. No. 7,008,890 to Kunzel et al., and W.O. Patent Publication No. WO 2015/095786 to Peet et al.

In a number of embodiments, any component, or combination of components of the insulation system 3621 (including the barrier 3631, hanger 3641 (including any of its components), insulation 3643, beam 3627, tape 3689, insulation support member 3666, 3668, house wrap 3684, baffle 3688, fabric 3683, kraft-faced batts 3790, any combination thereof, or other component) may be configured to provide and adjust air tightness to a desirable level based on the application of the insulation system 3621. In an embodiment the insulation system can gave a particular Air Changes per Hour ("ACH") rating, such as an "ACH50" ((air exchange per hour at 50 Pa) rating. In an embodiment, the insulation system can comprise an ACH50 rating of not greater than 5, such as not greater than 3, such as not greater than 1.5, or not greater than 0.6. The improved airtightness on the inner side of the roof gives a better moisture control than other solutions found in the literature using an airtightness on the roof deck (external side of the assembly).

Figure 50:
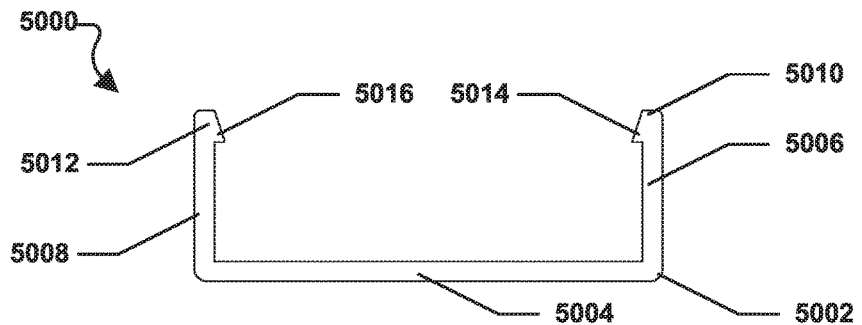
FIG. 50 is an end view of an insulation support rail.
Figure 51:
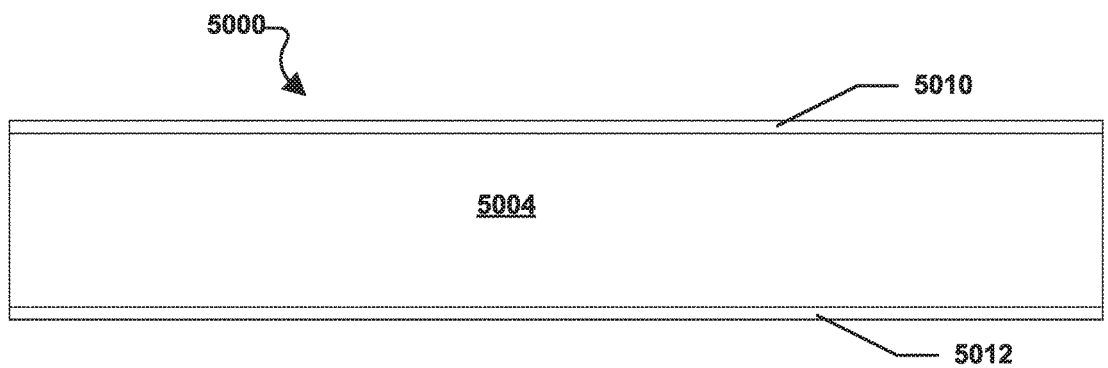
FIG. 51 is a top plan view of an insulation support rail.
Figure 52:
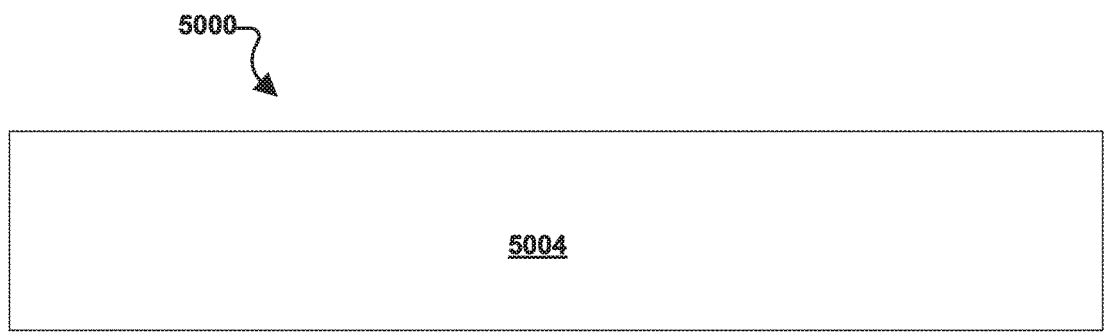
FIG. 52 is a bottom plan view of an insulation support rail.

Referring now to FIG. 50 through FIG. 52, an insulation support rail is illustrated and is generally designated 5000. As shown, the insulation support rail 5000 can include a generally U-shaped body 5002 that includes a base plate 5004. A first tine 5006 can extend from the base plate 5004. Further, a second tine 5008 can extend from the base plate 5004. The tines 5006, 5008 can be substantially perpendicular to the base 5004 of the body 5002 of the insulation support rail 5000. Each tine 5006, 5008 can include a distal end 5010, 5012 formed with an insulation engagement structure 5014, 5016. The insulation engagement structure 5014, 5016 can include a barb or a hook. The insulation support rail 5000 can be used to support insulation as described in greater detail below.

In a particular aspect, the insulation support rail 5000 is generally elongated and can include a length and a width. The ratio of the length to the width, $R_{LW}$ can be less than or equal to 0.1. Further, $R_{LW}$ can be less than or equal to 0.09, such as less than or equal to 0.08, less than or equal to 0.07, less than or equal to 0.06, or less than or equal to 0.05. In another aspect, $R_{LW}$ can be greater than or equal to 0.005, such as greater than or equal to 0.01, greater than or equal to 0.02, greater than or equal to 0.03, or greater than or equal to 0.04. It is to be understood that $R_{LW}$ can be within a range between, and including, any of the maximum and minimum values of $R_{LW}$ described herein.

Figure 53:
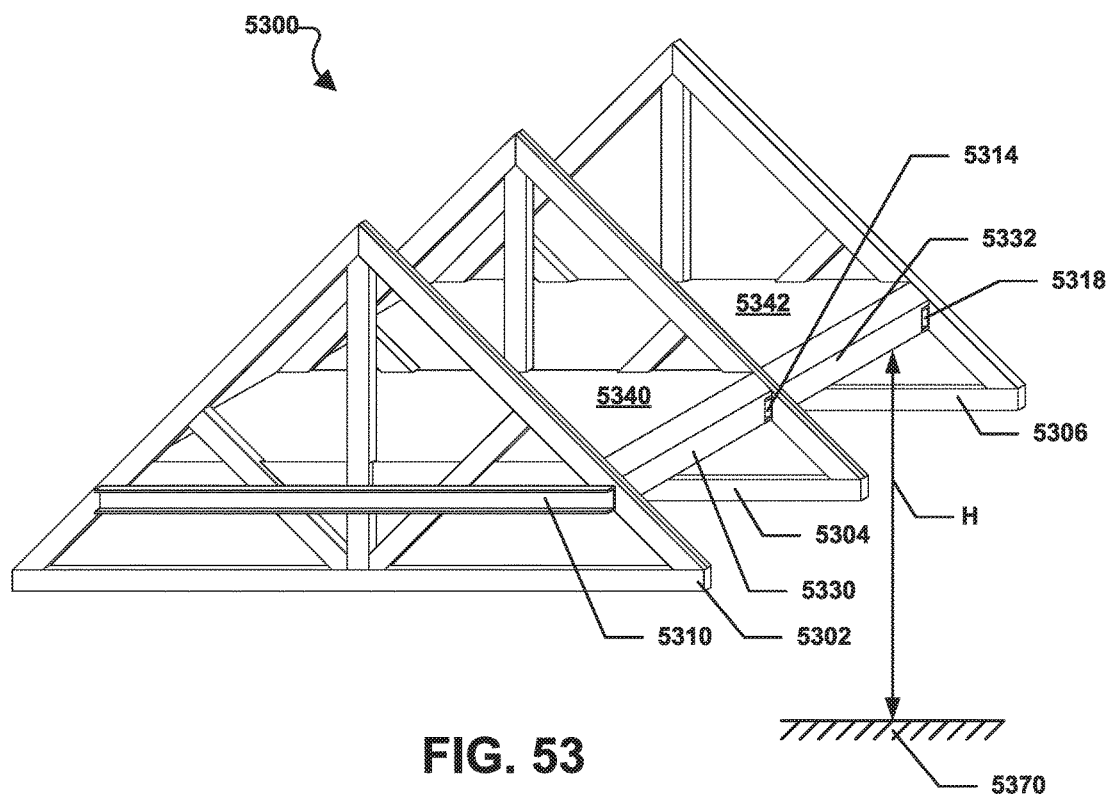
FIG. 53 is a perspective view of an insulation system.
Figure 54:
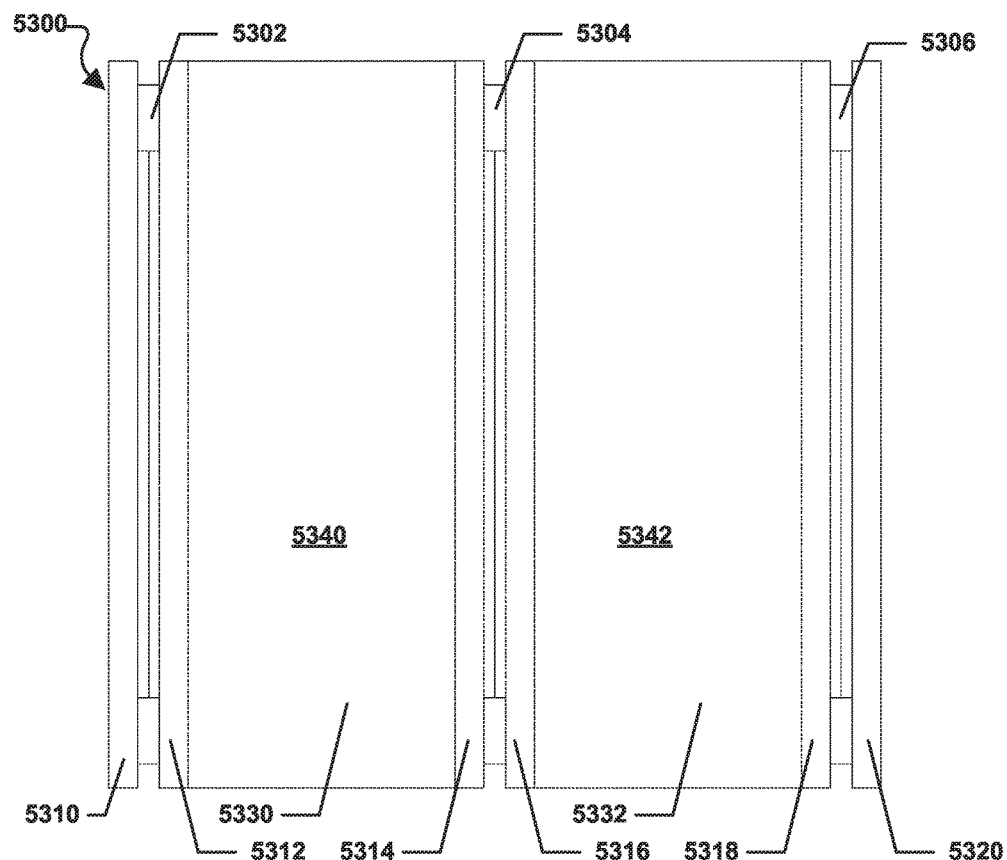
FIG. 54 is a top plan view of an insulation system.

FIG. 53 through FIG. 55 illustrate an insulation system 5300. As shown, the insulation system 5300 can include a first building structure 5302, a second building structure 5304, and a third building structure 5306. In a particular aspect, the building structures 5304, 5306, 5308 are trusses, e.g., roofing trusses. Also, while three building structures 5304, 5306, 5308 are illustrated, it can be appreciated that the system 5300 can include any number of building structures spaced apart in a manner similar to the structures 5304, 5306, 5308 shown in FIG. 53 or space apart as is well known in the construction industry.

FIG. 53 through FIG. 55 further indicate that the insulation system 5300 can include a first insulation support rail 5312 coupled, or otherwise affixed, to one side of the first building structure 5302 and a second insulation support rail 5314 coupled, or otherwise affixed, to the other side of the first building structure 5302. A third insulation support rail 5314 can be coupled, or otherwise affixed, to one side of the second building structure 5304 and a fourth insulation support rail 5316 can be coupled, or otherwise affixed, to the other side of the second building structure 5304. Moreover, a fifth insulation support rail 5318 can be coupled, or otherwise affixed, to one side of the third building structure 5306 and a sixth insulation support rail 5320 can be coupled, or otherwise affixed, to the other side of the third building structure 5306.

In a particular aspect, the insulation support rails 5310, 5312, 5314, 5316, 5318, 5320 can be configured similar to any of the insulation support rails described herein. Further, the insulation support rails 5310, 5312, 5314, 5316, 5318, 5320 can be affixed to the respective building structures 5302, 5304, 5306 using staples, nails, screws, glue, tape, or any other appropriate fastening means. It is to be understood that the insulation support rails 5310, 5312, 5314, 5316, 5318, 5320 have little or no structural value—other than the ability to engage and hold relatively lightweight insulation batts or pieces of lightweight insulation cut from rolls. In other words, the insulation support rails 5310, 5312, 5314, 5316, 5318, 5320 are non-structural, non-load transmitting, and non-load bearing.

Further, the insulation support rails 5310, 5312, 5314, 5316, 5318, 5320 will not change the load bearing characteristics of the building structures 5302, 5304, 5306 on which the insulation support rails 5310, 5312, 5314, 5316, 5318, 5320 are installed. As such, when the insulation support rails 5310, 5312, 5314, 5316, 5318, 5320 are installed on a pre-engineered building structure, e.g., one or more of the building structures 5302, 5304, 5306 described herein, the pre-engineered building structure will perform as intended and the insulation support rails 5310, 5312, 5314, 5316, 5318, 5320 will not substantially alter the performance, or any structural characteristics or load bearing characteristics, of the pre-engineered building structure on which one or more of the insulation support rails 5310, 5312, 5314, 5316, 5318, 5320 are installed. In one aspect, the insulation support rails 5310, 5312, 5314, 5316, 5318, 5320 may comprise a polymer. For example, the insulation support rails 5310, 5312, 5314, 5316, 5318, 5320 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. It is to be understood that the insulation support rails 5310, 5312, 5314, 5316, 5318, 5320 can be extruded to form any of the cross-sectional shapes described herein. In another embodiment, the insulation support rails 5310, 5312, 5314, 5316, 5318, 5320 comprise a lightweight wood.

It is also to be understood that the junction between the insulation support rails 5310, 5312, 5314, 5316, 5318, 5320 and the building structures 5302, 5304, 5306 on which they are installed provided by the fastener is also a non-load bearing junction. This will further prevent the insulation support rails 5310, 5312, 5314, 5316, 5318, 5320 from altering the pre-engineered load bearing characteristics of the building structures 5302, 5304, 5306 on which the insulation support rails 5310, 5312, 5314, 5316, 5318, 5320 are installed.

Referring back to FIG. 53 through FIG. 55, the insulation system 5300 can further include a first cavity 5330 established, or otherwise formed between, the first building structure 5302 and the second building structure 5304, e.g., between the second insulation support rail 5312 affixed to the first building structure 5302 and the third insulation support rail 5314 affixed to the second building structure 5304. Moreover, the insulation system 5300 can include a second cavity 5332 established, or otherwise formed between, the second building structure 5304 and the third building structure 5306, e.g., between the fourth insulation support rail 5316 affixed to the second building structure 5304 and the fifth insulation support rail 5318 affixed to the third building structure 5306.

In a particular aspect, each cavity 5330, 5332 can define a cavity width, $W_C$, and $W_C$ is less than or equal to 48.0 inches. Further, $W_C$ can be less than or equal to 44.0 inches, such as less than or equal to 40.0 inches, less than or equal to 36.0 inches, less than or equal to 32.0 inches, less than or equal to 28.0 inches, less than or equal to 24.0 inches, less than or equal to 23.5.0 inches, less than or equal to 23.0 inches, less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, less than or equal to 16.5 inches, or less than or equal to 16.0 inches. In another aspect, $W_C$ can be greater than or equal to 10.0 inches, such as greater than or equal to 10.5 inches, greater than or equal to 11.0 inches, greater than or equal to 11.5 inches, or greater than or equal to 12.0 inches. It is to be understood that $W_C$ can be within a range between, and including, any of the maximum and minimum values of $W_C$ described herein.

As further indicated in FIG. 53 through FIG. 55, the insulation system 5300 can include a first insulation batt 5340 installed within the first cavity 5330 and held firmly in place by the engagement of the second and third insulation support rails 5312, 5314. A second insulation batt 5342 can be installed, or otherwise disposed, within the second cavity 5342 and held firmly in place by the engagement of the fourth and fifth insulation support rails 5316, 5318. In a particular aspect, the insulation batts 5340, 5342 can be pre-cut insulation batts. In another aspect, the insulation batts 5340, 5342 can be cut from rolls of insulation. As indicated in FIG. 55, the insulation batts 5340 can have a width that is greater than $W_C$ and as such, the insulation batts 5340, 5342 can expand over the insulation support rails and engage each other to create an air tight space above and below the insulation batts 5340, 5342. To further seal the insulation batts 5340, 5342, barriers 5350, 5352 provided on the insulation batts 5340, 5342 can be sealed with tape 5360.

In a particular aspect, the insulation batts 5340, 5342 can be placed a height, H, above a floor 5370 and H can be greater than or equal to 3 feet. Moreover, can be greater than or equal to 3.5 feet, such as greater than or equal to 4.0 feet, greater than or equal to 4.5 feet, greater than or equal to 5.0 feet, greater than or equal to 5.5 feet, or greater than or equal to 6.0 feet. In another aspect, H can be less than or equal to 10.0 feet, such as less than or equal to 9.5, less than or equal to 9.0 feet, less than or equal to 8.5 feet, less than or equal to 8.0 feet, less than or equal to 7.5 feet, less than or equal to 7.0 feet, or less than or equal to 6.5 feet.

It can be appreciated that installing the insulation batts 5340, 5342 as shown in FIG. 53 through FIG. 55 may include particular method steps. For example, a method of installing insulation can include installing a first rail on a first truss, installing a second rail on a second truss spaced a distance from the first truss to establish a first cavity between the first rail and the second rail, and installing a first insulation batt within the first cavity. The method can further include installing a third rail on the second truss opposite the second rail and installing a fourth rail on a third truss spaced a distance from the second truss to establish a second cavity between the third rail and the second rail. Moreover, the method can include installing a second insulation batt within the second cavity. The method can also include affixing the first rail and the second rail to the first truss and affixing the third rail and the fourth rail to the second truss. In particular, affixing the rails can include stapling the rails. In particular, the staples can have a shear strength of less than or equal to 100 Pascals. Further, the staples can have a shear strength that can be less than or equal to 95 Pascals, such as less than or equal to 90 Pascals, less than or equal to 85 Pascals, less than or equal to 80 Pascals, or less than or equal to 75 Pascals. In another aspect, the staples can have a shear strength that can be greater than or equal to 10 Pascals, such as greater than or equal to 15 Pascals, greater than or equal to 20 Pascals, greater than or equal to 25 Pascals, greater than or equal to 30 Pascals, greater than or equal to 35 Pascals, greater than or equal to 40 Pascals, greater than or equal to 45 Pascals, or greater than or equal to 50 Pascals. It can be appreciated that the shear strength of the staples can be between and including any of the maximum and minimum values described herein.

The method can also include applying tape to a linear junction between the first batt and the second batt. It can be appreciated that the insulation batts, or a portion thereof (e.g., a barrier flap) can be stapled or otherwise affixed to a face of each rail. It can be appreciated that the rails can be installed substantially horizontal. Further, the rails can be installed substantially perpendicular to a vertical mid-line of the trusses. In a particular aspect, each of the rails includes a cross-section that is generally U-shaped, as disclosed herein, with an open end and a closed end and each rail is installed with the closed end adjacent to a respective truss.

Figure 56:
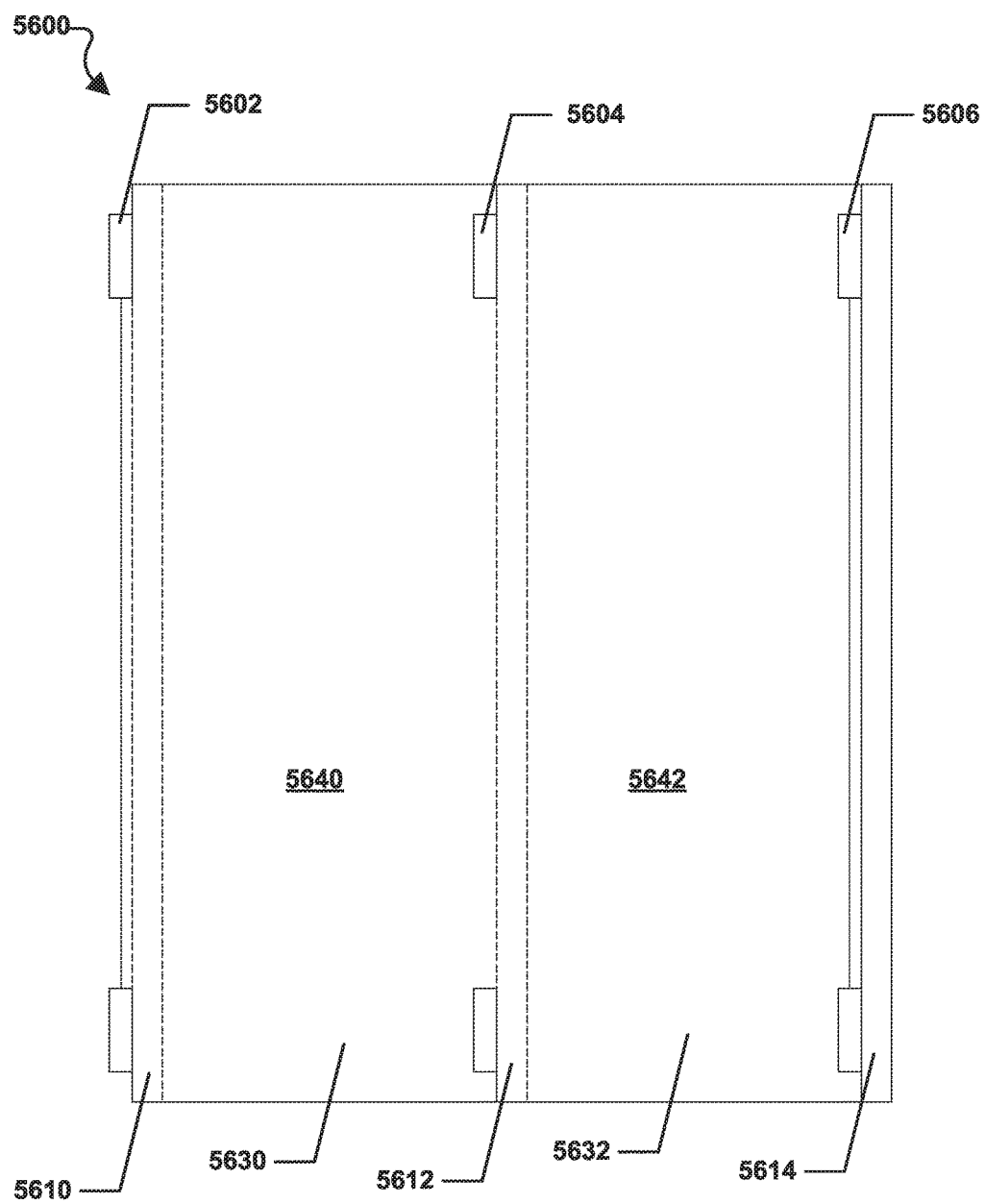
FIG. 56 is a top plan view of an insulation system.

FIG. 56 shows another insulation system 5600. As shown, the insulation system 5600 can include a first building structure 5602, a second building structure 5604, and a third building structure 5606. FIG. 56 further indicate that the insulation system 5600 can include a first insulation support rail 5612 coupled, or otherwise affixed, to first building structure 5602. A second insulation support rail 5614 can be coupled, or otherwise affixed, to the second building structure 5604. A third insulation support rail 5614 can be coupled, or otherwise affixed, to the third building structure 5606.

In a particular aspect, the insulation support rails 5610, 5612, 5614 can be configured similar to any of the insulation support rails described herein. Further, the insulation support rails 5610, 5612, 5614 can be affixed to the respective building structures 5602, 5604, 5606 using staples, nails, screws, glue, tape, or any other appropriate fastening means. It is to be understood that the insulation support rails 5610, 5612, 5614 have little or no structural value—other than the ability to engage and hold relatively lightweight insulation batts or pieces of lightweight insulation cut from rolls. In other words, the insulation support rails 5610, 5612, 5614 are non-structural, non-load transmitting, and non-load bearing.

Further, the insulation support rails 5610, 5612, 5614 will not change the load bearing characteristics of the building structures 5602, 5604, 5606 on which the insulation support rails 5610, 5612, 5614 are installed. As such, when the insulation support rails 5610, 5612, 5614 are installed on a pre-engineered building structure, e.g., one or more of the building structures 5602, 5604, 5606 described herein, the pre-engineered building structure will perform as intended and the insulation support rails 5610, 5612, 5614 will not substantially alter the performance, or any structural characteristics or load bearing characteristics, of the pre-engineered building structure on which one or more of the insulation support rails 5610, 5612, 5614 are installed.

In one aspect, the insulation support rails 5610, 5612, 5614 may comprise a polymer. For example, the insulation support rails 5610, 5612, 5614 may comprise one or more of the following materials: thermoplastics, injection molding plastics, virgin polyvinylchloride (PVC), recycled PVC, foamed PVC, CPVC, acrylonitrile butadiene styrene (ABS), polyether ether ketone (PEEK), polymethyl methacrylate (PMMA), polyimide, thermoplastic olefin (TPO), nylon, etc., and glass-reinforced versions of the aforementioned materials. It is to be understood that the insulation support rails 5610, 5612, 5614 can be extruded to form any of the cross-sectional shapes described herein. In another embodiment, the insulation support rails 5610, 5612, 5614 comprise a lightweight wood.

It is also to be understood that the junction between the insulation support rails 5610, 5612, 5614 and the building structures 5602, 5604, 5606 on which they are installed provided by the fastener is also a non-load bearing junction. This will further prevent the insulation support rails 5610, 5612, 5614 from altering the pre-engineered load bearing characteristics of the building structures 5602, 5604, 5606 on which the insulation support rails 5610, 5612, 5614 are installed.

Referring still to FIG. 56, the insulation system 5600 can further include a first cavity 5630 established, or otherwise formed between, the first building structure 5602 and the second building structure 5604, e.g., between the first insulation support rail 5610 and the second building structure 5604. Moreover, the insulation system 5600 can include a second cavity 5632 established, or otherwise formed between, the second building structure 5604 and the third building structure 5606, e.g., between the second insulation support rail 5612 and the third building structure 5606.

In a particular aspect, each cavity 5630, 5632 can define a cavity width, $W_C$, and $W_C$ is less than or equal to 48.0 inches. Further, $W_C$ can be less than or equal to 44.0 inches, such as less than or equal to 40.0 inches, less than or equal to 36.0 inches, less than or equal to 32.0 inches, less than or equal to 28.0 inches, less than or equal to 24.0 inches, less than or equal to 23.5.0 inches, less than or equal to 23.0 inches, less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, less than or equal to 16.5 inches, or less than or equal to 16.0 inches. In another aspect, $W_C$ can be greater than or equal to 10.0 inches, such as greater than or equal to 10.5 inches, greater than or equal to 11.0 inches, greater than or equal to 11.5 inches, or greater than or equal to 12.0 inches. It is to be understood that $W_C$ can be within a range between, and including, any of the maximum and minimum values of $W_C$ described herein.

As further indicated in FIG. 56 the insulation system 5600 can include a first insulation batt 5640 installed within the first cavity 5630. A second insulation batt 5642 can be installed, or otherwise disposed, within the second cavity 5642. In a particular aspect, the insulation batts 5640, 5642 can be pre-cut insulation batts. In another aspect, the insulation batts 5640, 5642 can be cut from rolls of insulation. As indicated in FIG. 55, the insulation batts 5640 can have a width that is greater than $W_C$ and as such, the insulation batts 5640, 5642 can expand over the insulation support rails and around the building structures to engage each other to create an air tight space above and below the insulation batts 5640, 5642. To further seal the insulation batts 5640, 5642, barriers provided on the insulation batts can be sealed with tape.

In a particular aspect, the insulation batts 5640, 5642 can be placed a height, H, above a floor 5670 and H can be greater than or equal to 3 feet. Moreover, can be greater than or equal to 3.5 feet, such as greater than or equal to 4.0 feet, greater than or equal to 4.5 feet, greater than or equal to 5.0 feet, greater than or equal to 5.5 feet, or greater than or equal to 6.0 feet. In another aspect, H can be less than or equal to 10.0 feet, such as less than or equal to 9.5, less than or equal to 9.0 feet, less than or equal to 8.5 feet, less than or equal to 8.0 feet, less than or equal to 7.5 feet, less than or equal to 7.0 feet, or less than or equal to 6.5 feet.

It can be appreciated that installing the insulation batts 5640, 5642 as shown in FIG. 56 may include particular method steps. For example, a method of installing insulation can include installing a first rail on a first truss to establish a first cavity between the first rail and a second truss, installing a second rail on the second truss to establish a second cavity between the second rail and a third truss, and installing a first insulation batt within the first cavity. The method can further include installing a second insulation batt within the second cavity. Thereafter, the method can include applying tape to a linear junction between the first batt and the second batt. It can be appreciated that the insulation batts, or a portion thereof (e.g., a barrier flap) can be stapled or otherwise affixed to a face of each rail. It can be appreciated that the rails can be installed substantially horizontal. Further, the rails can be installed substantially perpendicular to a vertical mid-line of the trusses. In a particular aspect, each of the rails includes a cross-section that is generally U-shaped, as disclosed herein, with an open end and a closed end and each rail is installed with the closed end adjacent to a respective truss.

Figure 57:
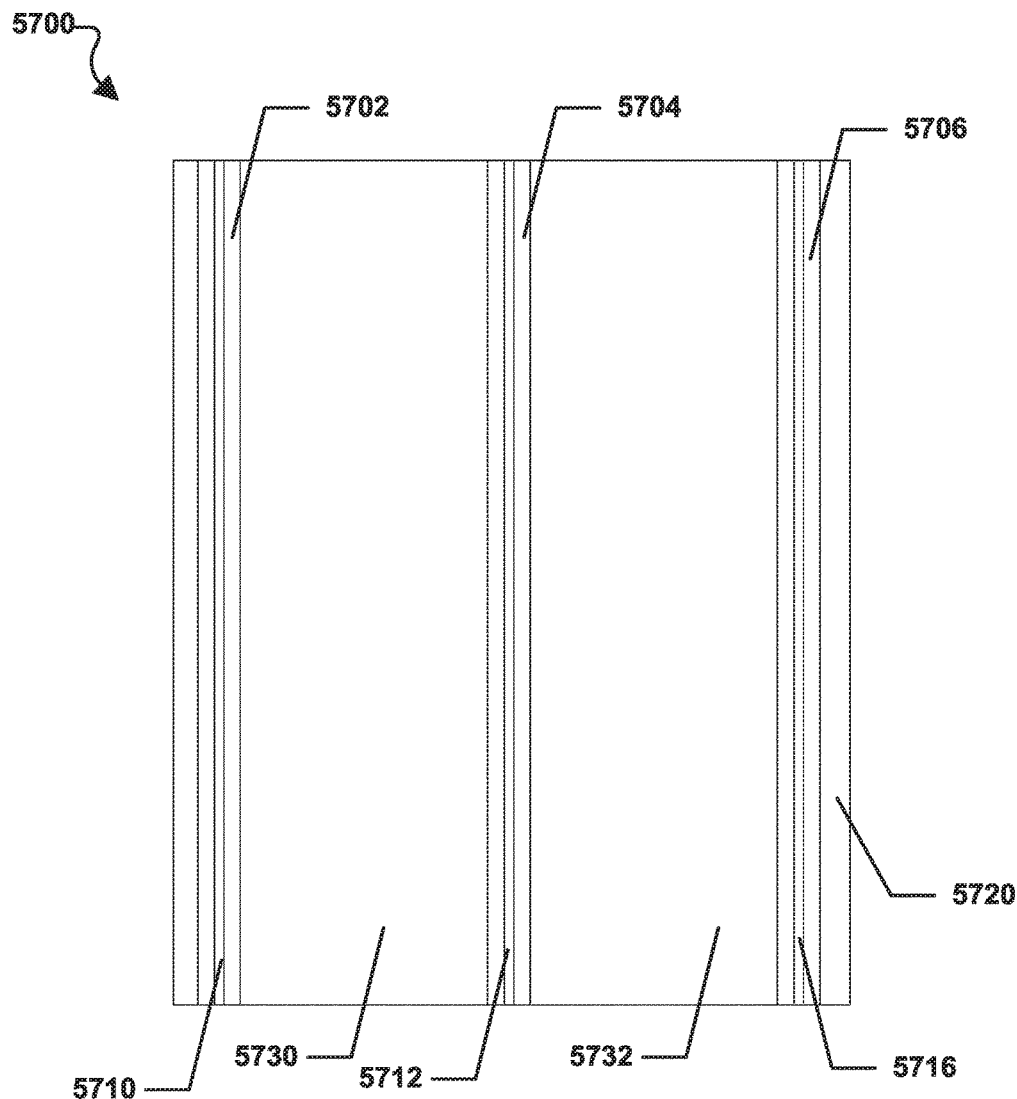
FIG. 57 is a side plan view of an insulation system.
Figure 58:
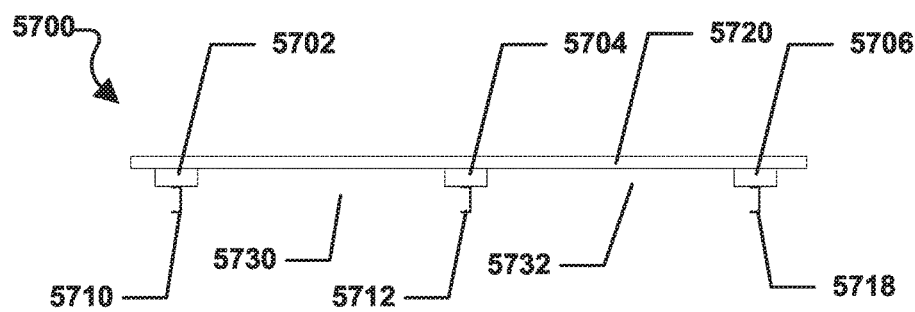
FIG. 58 is a top plan view of an insulation system.

Referring now to FIG. 57 through FIG. 60 shows another insulation system is illustrated and is generally designated 5700. As shown, the insulation system 5700 can include a first wall stud 5702, a second wall stud 5704, and a third wall stud 5706. FIG. 57 further indicate that the insulation system 5700 can include a first insulation support rail 5712 coupled, or otherwise affixed, to a face of first wall stud 5702. A second insulation support rail 5714 can be coupled, or otherwise affixed, to a face of the second wall stud 5704. A third insulation support rail 5714 can be coupled, or otherwise affixed, to a face of the third wall stud 5706. The insulation support rails 5710, 5712, 5714 can be generally U-shaped and the insulation support rails 5710, 5712, 5714 can be installed on the faces of the wall studs 5702, 5704, 5706 such that the longest dimension (in cross-section) of each of the insulation support rails 5710, 5712, 5714 is substantially perpendicular to the longest dimension (in cross-section) of the wall studs 5702, 5704, 5706. In other words, the U-shaped rails 5710, 5712, 5714 can have a base plate, a first tine, and a second tine, as described elsewhere herein, and one of the tines of each rail 5710, 5712, 5714 can be affixed to a face of a respective wall stud 5702, 5704, 5706. In such a case, the base plate of each rail 5710, 5712, 5714 is substantially perpendicular to the face of each wall stud 5702, 5704, 5706. In a particular aspect, the overall depth of each insulation support rail 5710, 5712, 5714 on its respective wall stud 5702, 5704, 5708 is approximately 3.5 inches.

In a particular aspect, the insulation support rails 5710, 5712, 5714 can be configured similar to any of the insulation support rails described herein. Further, the insulation support rails 5710, 5712, 5714 can be affixed to the respective wall studs 5702, 5704, 5706 using staples, nails, screws, glue, tape, or any other appropriate fastening means.

FIG. 57 through FIG. 60 further indicate that the insulation system 5700 can include an external sheathing 5720 affixed to the wall studs 5702, 5704, 5706 opposite the insulation support rails 5710, 5712, 5714. Moreover, the insulation system 5700 can include a first cavity 5730 established, or otherwise formed between, the first wall stud 5702 and the second wall stud 5704, between the first insulation support rail 5710 and the second insulation support rail 5712, or between a combination thereof. Moreover, the insulation system 5700 can include a second cavity 5732 established, or otherwise formed between, the second wall stud 5704 and the third wall stud 5706, between the second insulation support rail 5712 and the third insulation support rail 5714, or a combination thereof.

In a particular aspect, each cavity 5730, 5732 can define a cavity width, $W_C$, and $W_C$ is less than or equal to 48.0 inches. Further, $W_C$ can be less than or equal to 44.0 inches, such as less than or equal to 40.0 inches, less than or equal to 36.0 inches, less than or equal to 32.0 inches, less than or equal to 28.0 inches, less than or equal to 24.0 inches, less than or equal to 23.5.0 inches, less than or equal to 23.0 inches, less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, less than or equal to 16.5 inches, or less than or equal to 16.0 inches. In another aspect, $W_C$ can be greater than or equal to 10.0 inches, such as greater than or equal to 10.5 inches, greater than or equal to 11.0 inches, greater than or equal to 11.5 inches, or greater than or equal to 12.0 inches. It is to be understood that $W_C$ can be within a range between, and including, any of the maximum and minimum values of $W_C$ described herein.

Figure 59:
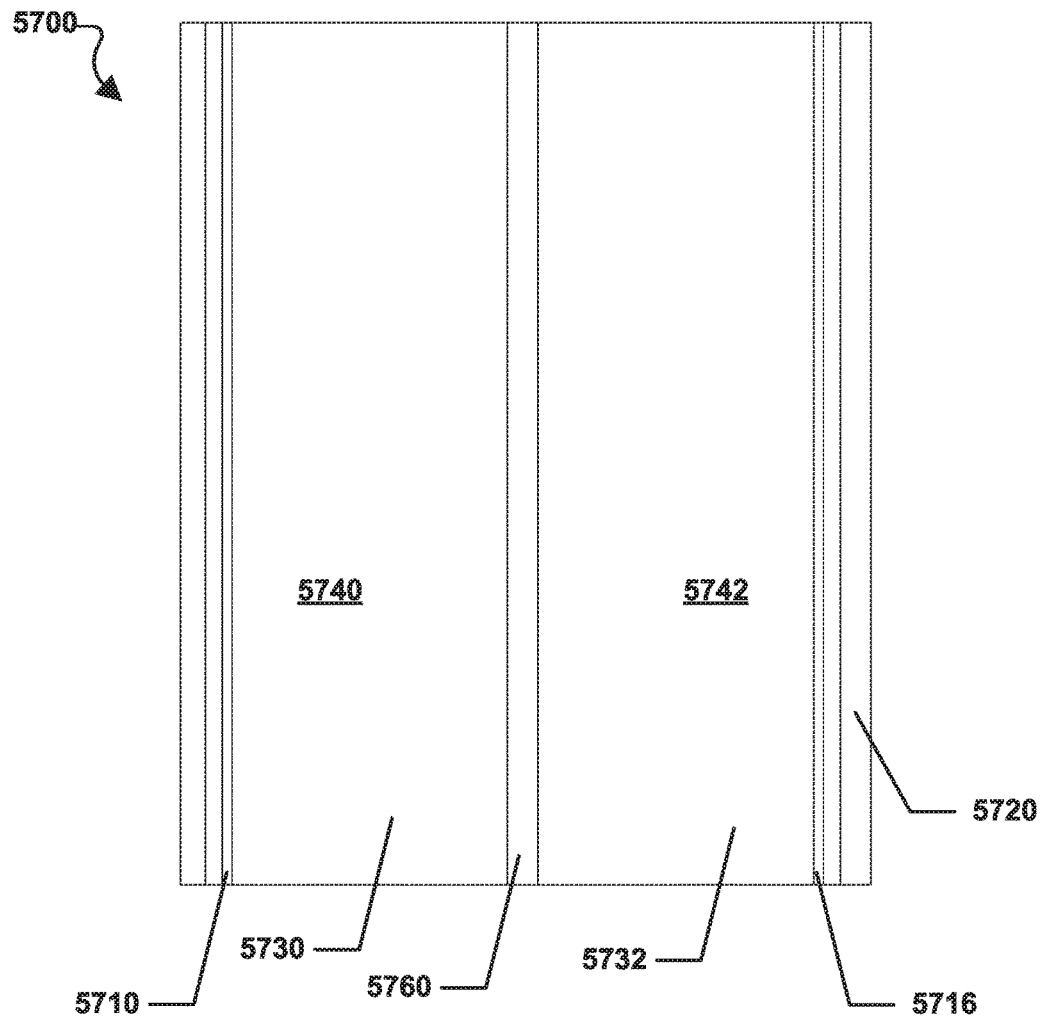
FIG. 59 is a side plan view of an insulation system.
Figure 60:
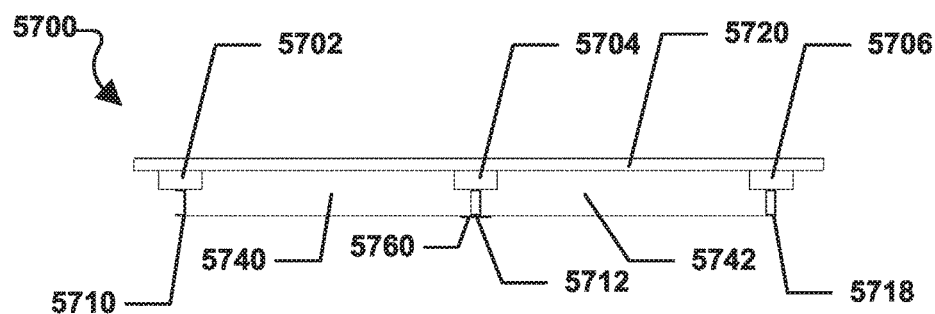
FIG. 60 is a top plan view of an insulation system.

As further indicated in FIG. 59 and FIG. 60 the insulation system 5700 can include a first insulation batt 5740 installed within the first cavity 5730. A second insulation batt 5742 can be installed, or otherwise disposed, within the second cavity 5742. In a particular aspect, the insulation batts 5740, 5742 can be pre-cut insulation batts. In another aspect, the insulation batts 5740, 5742 can be cut from rolls of insulation. As indicated in FIG. 55, the insulation batts 5740 can have a width that is greater than $W_C$ and as such, the insulation batts 5740, 5742 can expand over the insulation support rails and around the building structures to engage each other to create an air tight space above and below the insulation batts 5740, 5742. To further seal the insulation batts 5740, 5742, barriers provided on the insulation batts can be sealed with tape 5760.

The insulation system 5700 shows the rails 5710, 5712, 5714 vertically oriented relative to the wall studs 5702, 5704, 5706. It can be appreciated that the rails 5710, 5712, 5714 can be installed horizontally relative to the wall studs 5702, 5704, 5706. As such, the insulation batts 5740, 5742 installed between the rails 5710, 5712, 5714 can also be horizontal relative to the wall studs 5702, 5704, 5706. Further, an air gap can be provided between the insulation batts 5740, 5740 and the external sheathing 5720.

The insulation system 5700 illustrated in FIG. 57 through FIG. 60 can include particular method steps for installing the various components therein. For example, a method of installing insulation can include installing a first rail on a first vertical stud, installing a second rail on a second vertical stud spaced a distance from the first vertical stud to establish a first cavity between the first rail and the second rail, and installing a first insulation batt within the first cavity. The method can further include installing a third rail on a third vertical stud spaced a distance from the second vertical stud to establish a second cavity between the second rail and the third rail and installing a second insulation batt within the second cavity. Moreover, the method can include applying tape to a linear junction between the first batt and the second batt. In a particular aspect, the rails can be installed substantially vertical. Further, the rails can be installed substantially parallel to the studs. In a particular aspect, each of the rails can includes a cross-section that is generally U-shaped with an open end and a closed end and each rail is installed with the open end perpendicular to a face of the stud. Also, each of the rails is installed so that the open end of each rails faces the same direction.

Figure 61:
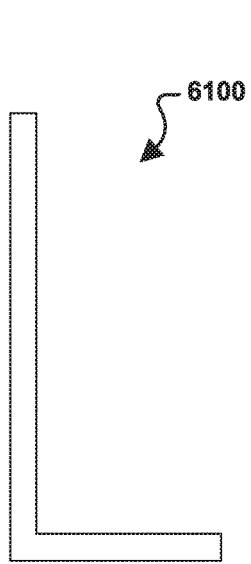
FIG. 61 is an end view of an insulation support rail.
Figure 62:
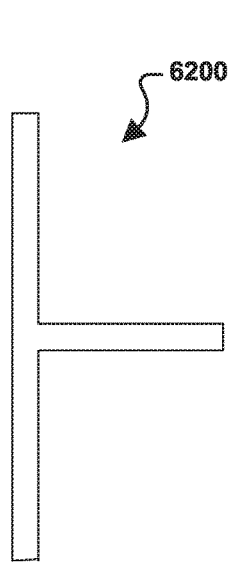
FIG. 62 is an end view of an insulation support rail.
Figure 63:
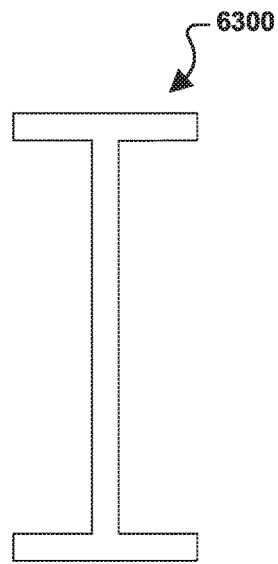
FIG. 63 is an end view of an insulation support rail.
Figure 64:
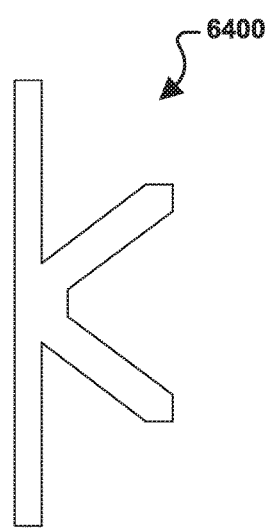
FIG. 64 is an end view of an insulation support rail.
Figure 65:
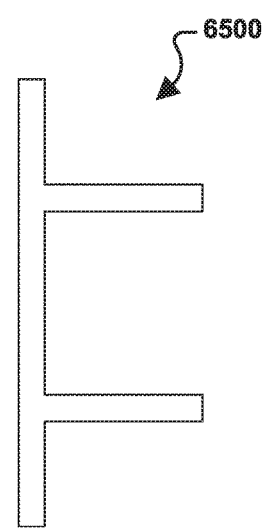
FIG. 65 is an end view of an insulation support rail.

FIG. 61 through FIG. 65 depict various other insulation support rails that can be used in conjunction with the insulation systems described herein. FIG. 61 shows an insulation support rail 6100 that is generally L-shaped. FIG. 62 shows an insulation support rail 6200 that is generally T-shaped and rotated 90 degrees. FIG. 63 shows an insulation support rail 6300 that is generally I-shaped. FIG. 64 shows an insulation support rail 6300 that is generally K-shaped with a base plate and two angled tines extending therefrom. FIG. 65 shows an insulation support rail 6500 that includes a base plate and two tines extending substantially perpendicular therefrom. It can be appreciated that each of the insulation support rails 6100, 6200, 6300, 6400, 6500 can include hooks or barbs as described in conjunction with the insulation support rail 5000 described in greater detail herein.

Figure 66:
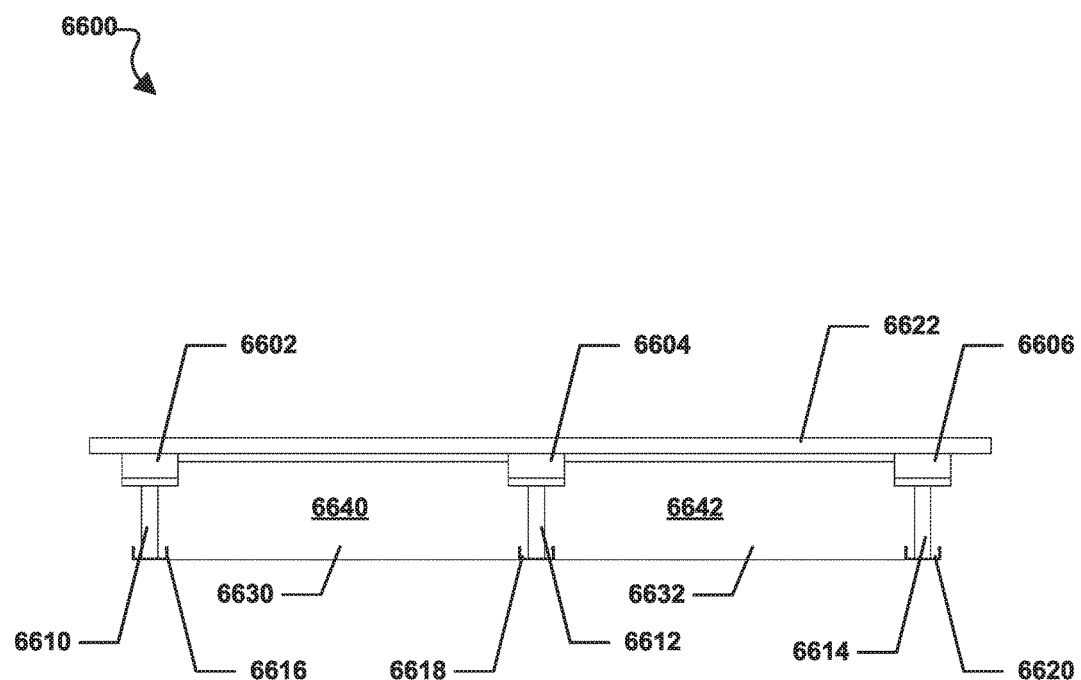
FIG. 66 is a top plan view of an insulation system.

Referring to FIG. 66 another insulation system is illustrated and is generally designated 6600. As shown, the insulation system 6600 can include a first wall stud 6602, a second wall stud 6604, and a third wall stud 6606. FIG. 66 further indicate that the insulation system 6600 can include a first hanger 6612 coupled, or otherwise affixed, to a face of first wall stud 6602. A second hanger rail 6614 can be coupled, or otherwise affixed, to a face of the second wall stud 6604. A third hanger 6614 can be coupled, or otherwise affixed, to a face of the third wall stud 6606. The hangers 6610, 6612, 6614 can be similar to any of the hangers described herein.

As illustrated, a first insulation support rail 6616 can be coupled to the first hanger 6610. Further, a second insulation support rail 6618 can be coupled to the second hanger 6612. A third insulation support rail 6620 can be coupled to the third hanger 6614. The insulation support rails 6616, 6618, 6620 can be generally U-shaped and the insulation support rails 6616, 6618, 6620 can be installed on the hangers 6610, 6612, 6614 so that the opening of the rail 6616, 6618, 6620 extends around an end of the hanger 6610, 6612, 6614.

FIG. 66 through FIG. 60 further indicates that the insulation system 6600 can include an external sheathing 6622 affixed to the wall studs 6602, 6604, 6606 opposite the hangers 6610, 6612, 6614. Moreover, the insulation system 6600 can include a first cavity 6630 established, or otherwise formed between, the first wall stud 6602 and the second wall stud 6604, between the first hanger 6610 and the second hanger 6612, between the first insulation support rail 6616 and the second insulation support rail 6618, or between a combination thereof. Moreover, the insulation system 6600 can include a second cavity 6632 established, or otherwise formed between, the second wall stud 6604 and the third wall stud 6606, between the second hanger 6612 and the third hanger 6614, between the second insulation support rail 6618 and the third insulation support rail 6620, or a combination thereof.

In a particular aspect, each cavity 6630, 6632 can define a cavity width, $W_C$, and $W_C$ is less than or equal to 48.0 inches. Further, $W_C$ can be less than or equal to 44.0 inches, such as less than or equal to 40.0 inches, less than or equal to 36.0 inches, less than or equal to 32.0 inches, less than or equal to 28.0 inches, less than or equal to 24.0 inches, less than or equal to 23.5.0 inches, less than or equal to 23.0 inches, less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, less than or equal to 16.5 inches, or less than or equal to 16.0 inches. In another aspect, $W_C$ can be greater than or equal to 10.0 inches, such as greater than or equal to 10.5 inches, greater than or equal to 11.0 inches, greater than or equal to 11.5 inches, or greater than or equal to 12.0 inches. It is to be understood that $W_C$ can be within a range between, and including, any of the maximum and minimum values of $W_C$ described herein.

Further, each cavity 6630, 6632 can define a cavity depth, $W_D$, measured from the external sheathing 6622 to the face of the rails 6616, 6618, 6630, and $W_D$ is less than or equal to 12.0 inches. Further, $W_D$ can be less than or equal to 11.5 inches, such as less than or equal to 11.0 inches, less than or equal to 10.5 inches, or less than or equal to 10.0 inches. In another aspect, $W_D$ can be greater than or equal to 3.5 inches, such as greater than or equal to 4.0 inches, greater than or equal to 4.5 inches, greater than or equal to 5.0 inches, greater than or equal to 5.5 inches, or greater than equal to 6.0 inches. It is to be understood that $W_D$ can be within a range between, and including, any of the maximum and minimum values of $W_D$ described herein.

As further indicated in FIG. 66 the insulation system 6600 can include a first insulation batt 6640 installed within the first cavity 6630. A second insulation batt 6642 can be installed, or otherwise disposed, within the second cavity 6642. In a particular aspect, the insulation batts 6640, 6642 can be pre-cut insulation batts. In another aspect, the insulation batts 6640, 6642 can be cut from rolls of insulation. As indicated in FIG. 55, the insulation batts 6640 can have a width that is greater than $W_C$ and as such, the insulation batts 6640, 6642 can expand over the insulation support rails and around the building structures to engage each other to create an air tight space above and below the insulation batts 6640, 6642. To further seal the insulation batts 6640, 6642, barriers provided on the insulation batts can be sealed with tape.

Still other versions may include one or more of the following embodiments:

Embodiment 1

A hanger for supporting insulation in an attic having rafters that support a roof deck, the hanger comprising:
a beam having an axis and an elongated profile in an axial direction, wherein the elongated profile comprises:
a proximal end configured to be coupled to the rafters, wherein the proximal end comprises at least one planar portion and is configured to be substantially parallel to the roof deck and substantially perpendicular to the rafters when installed;
a ventilated air gap is configured to be provided between the proximal end and the roof deck;
a distal end that is substantially planar and parallel to the planar portion of the proximal end;
at least one web that is substantially planar, the web extending substantially perpendicular to and between the proximal end and the distal end, and the web comprises apertures or voids located between the proximal and distal ends;
an insulation space defined along the web between the proximal and distal ends; and
the distal end is configured to be coupled to an insulation batt located in the insulation space.

Embodiment 2

The hanger of embodiment 1, wherein the beam consists of a polymer composition.

Embodiment 3

The hanger of embodiment 1, wherein the beam may be cut with a manual tool such as a snip, and the beam is configured to support fiberglass batts without any additional strapping.

Embodiment 4

The hanger of embodiment 1, wherein the beam is perforated.

Embodiment 5

The hanger of embodiment 1, wherein the proximal end comprises perforations.

Embodiment 6

The hanger of embodiment 5, wherein the perforations comprise parallel rows of slits.

Embodiment 7

The hanger of embodiment 6, wherein the slits are at least one of rounded, oblong and rectangular.

Embodiment 8

The hanger of embodiment 1, wherein the web is perforated.

Embodiment 9

The hanger of embodiment 1, wherein the distal end is not perforated.

Embodiment 10

The hanger of embodiment 1, wherein the beam comprises at least one of an I-beam, a J-beam, a C-beam and an S-beam.

Embodiment 11

The hanger of embodiment 1, wherein each end of the elongated profile comprises tabs configured to engage a second beam.

Embodiment 12

The hanger of embodiment 11, wherein the tabs are located only on the proximal end.

Embodiment 13

The hanger of embodiment 1, wherein portions of the beam are formed from different materials.

Embodiment 14

The hanger of embodiment 13, wherein a first portion of the beam comprises glass-reinforced polyvinylchloride (PVC), and a second portion of the beam comprises PVC.

Embodiment 15

The hanger of embodiment 1, wherein portions of the beam have different coefficients of thermal expansion.

Embodiment 16

The hanger of embodiment 1, wherein the beam comprises a coefficient of thermal expansion of not greater than about 50E-06 in/(in·F).

Embodiment 17

The hanger of embodiment 1, wherein the beam, with a weight of 0.5 lb at a distance of 10 inches, has a maximum vertical deflection in a range of about 0.1 inches to about 2 inches.

Embodiment 18

The hanger of embodiment 1, wherein the beam, under its own weight, has a maximum deflection in a range of about 1 degree to about 5 degrees, relative to a planes defined by the proximal end and the distal end.

Embodiment 19

The hanger of embodiment 1, wherein the beam comprises a single layer of polymer material.

Embodiment 20

The hanger of embodiment 1, wherein at least portions of the beam are at least one of extruded and injection molded.

Embodiment 21

The hanger of embodiment 1, wherein the proximal ends of the beams are attached only to bottom surfaces of the rafters.

Embodiment 22

A system for insulating an attic of a building, the building having a roof with a roof deck, and rafters supporting the roof deck inside the attic, the system comprising:
  beams for supporting insulation in the attic, each of the beams comprising an axis and an elongated profile in an axial direction, wherein the elongated profile comprises:
    a proximal end mounted only to the rafters but not to the roof deck, wherein the proximal end is planar and substantially parallel to the roof deck;
    a distal end that is substantially planar and parallel to the proximal end;
    a web that is substantially planar, the web extending substantially perpendicular to and between the proximal end and the distal end; and
    an insulation space defined along the web between the proximal and distal ends; and the system further comprises:
  insulation batts mounted to and between adjacent ones of the beams in the insulation spaces, each of the insulation batts comprising an insulation material and an outer layer that faces the distal ends of the beams, and the outer layer comprises an airtightness of ACH50<3; and
  a first tape applied to the distal ends of the beams and to the outer layers of the insulation batts to form airtight barriers therebetween, and the airtight barriers comprise ACH50<3.

Embodiment 23

The system of embodiment 22, wherein no material of the system extends between adjacent ones of the beams other than the insulation batts and the first tape.

Embodiment 24

The system of embodiment 22, wherein the airtightness and the airtight barriers comprise ACH50<1.6.

Embodiment 25

The system of embodiment 22, wherein the airtightness and the airtight barriers comprise ACH50<0.6.

Embodiment 26

The system of embodiment 22, wherein the outer layer comprises at least one of a smart vapor retarder (SVR) and kraft paper.

Embodiment 27

The system of embodiment 22, further comprising additional tape strips that seal joints formed between abutting batts, the additional tape strips are substantially perpendicular to axes of the beams, and the additional tape strips extend between adjacent ones of the beams.

Embodiment 28

The system of embodiment 22, wherein batts are initially stapled to beams before taping.

Embodiment 29

The system of embodiment 22, wherein the system comprises no other support members or support structures beneath the insulation.

Embodiment 30

The system of embodiment 22, wherein the beams are transverse to the rafters.

Embodiment 31

The system of embodiment 22, wherein the first tape comprises an all weather flashing tape.

Embodiment 32

The system of embodiment 22, further comprising protrusions of the attic extending through the insulation batts, and the tape applied between the protrusions and the insulation batts to form airtight barriers therebetween, and the airtight barriers comprise ACH50<3.

Embodiment 33

The system of embodiment 22, further comprising protrusions of the attic extending through the insulation batts, and a second tape applied between the protrusions and the insulation batts to form airtight barriers therebetween, the airtight barriers comprise ACH50<3, and the second tape differs from the first tape.

Embodiment 34

The system of embodiment 33, wherein the protrusions of the attic comprise truss members that further support the roof.

Embodiment 35

The system of embodiment 33, wherein the second tape is stretch tape comprising an elongation capability of at least about 100%.

Embodiment 36

The system of embodiment 22, further comprising a ventilated air gap between the roof deck and an upper portion of the system.

Embodiment 37

The system of embodiment 22, wherein the proximal ends of the beams are mounted to the rafters with fasteners.

Embodiment 38

The system of embodiment 37, wherein the fasteners comprise staples, nails or screws.

Embodiment 39

The system of embodiment 22, wherein the beams are not metallic.

Embodiment 40

A method of insulating an attic of a building, the building having a roof with a roof deck, and rafters supporting the roof deck inside the attic, the method comprising:

(a) providing beams comprising an elongated profile in an axial direction;

(b) fastening only proximal ends of the beams to the rafters;

(c) positioning insulation batts on distal ends of adjacent ones of the beams, each of the insulation batts comprising an insulation material and an outer layer facing the distal ends of the beams, the outer layer comprising an airtightness of ACH50<3; and (d) applying a tape to the distal ends of the beams and to the outer layers of the insulation batts to form airtight barriers therebetween, and the airtight barriers comprise the airtightness of ACH50<3.

Embodiment 41

The method of embodiment 40, further comprising extending no material between adjacent ones of the beams other than the insulation batts and the tape.

Embodiment 42

The method of embodiment 40, wherein protrusions of the attic extend through the insulation batts, and the method further comprises applying a second tape between the protrusions and the insulation batts to form airtight barriers therebetween, the airtight barriers comprise ACH50<3, and the second tape differs from the first tape.

Embodiment 43

The method of embodiment 42, wherein the protrusions comprise truss members that further support the roof, and the second tape comprises a stretch tape having an elongation capability of at least about 100%.

Embodiment 44

A hanger for supporting insulation in an attic having rafters that support a roof deck, the hanger comprising:

a beam having an axis and a profile in an axial direction, wherein the profile comprises:

a distal end that is elongated in the axial direction and substantially planar;

straps that extend from the distal end, the straps are substantially planar and perpendicular to the distal end, each strap comprises a proximal end that is planar and configured to be coupled to a respective rafter;

an insulation space defined along the straps between the proximal ends and distal end; and the distal end is configured to be coupled to an insulation batt located in the insulation space.

Embodiment 45

The hanger of embodiment 44, wherein the proximal ends are substantially parallel to the distal end, and the proximal ends are configured to be substantially parallel to the roof deck when installed.

Embodiment 46

The hanger of embodiment 44, wherein the proximal ends are substantially perpendicular to the distal end.

Embodiment 47

The hanger of embodiment 44, wherein planes defined by the straps are configured to be perpendicular to vertical planes defined along the axial lengths of the rafters.

Embodiment 48

The hanger of embodiment 44, wherein planes defined by the straps are configured to be parallel to vertical planes defined along the axial lengths of the rafters.

Embodiment 49

The hanger of embodiment 44, wherein the proximal ends are configured to attach to only bottom surfaces of the rafters.

Embodiment 50

The hanger of embodiment 44, wherein the proximal ends are configured to attach to bottom surfaces and side surfaces of the rafters.

Embodiment 51

The hanger of embodiment 44, wherein the proximal ends are configured to attach to only side surfaces of the rafters.

Embodiment 52

A method of forming a seal in an insulation system for an attic having rafters and a truss member, the method comprising:
(a) installing beams on the rafters;
(b) mounting an insulation batt on the beams such that the truss member extends through the insulation batt;
(c) providing a tape having a release liner attached thereto and partitioned in segments; and then
(d) methodically removing the segments of the release liner while applying the tape to the one truss member and to the insulation batt.

Embodiment 53

The hanger of embodiment 6, wherein the parallel rows of slits are substantially aligned with the axial direction.

Embodiment 54

The hanger of embodiment 19, wherein the single layer of polymer material is folded into a final sectional shape along the axial direction and is at least one of sonic welded, heat staked and thermoformed with ribbed edges.

Embodiment 55

The method of embodiment 40, wherein the distal ends comprise a planar portion that supports the insulation batts.

Embodiment 56

A system for insulating an attic of a building, the building having a roof with a roof deck, and rafters supporting the roof deck inside the attic, the system comprising:
brackets aligned and mounted to the rafters;
beams attached to the brackets such that the beams are suspended from the rafters via the brackets;
insulation batts extending between the beams; and
tape to secure the insulation batts to the beams.

Embodiment 57

The system of embodiment 56, wherein the beams and the rafters do not have fixed junctions therebetween, such that the beams and the rafters move independently.

Embodiment 58

The system of embodiment 56, wherein the brackets and beams comprise sliding surfaces therebetween.

Embodiment 59

The system of embodiment 56, wherein each beam a proximal end, a distal end, a web between the proximal and distal end, and the proximal end has a rib.

Embodiment 60

The system of embodiment 59, wherein the rib extends from one side of the proximal end and the rib terminates with a lip that turns back toward the proximal end.

Embodiment 61

The system of embodiment 60, wherein each bracket receives the rib and lip such that a respective beam is clipped into the bracket.

Embodiment 62

The system of embodiment 56, wherein the bracket comprises rafter clips for closely receiving a respective rafter, and the rafter clips support the weight of the bracket on the rafter prior to permanent attachment thereto.

Embodiment 63

The system of embodiment 56, wherein each bracket comprises a clip having teeth to secure a respective beam and support the insulation batts without the use of additional fasteners.

Embodiment 64

The system of embodiment 63, wherein an upper portion of the clip overlaps a top of a proximal end of a respective beam.

Embodiment 65

The system of embodiment 56, wherein a length of a web of the beam is substantially equal to a length of the bracket.

Embodiment 66

The system of embodiment 56, wherein a distal end of the beam comprises a vertical flange that captures a lower edge of a respective bracket.

Embodiment 67

The system of embodiment 56, wherein the beams consist of a polymer composition.

Embodiment 68

The system of embodiment 56, wherein the beams may be cut with a manual tool such as a snip, and the beams are configured to support fiberglass batts without any additional strapping.

Embodiment 69

The system of embodiment 56, wherein the beams are perforated.

Embodiment 70

The system of embodiment 56, wherein proximal ends of the beams comprise perforations.

Embodiment 71

The system of embodiment 56, wherein webs of the beams are perforated.

Embodiment 72

The system of embodiment 56, wherein distal ends of the beams are not perforated.

Embodiment 73

The system of embodiment 56, wherein the beams comprise at least one of an I-beam and a J-beam.

Embodiment 74

The system of embodiment 56, wherein portions of the beams are formed from different materials.

Embodiment 75

The system of embodiment 56, wherein portions of the beams have different coefficients of thermal expansion.

Embodiment 76

The system of embodiment 56, wherein the beams comprise a coefficient of thermal expansion of not greater than about 50E-06 in/(in·F).

Embodiment 77

The system of embodiment 56, wherein each beam, with a weight of 0.5 lb at a distance of 10 inches, has a maximum vertical deflection in a range of about 0.1 inches to about 2 inches.

Embodiment 78

The system of embodiment 56, wherein each beam, under its own weight, has a maximum deflection in a range of about 1 degree to about 5 degrees, relative to planes defined by a proximal end and a distal end thereof.

Embodiment 79

The system of embodiment 56, wherein each beam comprises a single layer of polymer material.

Embodiment 80

The system of embodiment 56, wherein at least portions of each beam are at least one of extruded and injection molded.

Embodiment 81

The system of embodiment 56, wherein no material of the system extends between adjacent ones of the beams other than the insulation batts and the first tape.

Embodiment 82

The system of embodiment 56, wherein the system comprises an airtightness and airtight barriers comprise ACH50<1.6.

Embodiment 83

The system of embodiment 82, wherein the airtightness and the airtight barriers comprise ACH50<0.6.

Embodiment 84

The system of embodiment 56, wherein the insulation batts comprise outer layers comprising at least one of a smart vapor retarder (SVR) and kraft paper.

Embodiment 85

The system of embodiment 56, further comprising additional tape strips that seal joints formed between abutting batts, the additional tape strips are substantially perpendicular to axes of the beams, and the additional tape strips extend between adjacent ones of the beams.

Embodiment 86

The system of embodiment 56, wherein the insulation batts are initially stapled to the beams before taping.

Embodiment 87

The system of embodiment 56, wherein the system comprises no other support members or support structures beneath the insulation batts.

Embodiment 88

The system of embodiment 56, wherein the beams are perpendicular to the rafters.

Embodiment 89

The system of embodiment 56, wherein the tape comprises an all weather flashing tape.

Embodiment 90

The system of embodiment 56, wherein the attic comprises protrusions that extend through the insulation batts, and the tape is applied between the protrusions and the insulation batts to form airtight barriers therebetween, and the airtight barriers comprise ACH50<3.

Embodiment 91

The system of embodiment 56, wherein the attic comprises protrusions that extend through the insulation batts, and a second tape is applied between the protrusions and the insulation batts to form airtight barriers therebetween, the airtight barriers comprise ACH50<3, and the second tape differs from the tape.

Embodiment 92

The system of embodiment 91, wherein the protrusions comprise truss members that further support the roof.

Embodiment 93

The system of embodiment 91, wherein the second tape is stretch tape comprising an elongation capability of at least about 100%.

Embodiment 94

The system of embodiment 56, further comprising a ventilated air gap between the roof deck and an upper portion of the system.

Embodiment 95

The system of embodiment 56, wherein the beams are not metallic.

Embodiment 96

A hanger for supporting insulation in an attic having rafters that support a roof deck, the hanger comprising:
 a beam having an axis and an elongated profile in an axial direction, wherein the elongated profile comprises:
 a proximal end configured to be coupled to the rafters;
 a distal end spaced apart from the proximal end;
 a web extending between the proximal end and the distal end;
 an insulation space defined along the web between the proximal and distal ends;
 the distal end is configured to be coupled to an insulation batt located in the insulation space; and
 the beam has a folded position wherein the beam is folded such that the web is not perpendicular to the proximal and distal ends, and an installation position wherein the web is substantially perpendicular to the proximal and distal ends.

Embodiment 97

A hanger for supporting insulation in an attic having rafters that support a roof deck, the hanger comprising:
 a beam having an axis and an elongated profile in an axial direction, wherein the elongated profile comprises:
 proximal ends configured to be coupled to the rafters;
 a distal end spaced apart from the proximal ends;
 a web extending between the proximal ends and the distal end;
 an insulation space defined along the web between the proximal and distal ends;
 the distal end is configured to be coupled to an insulation batt located in the insulation space; and
 the web comprise a solid section that spans an entirety of the elongated profile, and a segmented section that engages respective ones of the proximal ends, with voids in the segmented section that extend from the proximal ends to the solid section.

Embodiment 98

A hanger for supporting insulation in an attic having rafters that support a roof deck, the hanger comprising:
 a beam having an axis and an elongated profile in an axial direction, wherein the elongated profile comprises:
 a proximal end configured to be coupled to the rafters, wherein the proximal end comprises at least one planar portion and is configured to be substantially parallel to the roof deck and substantially perpendicular to the rafters when installed;
 a ventilated air gap is configured to be provided between the proximal end and the roof deck;
 a distal end that is substantially planar and parallel to the planar portion of the proximal end;
 at least one web that is substantially planar, the web extending substantially perpendicular to and between the proximal end and the distal end, and the web comprises apertures or voids located between the proximal and distal ends;
 an insulation space defined along the web between the proximal and distal ends; and
 the distal end is configured to be coupled to an insulation batt located in the insulation space.

Embodiment 99

The hanger of embodiment 98, wherein the beam consists of a polymer composition.

Embodiment 100

The hanger of embodiment 98, wherein the beam may be cut with a manual tool such as a snip, and the beam is configured to support fiberglass batts without any additional strapping.

Embodiment 101

The hanger of embodiment 98, wherein the beam is perforated.

Embodiment 102

The hanger of embodiment 98, wherein the proximal end comprises perforations.

Embodiment 103

The hanger of embodiment 102, wherein the perforations comprise parallel rows of slits.

Embodiment 104

The hanger of embodiment 103, wherein the slits are at least one of rounded, oblong and rectangular.

Embodiment 105

The hanger of embodiment 98, wherein the web is perforated.

Embodiment 106

The hanger of embodiment 98, wherein the distal end is not perforated.

Embodiment 107

The hanger of embodiment 98, wherein the beam comprises at least one of an I-beam, a J-beam, a C-beam and an S-beam.

Embodiment 108

The hanger of embodiment 98, wherein each end of the elongated profile comprises tabs configured to engage a second beam.

Embodiment 109

The hanger of embodiment 108, wherein the tabs are located only on the proximal end.

Embodiment 110

The hanger of embodiment 98, wherein portions of the beam are formed from different materials.

Embodiment 111

The hanger of embodiment 110, wherein a first portion of the beam comprises glass-reinforced polyvinylchloride (PVC), and a second portion of the beam comprises PVC.

Embodiment 112

The hanger of embodiment 98, wherein portions of the beam have different coefficients of thermal expansion.

Embodiment 113

The hanger of embodiment 98, wherein the beam comprises a coefficient of thermal expansion of not greater than about 50E-06 in/(in·F).

Embodiment 114

The hanger of embodiment 98, wherein the beam, with a weight of 0.5 lb at a distance of 10 inches, has a maximum vertical deflection in a range of about 0.1 inches to about 2 inches.

Embodiment 115

The hanger of embodiment 98, wherein the beam, under its own weight, has a maximum deflection in a range of about 1 degree to about 5 degrees, relative to a planes defined by the proximal end and the distal end.

Embodiment 116

The hanger of embodiment 98, wherein the beam comprises a single layer of polymer material.

Embodiment 117

The hanger of embodiment 98, wherein at least portions of the beam are at least one of extruded and injection molded.

Embodiment 118

The hanger of embodiment 98, wherein the proximal ends of the beams are attached only to bottom surfaces of the rafters.

Embodiment 119

A system for insulating an attic of a building, the building having a roof with a roof deck, and rafters supporting the roof deck inside the attic, the system comprising:

beams for supporting insulation in the attic, each of the beams comprising an axis and an elongated profile in an axial direction, wherein the elongated profile comprises:

a proximal end mounted only to the rafters but not to the roof deck, wherein the proximal end is planar and substantially parallel to the roof deck;

a distal end that is substantially planar and parallel to the proximal end;

a web that is substantially planar, the web extending substantially perpendicular to and between the proximal end and the distal end; and an insulation space defined along the web between the proximal and distal ends; and the system further comprises:

insulation batts mounted to and between adjacent ones of the beams in the insulation spaces, each of the insulation batts comprising an insulation material and an outer layer that faces the distal ends of the beams, and the outer layer comprises an airtightness of ACH50<3; and a first tape applied to the distal ends of the beams and to the outer layers of the insulation batts to form airtight barriers therebetween, and the airtight barriers comprise ACH50<3.

Embodiment 120

The system of embodiment 119, wherein no material of the system extends between adjacent ones of the beams other than the insulation batts and the first tape.

Embodiment 121

The system of embodiment 119, wherein the airtightness and the airtight barriers comprise ACH50<1.6.

Embodiment 122

The system of embodiment 119, wherein the airtightness and the airtight barriers comprise ACH50<0.6.

Embodiment 123

The system of embodiment 119, wherein the outer layer comprises at least one of a smart vapor retarder (SVR) and kraft paper.

Embodiment 124

The system of embodiment 119, further comprising additional tape strips that seal joints formed between abutting batts, the additional tape strips are substantially perpendicular to axes of the beams, and the additional tape strips extend between adjacent ones of the beams.

Embodiment 125

The system of embodiment 119, wherein batts are initially stapled to beams before taping.

Embodiment 126

The system of embodiment 119, wherein the system comprises no other support members or support structures beneath the insulation.

Embodiment 127

The system of embodiment 119, wherein the beams are transverse to the rafters.

Embodiment 128

The system of embodiment 119, wherein the first tape comprises an all weather flashing tape.

Embodiment 129

The system of embodiment 119, further comprising protrusions of the attic extending through the insulation batts, and the tape applied between the protrusions and the insulation batts to form airtight barriers therebetween, and the airtight barriers comprise ACH50<3.

Embodiment 130

The system of embodiment 119, further comprising protrusions of the attic extending through the insulation batts, and a second tape applied between the protrusions and the insulation batts to form airtight barriers therebetween, the airtight barriers comprise ACH50<3, and the second tape differs from the first tape.

Embodiment 131

The system of embodiment 130, wherein the protrusions of the attic comprise truss members that further support the roof.

Embodiment 132

The system of embodiment 130, wherein the second tape is stretch tape comprising an elongation capability of at least about 100%.

Embodiment 133

The system of embodiment 119, further comprising a ventilated air gap between the roof deck and an upper portion of the system.

Embodiment 134

The system of embodiment 119, wherein the proximal ends of the beams are mounted to the rafters with fasteners.

Embodiment 135

The system of embodiment 134, wherein the fasteners comprise staples, nails or screws.

Embodiment 136

The system of embodiment 119, wherein the beams are not metallic.

Embodiment 137

A method of insulating an attic of a building, the building having a roof with a roof deck, and rafters supporting the roof deck inside the attic, the method comprising:

(a) providing beams comprising an elongated profile in an axial direction;

(b) fastening only proximal ends of the beams to the rafters;

(c) positioning insulation batts on distal ends of adjacent ones of the beams, each of the insulation batts comprising an insulation material and an outer layer facing the distal ends of the beams, the outer layer comprising an airtightness of ACH50<3; and (d) applying a tape to the distal ends of the beams and to the outer layers of the insulation batts to form airtight barriers therebetween, and the airtight barriers comprise the airtightness of ACH50<3.

Embodiment 138

The method of embodiment 137, further comprising extending no material between adjacent ones of the beams other than the insulation batts and the tape.

Embodiment 139

The method of embodiment 137, wherein protrusions of the attic extend through the insulation batts, and the method further comprises applying a second tape between the protrusions and the insulation batts to form airtight barriers therebetween, the airtight barriers comprise ACH50<3, and the second tape differs from the first tape.

Embodiment 140

The method of embodiment 139, wherein the protrusions comprise truss members that further support the roof, and the second tape comprises a stretch tape having an elongation capability of at least about 100%.

Embodiment 141

A hanger for supporting insulation in an attic having rafters that support a roof deck, the hanger comprising:

a beam having an axis and a profile in an axial direction, wherein the profile comprises:

a distal end that is elongated in the axial direction and substantially planar;

straps that extend from the distal end, the straps are substantially planar and perpendicular to the distal end, each strap comprises a proximal end that is planar and configured to be coupled to a respective rafter;

an insulation space defined along the straps between the proximal ends and distal end; and the distal end is configured to be coupled to an insulation batt located in the insulation space.

Embodiment 142

The hanger of embodiment 141, wherein the proximal ends are substantially parallel to the distal end, and the proximal ends are configured to be substantially parallel to the roof deck when installed.

Embodiment 143

The hanger of embodiment 141, wherein the proximal ends are substantially perpendicular to the distal end.

Embodiment 144

The hanger of embodiment 141, wherein planes defined by the straps are configured to be perpendicular to vertical planes defined along the axial lengths of the rafters.

Embodiment 145

The hanger of embodiment 141, wherein planes defined by the straps are configured to be parallel to vertical planes defined along the axial lengths of the rafters.

Embodiment 146

The hanger of embodiment 141, wherein the proximal ends are configured to attach to only bottom surfaces of the rafters.

Embodiment 147

The hanger of embodiment 141, wherein the proximal ends are configured to attach to bottom surfaces and side surfaces of the rafters.

Embodiment 148

The hanger of embodiment 141, wherein the proximal ends are configured to attach to only side surfaces of the rafters.

Embodiment 149

A method of forming a seal in an insulation system for an attic having rafters and a truss member, the method comprising:
(a) installing beams on the rafters;
(b) mounting an insulation batt on the beams such that the truss member extends through the insulation batt;
(c) providing a tape having a release liner attached thereto and partitioned in segments; and then
(d) methodically removing the segments of the release liner while applying the tape to the one truss member and to the insulation batt.

Embodiment 150

The hanger of embodiment 103, wherein the parallel rows of slits are substantially aligned with the axial direction.

Embodiment 151

The hanger of embodiment 116, wherein the single layer of polymer material is folded into a final sectional shape along the axial direction and is at least one of sonic welded, heat staked and thermoformed with ribbed edges.

Embodiment 152

The method of embodiment 137, wherein the distal ends comprise a planar portion that supports the insulation batts.

Embodiment 153

A system for insulating an attic of a building, the building having a roof with a roof deck, and rafters supporting the roof deck inside the attic, the system comprising:
brackets aligned and mounted to the rafters;
beams attached to the brackets such that the beams are suspended from the rafters via the brackets;
insulation batts extending between the beams; and
tape to secure the insulation batts to the beams.

Embodiment 154

The system of embodiment 153, wherein the beams and the rafters do not have fixed junctions therebetween, such that the beams and the rafters move independently.

Embodiment 155

The system of embodiment 153, wherein the brackets and beams comprise sliding surfaces therebetween.

Embodiment 156

The system of embodiment 153, wherein each beam a proximal end, a distal end, a web between the proximal and distal end, and the proximal end has a rib.

Embodiment 157

The system of embodiment 156, wherein the rib extends from one side of the proximal end and the rib terminates with a lip that turns back toward the proximal end.

Embodiment 158

The system of embodiment 157, wherein each bracket receives the rib and lip such that a respective beam is clipped into the bracket.

Embodiment 159

The system of embodiment 153, wherein the bracket comprises rafter clips for closely receiving a respective rafter, and the rafter clips support the weight of the bracket on the rafter prior to permanent attachment thereto.

Embodiment 160

The system of embodiment 153, wherein each bracket comprises a clip having teeth to secure a respective beam and support the insulation batts without the use of additional fasteners.

Embodiment 161

The system of embodiment 160, wherein an upper portion of the clip overlaps a top of a proximal end of a respective beam.

Embodiment 162

The system of embodiment 153, wherein a length of a web of the beam is substantially equal to a length of the bracket.

Embodiment 163

The system of embodiment 153, wherein a distal end of the beam comprises a vertical flange that captures a lower edge of a respective bracket.

Embodiment 164

The system of embodiment 153, wherein the beams consist of a polymer composition.

Embodiment 165

The system of embodiment 153, wherein the beams may be cut with a manual tool such as a snip, and the beams are configured to support fiberglass batts without any additional strapping.

Embodiment 166

The system of embodiment 153, wherein the beams are perforated.

Embodiment 167

The system of embodiment 153, wherein proximal ends of the beams comprise perforations.

Embodiment 168

The system of embodiment 153, wherein webs of the beams are perforated.

Embodiment 169

The system of embodiment 153, wherein distal ends of the beams are not perforated.

Embodiment 170

The system of embodiment 153, wherein the beams comprise at least one of an I-beam and a J-beam.

Embodiment 171

The system of embodiment 153, wherein portions of the beams are formed from different materials.

Embodiment 172

The system of embodiment 153, wherein portions of the beams have different coefficients of thermal expansion.

Embodiment 173

The system of embodiment 153, wherein the beams comprise a coefficient of thermal expansion of not greater than about 50E-06 in/(in·F).

Embodiment 174

The system of embodiment 153, wherein each beam, with a weight of 0.5 lb at a distance of 10 inches, has a maximum vertical deflection in a range of about 0.1 inches to about 2 inches.

Embodiment 175

The system of embodiment 153, wherein each beam, under its own weight, has a maximum deflection in a range of about 1 degree to about 5 degrees, relative to planes defined by a proximal end and a distal end thereof.

Embodiment 176

The system of embodiment 153, wherein each beam comprises a single layer of polymer material.

Embodiment 177

The system of embodiment 153, wherein at least portions of each beam are at least one of extruded and injection molded.

Embodiment 178

The system of embodiment 153, wherein no material of the system extends between adjacent ones of the beams other than the insulation batts and the first tape.

Embodiment 179

The system of embodiment 153, wherein the system comprises an airtightness and airtight barriers comprise ACH50<1.6.

Embodiment 180

The system of embodiment 179, wherein the airtightness and the airtight barriers comprise ACH50<0.6.

Embodiment 181

The system of embodiment 153, wherein the insulation batts comprise outer layers comprising at least one of a smart vapor retarder (SVR) and kraft paper.

Embodiment 182

The system of embodiment 153, further comprising additional tape strips that seal joints formed between abutting batts, the additional tape strips are substantially perpendicular to axes of the beams, and the additional tape strips extend between adjacent ones of the beams.

Embodiment 183

The system of embodiment 153, wherein the insulation batts are initially stapled to the beams before taping.

Embodiment 184

The system of embodiment 153, wherein the system comprises no other support members or support structures beneath the insulation batts.

Embodiment 185

The system of embodiment 153, wherein the beams are perpendicular to the rafters.

Embodiment 186

The system of embodiment 153, wherein the tape comprises an all weather flashing tape.

Embodiment 187

The system of embodiment 153, wherein the attic comprises protrusions that extend through the insulation batts, and the tape is applied between the protrusions and the insulation batts to form airtight barriers therebetween, and the airtight barriers comprise ACH50<3.

Embodiment 188

The system of embodiment 153, wherein the attic comprises protrusions that extend through the insulation batts, and a second tape is applied between the protrusions and the insulation batts to form airtight barriers therebetween, the airtight barriers comprise ACH50<3, and the second tape differs from the tape.

Embodiment 189

The system of embodiment 188, wherein the protrusions comprise truss members that further support the roof.

Embodiment 190

The system of embodiment 188, wherein the second tape is stretch tape comprising an elongation capability of at least about 100%.

Embodiment 191

The system of embodiment 153, further comprising a ventilated air gap between the roof deck and an upper portion of the system.

Embodiment 192

The system of embodiment 153, wherein the beams are not metallic.

Embodiment 193

A hanger for supporting insulation in an attic having rafters that support a roof deck, the hanger comprising:
 a beam having an axis and an elongated profile in an axial direction, wherein the elongated profile comprises:
  a proximal end configured to be coupled to the rafters;
  a distal end spaced apart from the proximal end;
  a web extending between the proximal end and the distal end;
  an insulation space defined along the web between the proximal and distal ends;
  the distal end is configured to be coupled to an insulation batt located in the insulation space; and
  the beam has a folded position wherein the beam is folded such that the web is not perpendicular to the proximal and distal ends, and an installation position wherein the web is substantially perpendicular to the proximal and distal ends.

Embodiment 194

A hanger for supporting insulation in an attic having rafters that support a roof deck, the hanger comprising:
 a beam having an axis and an elongated profile in an axial direction, wherein the elongated profile comprises:
  proximal ends configured to be coupled to the rafters;
  a distal end spaced apart from the proximal ends;
  a web extending between the proximal ends and the distal end;
  an insulation space defined along the web between the proximal and distal ends;
  the distal end is configured to be coupled to an insulation batt located in the insulation space; and
  the web comprise a solid section that spans an entirety of the elongated profile, and a segmented section that engages respective ones of the proximal ends, with voids in the segmented section that extend from the proximal ends to the solid section.

Embodiment 195

A hanger for supporting insulation, the hanger comprising: a first end comprising a beam attachment component configured to be coupled to a beam; a second end comprising a barrier attachment component configured to be coupled to a barrier; and an axial midsection defining an insulation space between the first end and the second end, wherein the beam attachment component comprises a first face and at least one radial lip located at the bottom of the first face adapted to contact a bottom of a beam.

Embodiment 196

An insulation system comprising: a beam; a barrier; at least one hanger, the hanger comprising: a first end comprising a beam attachment component coupled to a beam, a second end comprising a barrier attachment component coupled to a barrier, and an axial midsection defining an insulation space between the first end and the second end, wherein the beam attachment component comprises a first face and at least one radial lip located at the bottom of the first face contacting a bottom of a beam; and insulation at least partially filling the insulation space defined by the hanger.

Embodiment 197

A method for installing an insulation system for a home having an attic with a deck, beams fastened to the deck, the insulation system comprising: providing a barrier; providing at least one hanger comprising: a first end comprising a beam attachment component configured to be coupled to a beam, a second end comprising a barrier attachment component configured to be coupled to a barrier; and an axial midsection between the first end and the second end, wherein the beam attachment component comprises a first face and at least one radial lip located at the bottom of the first face adapted to contact a bottom of a beam; attaching the barrier attachment component to the barrier; and attaching the beam attachment component to the beam such that the radial lip contacts the bottom of the beam to provide an insulation space defined between the first and second ends, wherein the radial lip determines the size of the insulation space; and providing insulation within the insulation space.

Embodiment 198

The hanger, insulation system, or method of any of embodiments 1-3, wherein the beam attachment comprises a second radial lip on a second radial side of the first face of the beam attachment component, where the first radial side and the second radial side are opposite radial sides of the first face of the beam attachment component.

Embodiment 199

The hanger, insulation system, or method of any of the preceding embodiments, wherein the first radial lip comprises a plurality of radial lips on the first radial side of the first face of beam attachment component.

Embodiment 200

The hanger, insulation system, or method of any of the preceding embodiments, wherein the second radial lip comprises a plurality of radial lips on the second radial side of the first face of beam attachment component.

Embodiment 201

The hanger, insulation system, or method of any of the preceding embodiments, wherein the first face of beam attachment component comprises a plurality of apertures.

Embodiment 202

The hanger, insulation system, or method of any of the preceding embodiments, wherein the first face of beam attachment component comprises a spine running down its axial length.

Embodiment 203

The hanger, insulation system, or method of any of the preceding embodiments, wherein the barrier attachment component is adapted to be secured with a fastener, wherein the fastener comprises a barrier attachment projection, nail, bolt, staple, screw, or adhesive.

Embodiment 204

The hanger, insulation system, or method of any of the preceding embodiments, wherein the barrier attachment component is adapted to be secured with a fastener, wherein the fastener comprises a beam attachment projection, nail, bolt, staple, screw, or adhesive.

Embodiment 205

The hanger, insulation system, or method of any of the preceding embodiments, wherein the barrier attachment component comprises a shoe comprising an elongated, substantially flat shape comprising a round or polygonal cross-section that is configured to be radially inside and engage opposite sides of a groove in the barrier.

Embodiment 206

The hanger, insulation system, or method of any of the preceding embodiments, wherein the barrier attachment component comprises an arch configured to couple the hanger to the barrier, and the arch comprising at least two axial sides wherein each axial side has a radial diameter that varies along the axis of the hanger.

Embodiment 207

The hanger, insulation system, or method of any of the preceding embodiments, wherein the barrier attachment component comprises a clip adapted to couple or uncouple the barrier attachment component to the barrier.

Embodiment 208

The hanger, insulation system, or method of embodiment 12, wherein the arch comprises a clamp configured to grip the barrier to a projection on the barrier.

Embodiment 209

The hanger, insulation system, or method of any of the preceding embodiments, wherein the barrier comprises a substantially planar, elongated panel comprising a barrier-to-hanger attachment component.

Embodiment 210

The hanger, insulation system, or method of embodiment 15, wherein the barrier-to-hanger attachment component comprises a groove, planar surface, projection, or combination thereof.

Embodiment 211

The hanger, insulation system, or method of any of the preceding embodiments, wherein the beam comprises a substantially planar, elongated panel comprising a beam-to-hanger attachment component.

Embodiment 212

The hanger, insulation system, or method of embodiment 17, wherein the beam-to-hanger attachment component comprises a groove, planar surface, projection, or combination thereof.

Embodiment 213

The hanger, insulation system, or method of any of the preceding embodiments, wherein a metal plate is located inside at least one of the barrier attachment component or the beam attachment component.

Embodiment 214

The hanger, insulation system, or method of any of the preceding embodiments, wherein the insulation comprises a compressible foam configured to be located between the barrier and the beam to elastify a junction therebetween and improve acoustic insulation thereof.

Embodiment 215

The hanger, insulation system, or method of any of the preceding embodiments, wherein the barrier attachment component comprises a pointed screw or nail configured to be screwed directly into a first end of the barrier through an aperture of the barrier attachment component of the hanger.

Embodiment 216

The hanger, insulation system, or method of any of the preceding embodiments, wherein the beam attachment component comprises a pointed screw or nail configured to be screwed directly into a first end of the beam through an aperture of the first face of the hanger.

Embodiment 217

The hanger, insulation system, or method of any of the preceding embodiments, wherein the at least one radial lip of the beam attachment component comprises a flange that is configured to be substantially parallel to a roof deck, and the flange is integrally formed with the hanger such that it does not comprise a separate component that is attached to the hanger.

Embodiment 218

The hanger, insulation system, or method of embodiment 217, wherein the radial lip further comprises a reinforcement wing extending axially from a radial edge of the radial lip.

Embodiment 219

The hanger, insulation system, or method of embodiment 218 wherein the reinforcement wings are configured to be substantially perpendicular to a roof deck, and the wings are integrally formed with the hanger such that it does not comprise a separate component that is attached to the hanger.

Embodiment 220

The hanger, insulation system, or method of any of the preceding embodiments, further comprising a tape with a releasable liner on at least one of the beam attachment component or the barrier attachment component.

Embodiment 221

The hanger, insulation system, or method of embodiment 220, wherein the tape comprises butyl tape.

Embodiment 222

The hanger, insulation system, or method of any of the preceding embodiments, wherein the barrier is configured to comprise at least one of a stud, batten, strapping, gypsum board, grid, netting, facing, mesh, tape, or membrane.

Embodiment 223

The hanger, insulation system, or method of any of the preceding embodiments, wherein the barrier is configured to comprise wood or plastic.

Embodiment 224

The hanger, insulation system, or method of any of the preceding embodiments, wherein the barrier is configured to comprise at least one of an open glass mesh, vapor closed polyethylene or smart vapor retarder (SVR); and the barrier is configured to support blown insulation comprising at least one of fiberglass, stonewool or cellulose.

Embodiment 225

The hanger, insulation system, or method of embodiment 224, wherein the barrier is configured to be reinforced with a tape to support a pressure of blown insulation.

Embodiment 226

The hanger of embodiment 225, wherein the barrier is configured to be reinforced with a glass net to support the pressure of blown insulation.

Embodiment 227

The hanger of embodiment 225, wherein the barrier is configured to comprise a gypsum board mounted to the second end of the hanger, and the SVR is configured to be mounted to the gypsum board.

Embodiment 228

The hanger, insulation system, or method of any of the preceding embodiments, wherein the hanger comprises plastic.

Embodiment 229

The hanger, insulation system, or method of any of the preceding embodiments, wherein the hanger comprises polymethyl methacrylate (PMMA) reinforced with glass fibers.

Embodiment 230

The hanger, insulation system, or method of any of the preceding embodiments, wherein the hanger has a maximum thermal conductivity of 0.5 W/m·K.

Embodiment 231

The hanger, insulation system, or method of any of the preceding embodiments, wherein the hanger is rigid and not designed to be deformable.

Embodiment 232

The hanger, insulation system, or method of any of the preceding embodiments, further comprising at least one insulation support member coupled to at least one of the barrier attachment component or the beam attachment component.

Embodiment 233

The hanger, insulation system, or method of embodiment 232, wherein the at least one insulation support member comprises a substantially planar, elongated panel.

Embodiment 234

The hanger, insulation system, or method of embodiment 233, wherein the substantially planar, elongated panel comprises a first panel directly fastened to the barrier attachment component, and a second panel directly fastened to the first panel, the second panel is substantially perpendicular to the first panel, and the second panel comprises a reinforcement rib.

Embodiment 235

The hanger, insulation system, or method of embodiment 233, wherein the substantially planar, elongated panel comprises a first panel directly fastened to the beam attachment component, and a second panel directly fastened to the first panel, the second panel is substantially perpendicular to the first panel, and the second panel comprises a reinforcement rib.

Embodiment 236

The hanger, insulation system, or method of any of the preceding embodiments, wherein the hanger itself is not metallic.

Embodiment 237

The hanger, insulation system, or method of any of the preceding embodiments, wherein the at least one radial lip of the beam attachment component is adapted to fracture.

Embodiment 238

The hanger, insulation system, or method of any of the preceding embodiments, wherein the deck is an attic floor deck and the beams are floor joists.

Embodiment 239

The hanger, insulation system, or method of any of the preceding embodiments, wherein the deck is an attic side wall panel and the beams are side wall beams.

Embodiment 240

The hanger, insulation system, or method of any of the preceding embodiments, wherein the deck is a roof deck and the beams are roof rafters.

Embodiment 241

The hanger, insulation system, or method of any of the preceding embodiments, wherein the hanger is load bearing, such that the hanger supports and stores objects on top of the barrier or attached to the barrier.

Embodiment 242

The hanger, insulation system, or method of any of the preceding embodiments, wherein the hanger comprises a ruler configured to facilitate measurement and adjustment of the hanger relative to the rafter.

Embodiment 243

The hanger, insulation system, or method of any of the preceding embodiments, wherein the barrier is configured to provide moisture management.

Embodiment 244

The hanger, insulation system, or method of any of the preceding embodiments, wherein the barrier is configured to provide air tightness.

Embodiment 245

The hanger, insulation system, or method of any of the preceding embodiments, wherein at least one of the beam, hanger, or barrier is a fire class A substance.

Embodiment 246

The hanger, insulation system, or method of any of the preceding embodiments, wherein the barrier comprises a facing wherein the facing is attached to the insulation through an insulation attachment component comprising a fastener comprising an adhesive, a staple, a nail, or a screw.

Embodiment 247

An insulation system for hanging insulation in a truss, comprising:
a first rail configured to be installed on a first truss;
a second rail configured to be installed on a second truss spaced apart from the first truss, wherein a first cavity is established between the first rail and the second rail and wherein the first cavity is configured to receive and engage a first insulation batt.

Embodiment 248

The insulation system of embodiment 247, further comprising:
a third rail configured to be installed on the second truss opposite the second rail.

Embodiment 249

The insulation system of embodiment 248, further comprising:
a fourth rail configured to be installed on a third truss spaced apart from the second truss, wherein a second cavity is established between the third rail and the fourth rail and wherein the second cavity is configured to receive and engage a second insulation batt.

Embodiment 250

The insulation system of embodiment 249, wherein each rail is elongated and includes a length and a width and a ratio of the length to the width, RLW is less than or equal to 0.1.

Embodiment 251

The insulation system of embodiment 250, wherein RLW is less than or equal to 0.09, such as less than or equal to 0.08, less than or equal to 0.07, less than or equal to 0.06, or less than or equal to 0.05.

Embodiment 252

The insulation system of embodiment 251, wherein RLW is greater than or equal to 0.005, such as greater than or equal to 0.01, greater than or equal to 0.02, greater than or equal to 0.03, or greater than or equal to 0.04.

Embodiment 253

The insulation system of embodiment 252, wherein each rail includes a cross-sectional shape that is generally U-shaped.

Embodiment 254

The insulation system of embodiment 253, wherein each rail includes a base plate and a first tine and a second tine extending therefrom.

Embodiment 255

The insulation system of embodiment 249, wherein each cavity defines a cavity width, WC, and WC is less than or equal to 48.0 inches.

Embodiment 256

The insulation system of embodiment 255, wherein WC is less than or equal to 44.0 inches, such as less than or equal to 40.0 inches, less than or equal to 36.0 inches, less than or equal to 32.0 inches, less than or equal to 28.0 inches, less than or equal to 24.0 inches, less than or equal to 23.5.0 inches, less than or equal to 23.0 inches, less than or equal to 22.5 inches, less than or equal to 22.0 inches, less than or equal to 21.5 inches, less than or equal to 21.0 inches, less than or equal to 20.5 inches, less than or equal to 20.0 inches, less than or equal to 19.5 inches, less than or equal to 19.0 inches, less than or equal to 18.5 inches, less than or equal to 18.0 inches, less than or equal to 17.5 inches, less than or equal to 17.0 inches, less than or equal to 16.5 inches, or less than or equal to 16.0 inches.

Embodiment 257

The insulation system of embodiment 256, wherein WC is greater than or equal to 10.0 inches, such as greater than or equal to 10.5 inches, greater than or equal to 11.0 inches, greater than or equal to 11.5 inches, or greater than or equal to 12.0 inches.

Embodiment 258

The insulation system of embodiment 249, wherein the first and second insulation batts are placed a height, H, above a floor and H is greater than or equal to 3 feet.

Embodiment 259

The insulation system of embodiment 258, wherein H is greater than or equal to 3.5 feet, such as greater than or equal to 4.0 feet, greater than or equal to 4.5 feet, greater than or equal to 5.0 feet, greater than or equal to 5.5 feet, or greater than or equal to 6.0 feet.

Embodiment 260

The insulation system of embodiment 259, wherein H is less than or equal to 10.0 feet, such as less than or equal to 9.5, less than or equal to 9.0 feet, less than or equal to 8.5 feet, less than or equal to 8.0 feet, less than or equal to 7.5 feet, less than or equal to 7.0 feet, or less than or equal to 6.5 feet.

Embodiment 261

A method of installing insulation, comprising:
installing a first rail on a first truss;
installing a second rail on a second truss spaced a distance from the first truss to establish a first cavity between the first rail and the second rail; and
installing a first insulation batt within the first cavity.

Embodiment 262

The method of embodiment 261, further comprising:
installing a third rail on the second truss opposite the second rail.

Embodiment 263

The method of embodiment 262, further comprising:
installing a fourth rail on a third truss spaced a distance from the second truss to establish a second cavity between the third rail and the second rail.

Embodiment 264

The method of embodiment 263, further comprising:
installing a second insulation batt within the second cavity.

Embodiment 265

The method of embodiment 264, further comprising:
applying tape to a linear junction between the first batt and the second batt.

Embodiment 266

The method of embodiment 261, wherein the rails are installed substantially horizontal.

Embodiment 267

The method of embodiment 261, wherein the rails are installed substantially perpendicular to a vertical mid-line of the trusses.

Embodiment 268

The method of embodiment 261, wherein each of the rails includes a cross-section that is generally U-shaped with an open end and a closed end and each rail is installed with the closed end adjacent to the truss.

Embodiment 269

An insulation system for insulating a gable, comprising:
a first rail configured to be installed on a first vertical stud;
a second rail configured to be installed on a second vertical stud spaced apart from the first vertical stud wherein a first cavity is established between the first rail and the second rail and wherein the first cavity is configured to receive and engage a first insulation batt.

Embodiment 270

The system of embodiment 269, further comprising:
a third rail configured to be installed on a third vertical stud spaced apart from the second vertical stud wherein a second cavity is established between the second rail and the third rail and wherein the second cavity is configured to receive and engage a second insulation batt.

Embodiment 271

The system of embodiment 270, wherein each rail is generally U-shaped and includes a base plate and a first tine and a second tine extending therefrom.

Embodiment 272

The system of embodiment 271, wherein each rail is configured to be affixed to a vertical stud via the first tine or the second tine.

Embodiment 273

The system of embodiment 271, wherein each rail is configured to be affixed to a vertical stud such that the base plate is substantially perpendicular to a face of the vertical stud.

Embodiment 274

A method of installing insulation, comprising:
installing a first rail on a first vertical stud;
installing a second rail on a second vertical stud spaced a distance from the first vertical stud to establish a first cavity between the first rail and the second rail; and
installing a first insulation batt within the first cavity.

Embodiment 275

The method of embodiment 274, further comprising:
installing a third rail on a third vertical stud spaced a distance from the second vertical stud to establish a second cavity between the second rail and the third rail.

Embodiment 276

The method of embodiment 275, further comprising:
installing a second insulation batt within the second cavity.

Embodiment 277

The method of embodiment 276, further comprising:
applying tape to a linear junction between the first batt and the second batt.

Embodiment 278

The method of embodiment 275, wherein the rails are installed substantially vertical.

Embodiment 279

The method of embodiment 275, wherein the rails are installed substantially parallel to the studs.

Embodiment 280

The method of embodiment 275, wherein each of the rails includes a cross-section that is generally U-shaped with an open end and a closed end and each rail is installed with the open end perpendicular to a face of the stud.

Embodiment 281

The method of embodiment 280, wherein each of the rails is installed so that the open end of each rails faces the same direction.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An insulation system for hanging insulation in a truss, comprising:
    a first insulation batt;
    a first rigid rail having a base plate configured to be installed on a first truss and at least one tine extending from the base plate and away from and not in contact with the first truss; and
    a second rigid rail having a base plate configured to be installed on a second truss and at least one tine extending from the base plate and away from and not in contact with the second truss, wherein the second rigid rail is spaced apart from the first rigid rail such that no part of the first rigid rail is in contact with any part the second rigid rail and a first cavity is established between the first rigid rail and the second rigid rail, wherein the first cavity is configured to receive the first insulation batt, and wherein the first insulation batt is held in place within the cavity through engagement of the at least one tine of the first rigid rail and the at least one tine of the second rigid rail with the first insulation batt.

2. The insulation system of claim 1, further comprising: a third rigid rail configured to be installed on the second truss opposite the second rigid rail.

3. The insulation system of claim 2, further comprising:
    a second insulation batt; and
    a fourth rigid rail configured to be installed on a third truss spaced apart from the second truss, wherein a second cavity is established between the third rigid rail and the fourth rigid rail and wherein the second cavity is configured to receive and engage the second insulation batt.

4. The insulation system of claim 3, wherein each rigid rail is elongated and includes a length and a width and a ratio of the length to the width, RLW is less than or equal to 0.1.

5. The insulation system of claim 3, wherein each rigid rail includes a cross-sectional shape that is generally U-shaped.

6. The insulation system of claim 5, wherein the at least one tine of each rigid rail includes a first tine and a second tine extending from the base plate.

7. The insulation system of claim 3, wherein each cavity defines a cavity width, WC, and WC is less than or equal to 48.0 inches.

8. The insulation system of claim 3, wherein the first and second insulation batts are placed a height, H, above a floor and H is greater than or equal to 3 feet.

9. An insulation system for insulating a gable, comprising:
    a first insulation batt,
    a first rigid rail comprising a base plate, a first tine configured to be installed on a first vertical stud, and second tine extending from the base plate and not in contact with the first vertical stud; and
    a second rigid rail comprising a base plate, a first tine configured to be installed on a second vertical stud, and second tine extending from the base plate and not in contact with the second vertical stud, wherein the second rigid rail is spaced apart from the first rigid rail, wherein no part of the first rigid rail is in contact with any part of the second rigid rail, wherein a first cavity is established between the first rigid rail and the second rigid rail, wherein the first cavity is configured to receive the first insulation batt, and wherein the first insulation batt is held in place within the cavity by through engagement of the second tine of the first rigid rail and the second tine of the second rigid rail with the first insulation batt, such that the second tine of the first rigid rail engages a first side of the first insulation batt and the second tine of the second rigid rail engages a second side of the first insulation batt.

10. The system of claim 9, further comprising:
    a second insulation batt, and
    a third rigid rail configured to be installed on a third vertical stud spaced apart from the second vertical stud wherein a second cavity is established between the second rigid rail and the third rigid rail and wherein the second cavity is configured to receive and engage the second insulation batt.

11. The system of claim 10, wherein each rigid rail is generally U-shaped and includes the base plate and the first tine and a second tine extending therefrom.

12. The system of claim 11, wherein each rigid rail is configured to be affixed to a vertical stud via the first tine or the second tine.

* * * * *

UNITED STATES PATENT AND TRADEMARK OFFICE
CERTIFICATE OF CORRECTION

PATENT NO. : 10,550,568 B2
APPLICATION NO. : 15/718628
DATED : February 4, 2020
INVENTOR(S) : Jean-Philippe Ndobo-Epoy et al.

Page 1 of 1

It is certified that error appears in the above-identified patent and that said Letters Patent is hereby corrected as shown below:

In the Claims

Column 68, Line 8, In Claim 9, please delete "a first insulation batt," and insert --a first insulation batt;--.

Column 68, Line 10, In Claim 9, please delete "vertical stud, and" and insert --vertical stud, and a--.

Column 68, Line 14, In Claim 9, please delete "vertical stud, and" and insert --vertical stud, and a--.

Column 68, Line 31, In Claim 10, please delete "a second insulation batt, and" and insert --a second insulation batt; and--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*